United States Patent
Nauman et al.

(10) Patent No.: US 10,183,423 B2
(45) Date of Patent: Jan. 22, 2019

(54) METHOD OF MAKING A BLAST OR SHOCK WAVE MITIGATING MATERIAL

(71) Applicant: PURDUE RESEARCH FOUNDATION, West Lafayette, IN (US)

(72) Inventors: Eric Nauman, West Lafayette, IN (US); Anne Dye Zakrajsek, Beavercreek, OH (US); Andrew Zakrajsek, Beavercreek, OH (US); Steven Forrest Son, West Lafayette, IN (US); Evan Louis Breedlove, Woodbury, MN (US)

(73) Assignee: Purdue Research Foundation, West Lafayette, IN (US)

( * ) Notice: Subject to any disclaimer, the term of this patent is extended or adjusted under 35 U.S.C. 154(b) by 498 days.

(21) Appl. No.: 14/611,265

(22) Filed: Feb. 1, 2015

(65) Prior Publication Data
US 2015/0202806 A1   Jul. 23, 2015

Related U.S. Application Data

(60) Division of application No. 13/787,754, filed on Mar. 6, 2013, now Pat. No. 9,056,983, which is a
(Continued)

(51) Int. Cl.
*B29C 43/02*   (2006.01)
*C08L 83/00*   (2006.01)
(Continued)

(52) U.S. Cl.
CPC ............ *B29C 43/021* (2013.01); *A43B 13/04* (2013.01); *A43B 13/187* (2013.01);
(Continued)

(58) Field of Classification Search
None
See application file for complete search history.

(56) References Cited

U.S. PATENT DOCUMENTS

3,061,885 A * 11/1962 Rogers, Jr. ............... C08J 9/36
                                                    264/321
3,291,873 A * 12/1966 Eakin ....................... B29C 44/10
                                                    249/141
(Continued)

FOREIGN PATENT DOCUMENTS

EP   0500247   8/1992
EP   1068460   9/2002
(Continued)

OTHER PUBLICATIONS

KIPO, Search Report & Written Opinion, dated Feb. 28, 2013, 10 pages.
WIPO, IPRP, dated Mar. 20, 2014.

*Primary Examiner* — Edmund H Lee
(74) *Attorney, Agent, or Firm* — Taft Stettinius & Hollister LLP

(57) ABSTRACT

A compound for protection of an object from a blast or shock wave. The compound include a matrix material and at least a first and second sets of inclusions in the matrix material that differ in size, quantity, shape and/or composition in a direction through the impact-absorbing material, the combination of which contributes to the ability of the material to exhibit at least one property that changes as the inclusions are deformed in response to a blast or shock wave.

4 Claims, 44 Drawing Sheets

Related U.S. Application Data continuation-in-part of application No. PCT/US2012/054335, filed on Sep. 8, 2012.

(60) Provisional application No. 61/532,676, filed on Sep. 9, 2011.

(51) Int. Cl.
| | |
|---|---|
| C08L 23/06 | (2006.01) |
| A43B 13/04 | (2006.01) |
| A43B 13/18 | (2006.01) |
| A43B 17/00 | (2006.01) |
| C08K 3/04 | (2006.01) |
| B29L 31/00 | (2006.01) |
| A63B 71/10 | (2006.01) |

(52) U.S. Cl.
CPC .............. *A43B 17/003* (2013.01); *C08K 3/04* (2013.01); *C08L 23/06* (2013.01); *C08L 83/00* (2013.01); *A63B 71/10* (2013.01); *B29L 2031/768* (2013.01)

(56) References Cited

U.S. PATENT DOCUMENTS

| | | | |
|---|---|---|---|
| 3,600,714 A | 8/1971 | Cade et al. | |
| 3,795,722 A * | 3/1974 | Sassaman | B29C 44/04 |
| | | | 264/161 |
| 3,994,020 A | 11/1976 | Villari | |
| 5,030,501 A | 7/1991 | Colvin et al. | |
| 5,230,947 A | 7/1993 | Ou | |
| 5,240,671 A * | 8/1993 | Carey | B28B 7/0064 |
| | | | 264/125 |
| 5,274,846 A | 1/1994 | Kolsky | |
| 5,667,895 A | 9/1997 | Jenkner | |
| 5,669,079 A | 9/1997 | Morgan | |
| 6,052,992 A | 4/2000 | Eroshenko | |
| 6,127,010 A | 10/2000 | Rudy | |
| 6,425,141 B1 | 7/2002 | Ewing et al. | |
| 6,938,290 B2 | 9/2005 | McKinney et al. | |
| 7,575,797 B2 | 8/2009 | Karr et al. | |
| 7,669,251 B2 | 3/2010 | Hammons et al. | |
| 8,047,117 B1 | 11/2011 | Tan | |
| 2001/0044023 A1 | 11/2001 | Johnson et al. | |
| 2005/0255289 A1 | 11/2005 | Wadley | |
| 2006/0113694 A1* | 6/2006 | Freser-Wolzenburg | |
| | | | B29C 44/588 |
| | | | 264/51 |
| 2007/0029690 A1 | 2/2007 | Green | |
| 2008/0066217 A1* | 3/2008 | Depreitere | A42B 3/064 |
| | | | 2/412 |
| 2008/0250548 A1 | 10/2008 | Stuhmiller et al. | |
| 2011/0041679 A1 | 2/2011 | Pollock et al. | |
| 2011/0117310 A1 | 5/2011 | Anderson et al. | |
| 2012/0070606 A1* | 3/2012 | Villata | B32B 3/266 |
| | | | 428/71 |
| 2012/0175206 A1 | 7/2012 | Kanous et al. | |
| 2014/0099472 A1 | 4/2014 | Greenhill et al. | |

FOREIGN PATENT DOCUMENTS

| | | |
|---|---|---|
| EP | 1135250 | 3/2004 |
| EP | 1571368 | 9/2005 |
| GB | 2324352 | 7/1997 |
| GB | 2335447 | 9/1999 |
| JP | 07127679 | 5/1995 |
| KR | 1020080029515 | 4/2008 |
| WO | 0046303 | 8/2000 |
| WO | 0149954 | 12/2001 |
| WO | 0221013 | 3/2002 |
| WO | 0355339 | 7/2003 |
| WO | 2008-009091 | 1/2008 |
| WO | 2008048703 | 4/2008 |
| WO | 2010072812 | 7/2010 |
| WO | 2010129109 | 11/2010 |
| WO | 2012003026 | 4/2012 |
| WO | 2012051588 | 4/2012 |

\* cited by examiner

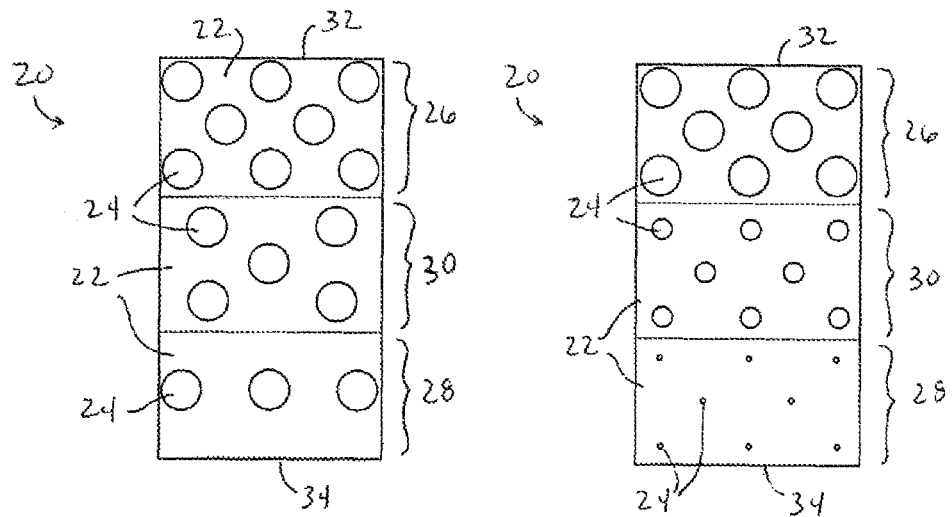
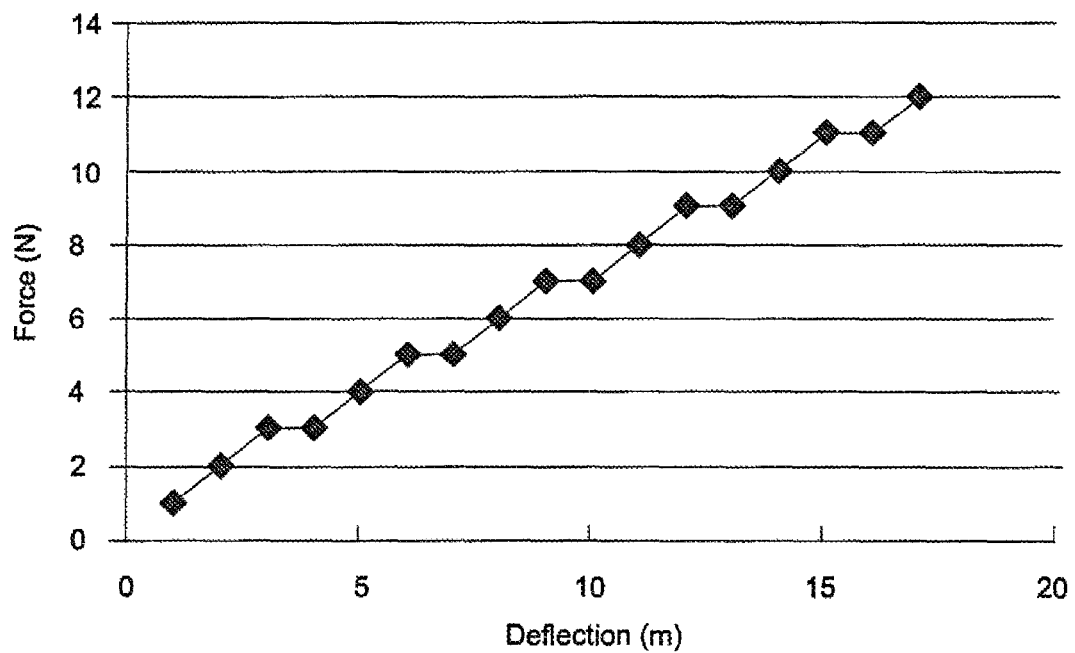
FIG.3

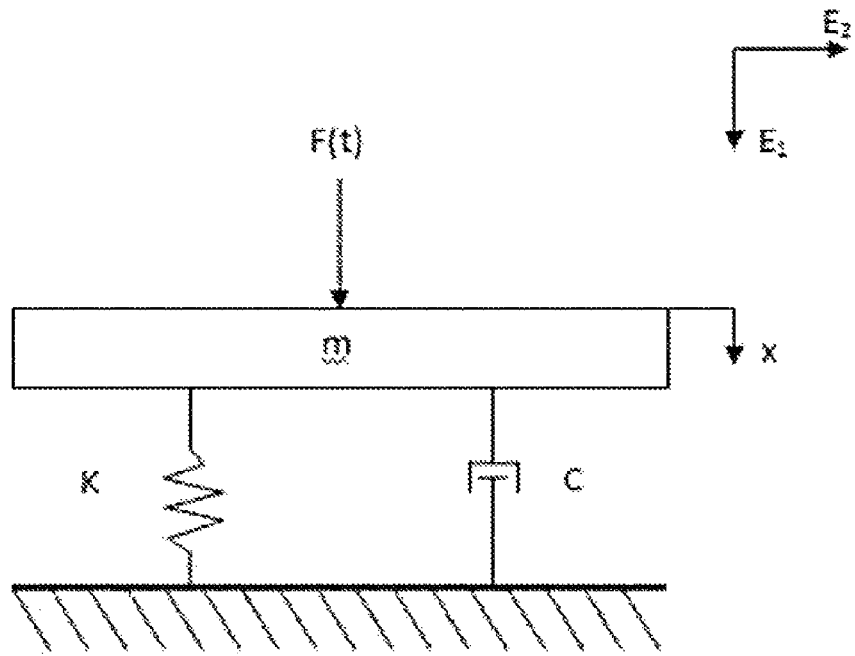
FIG. 4.1
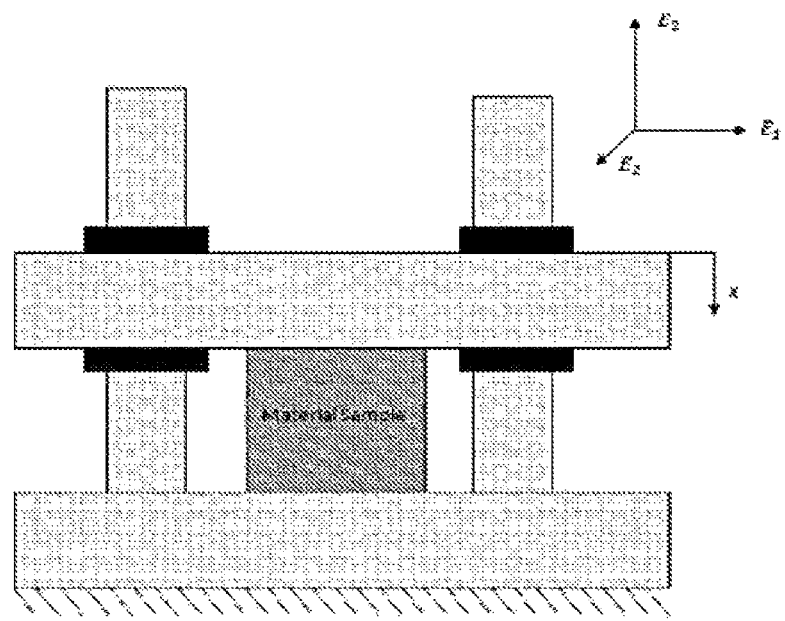
FIG. 4.3

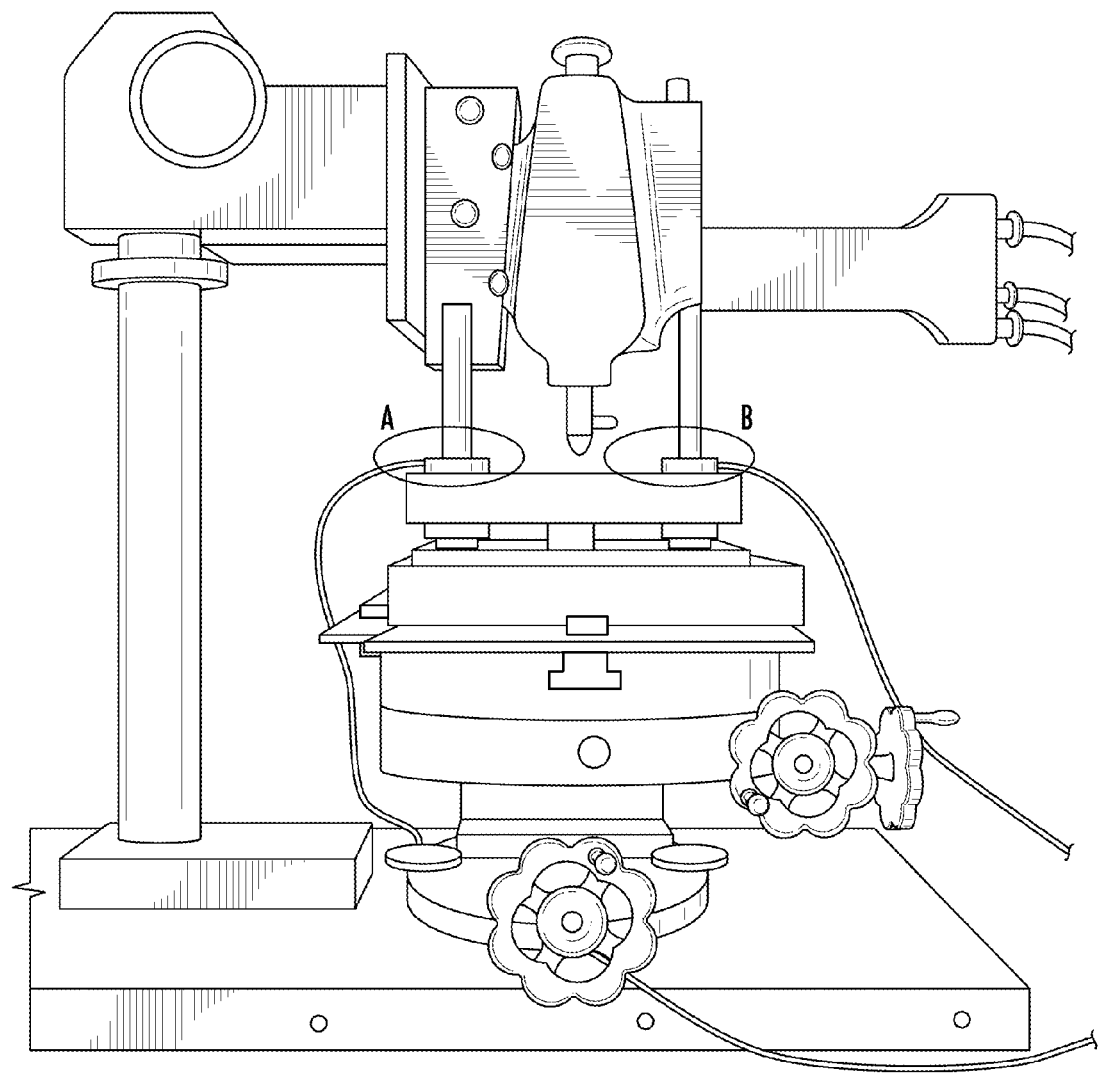
FIG. 4.4

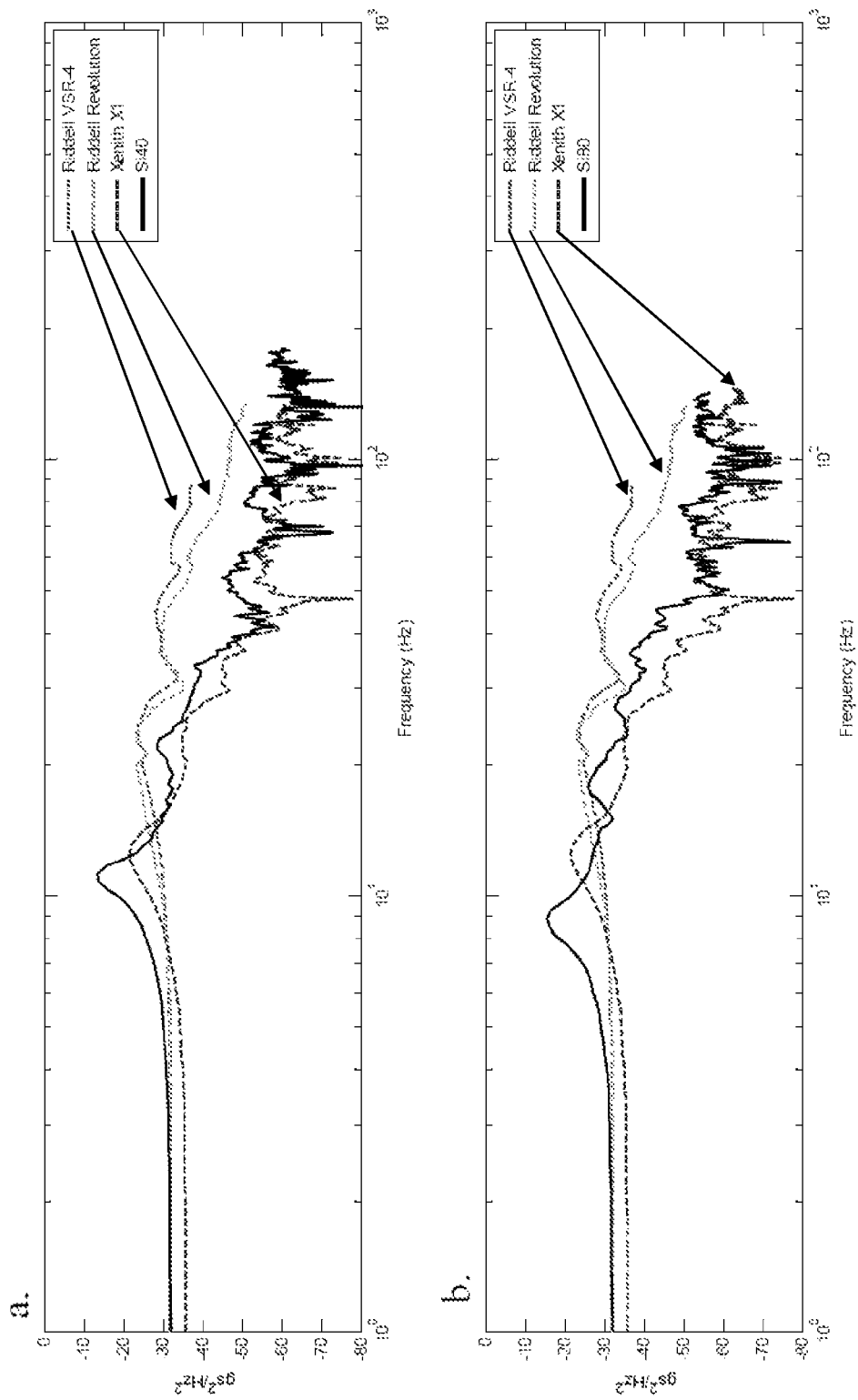
FIG. 4.5

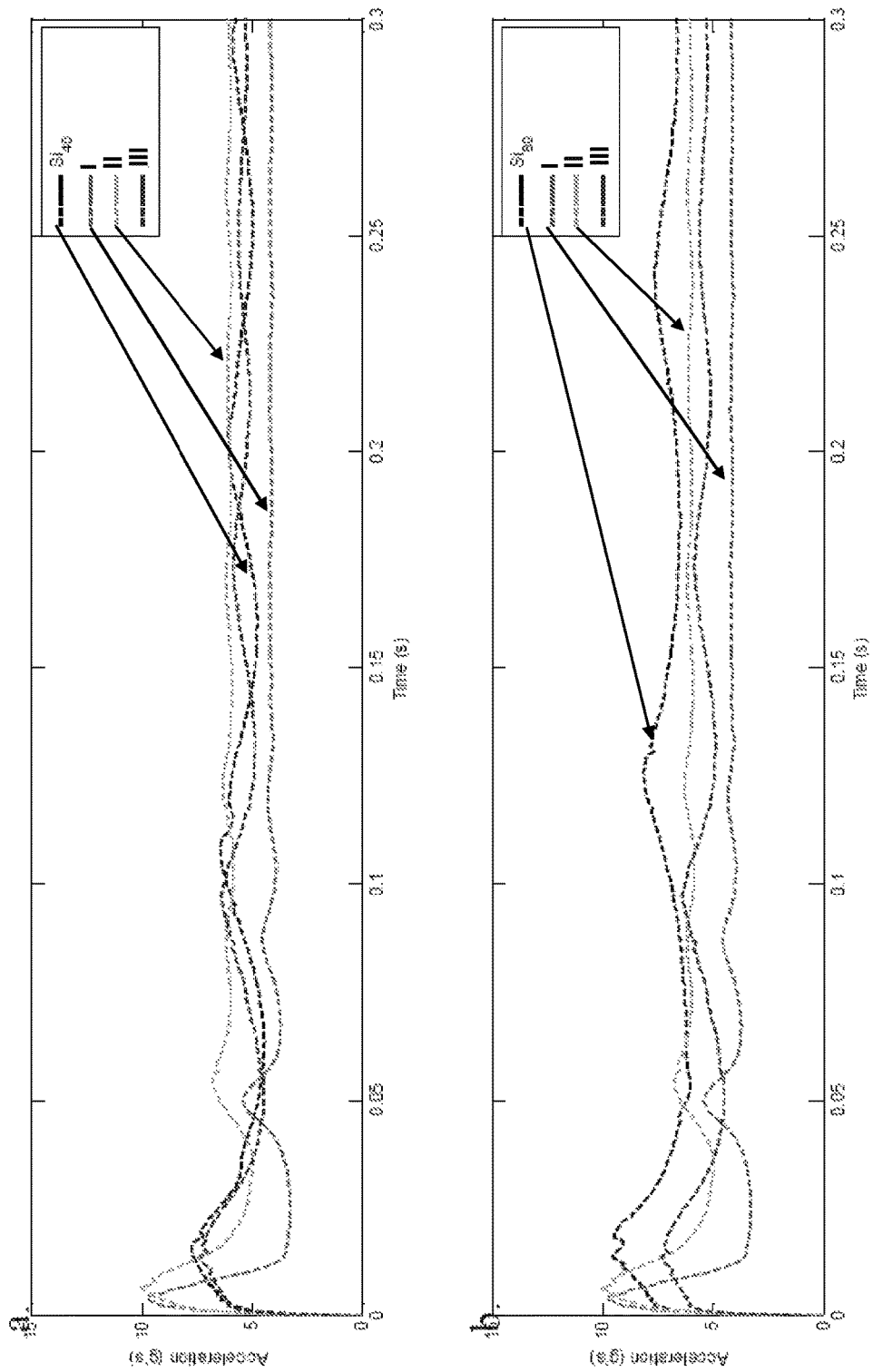
FIG. 4.6

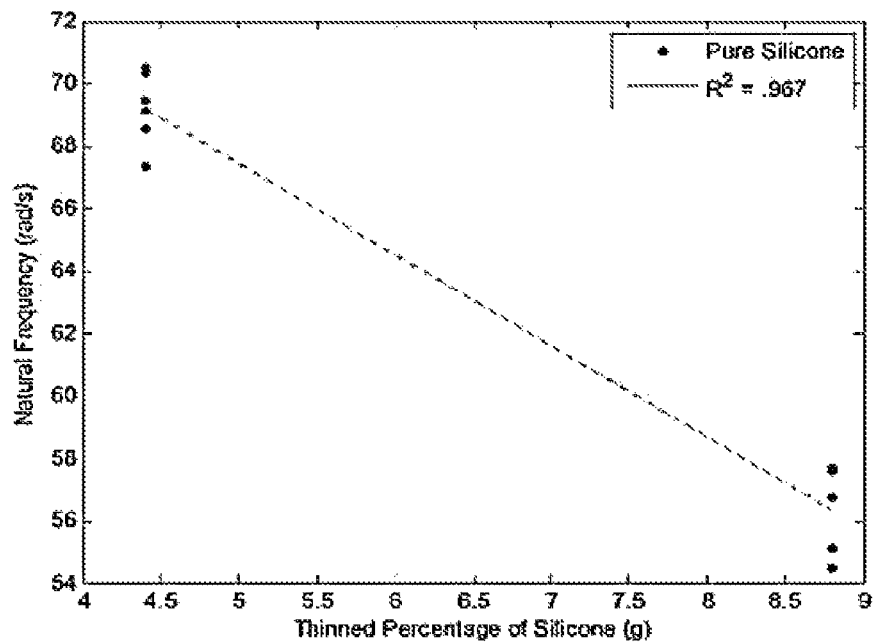
FIG. 4.7
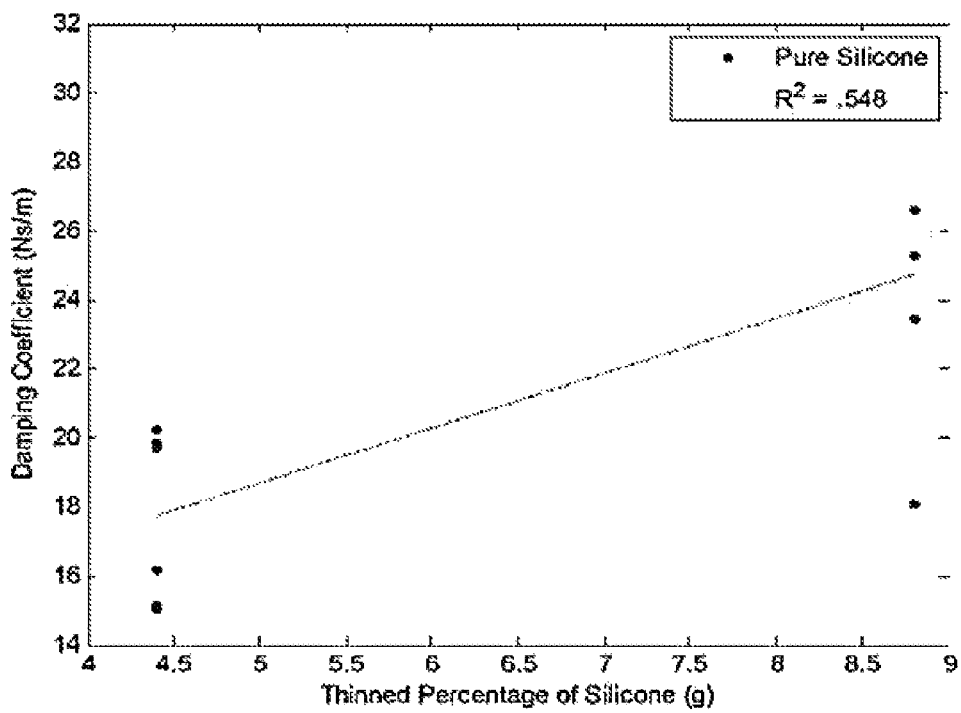
FIG. 4.8

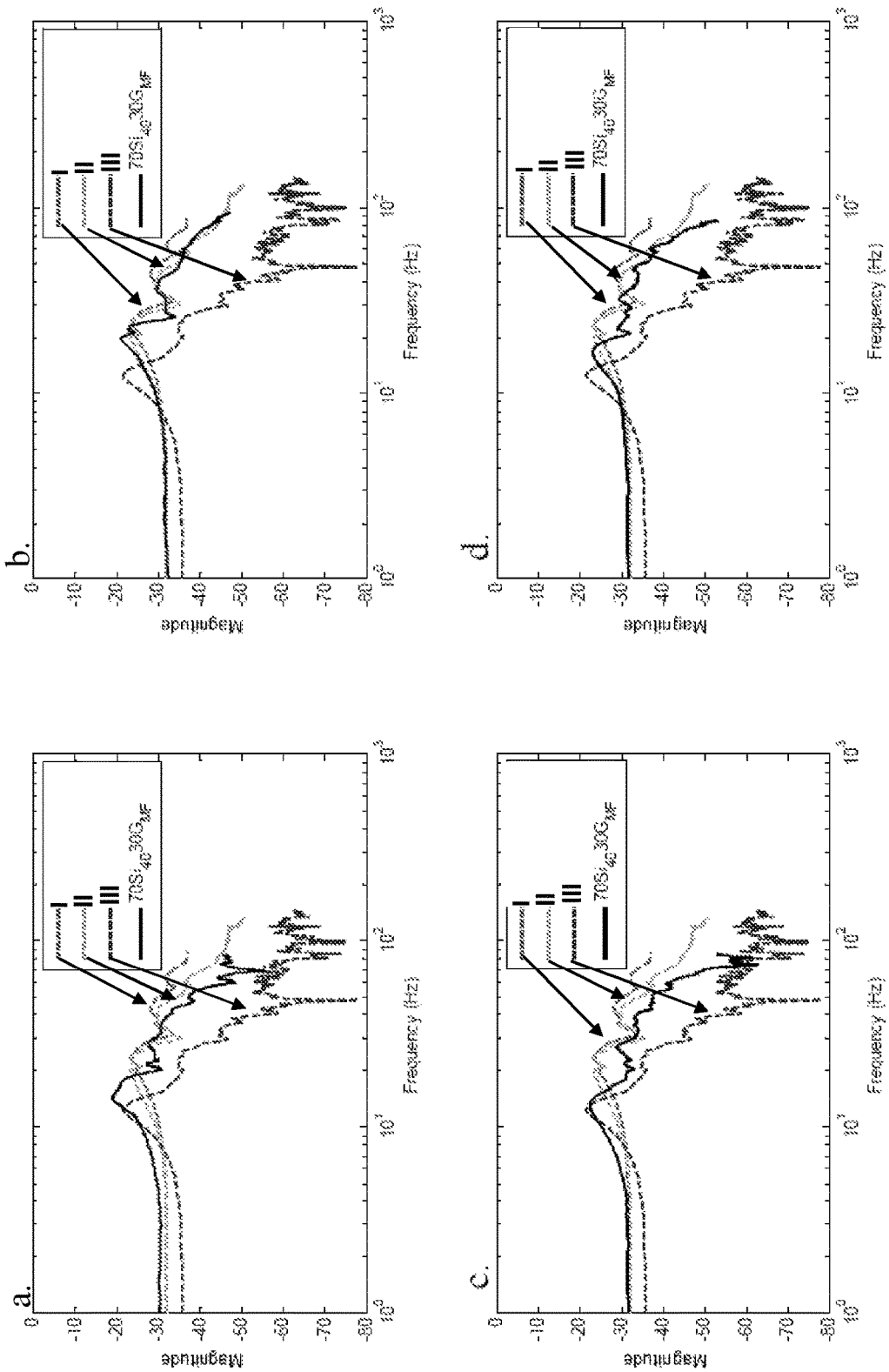
FIG. 4.9

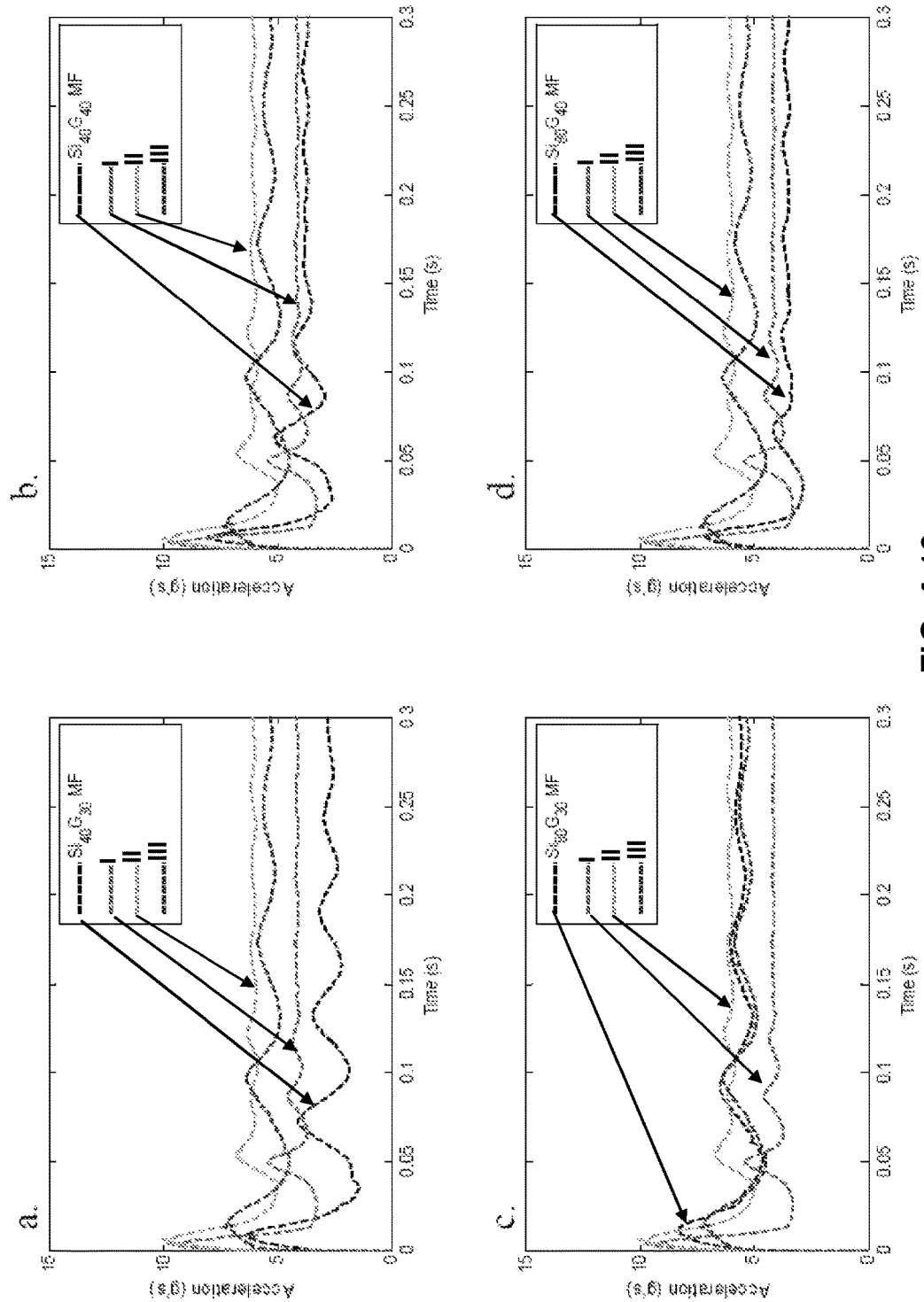
FIG. 4.10

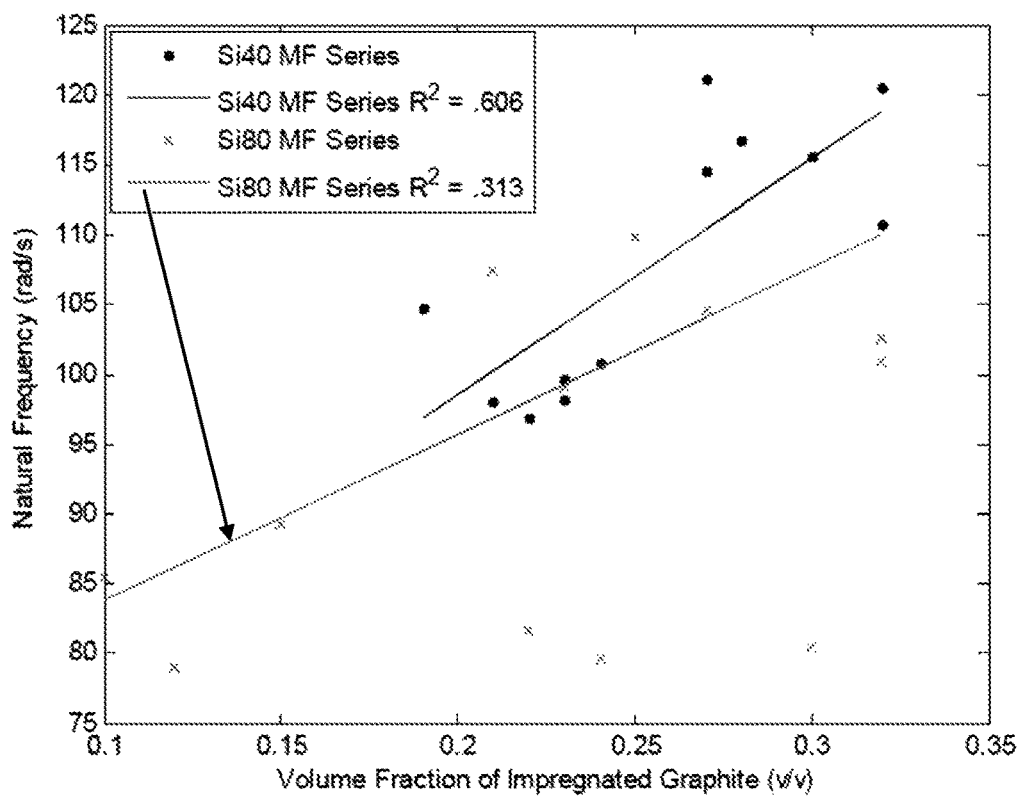
FIG. 4.11
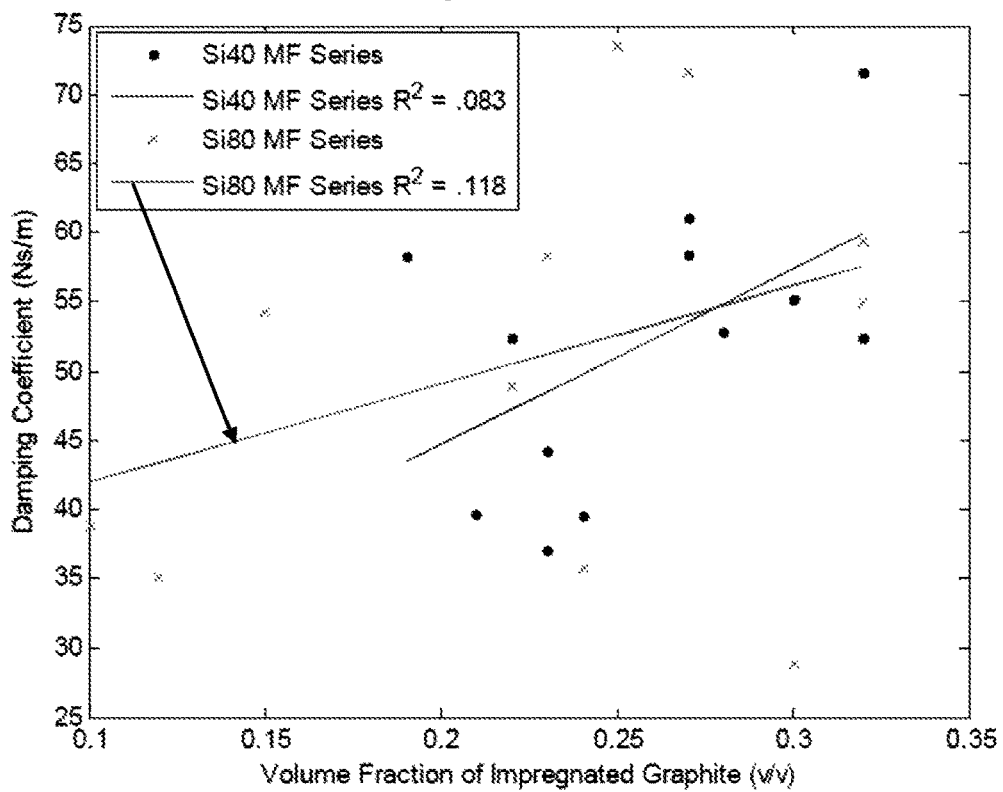
FIG. 4.12

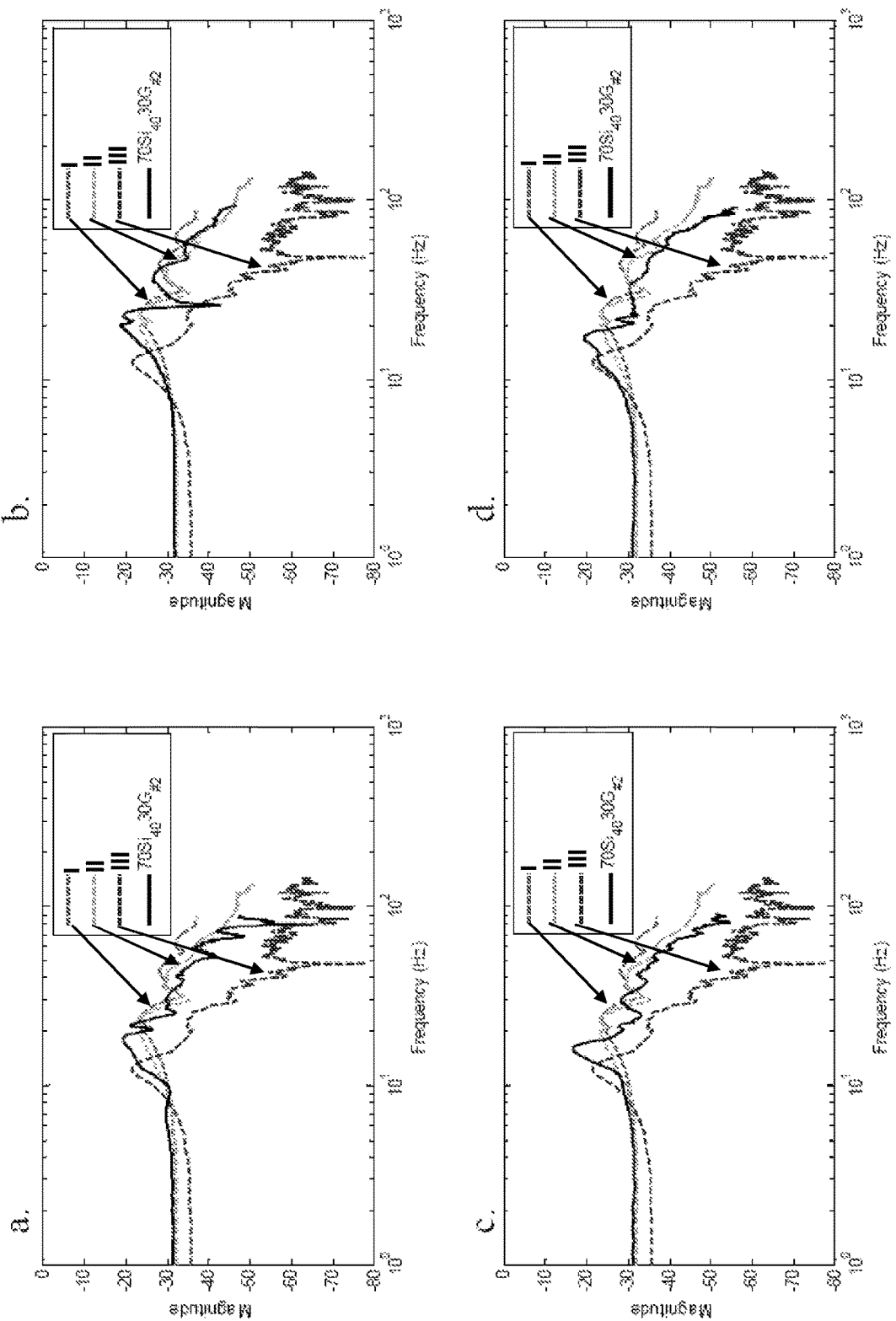
FIG. 4.13

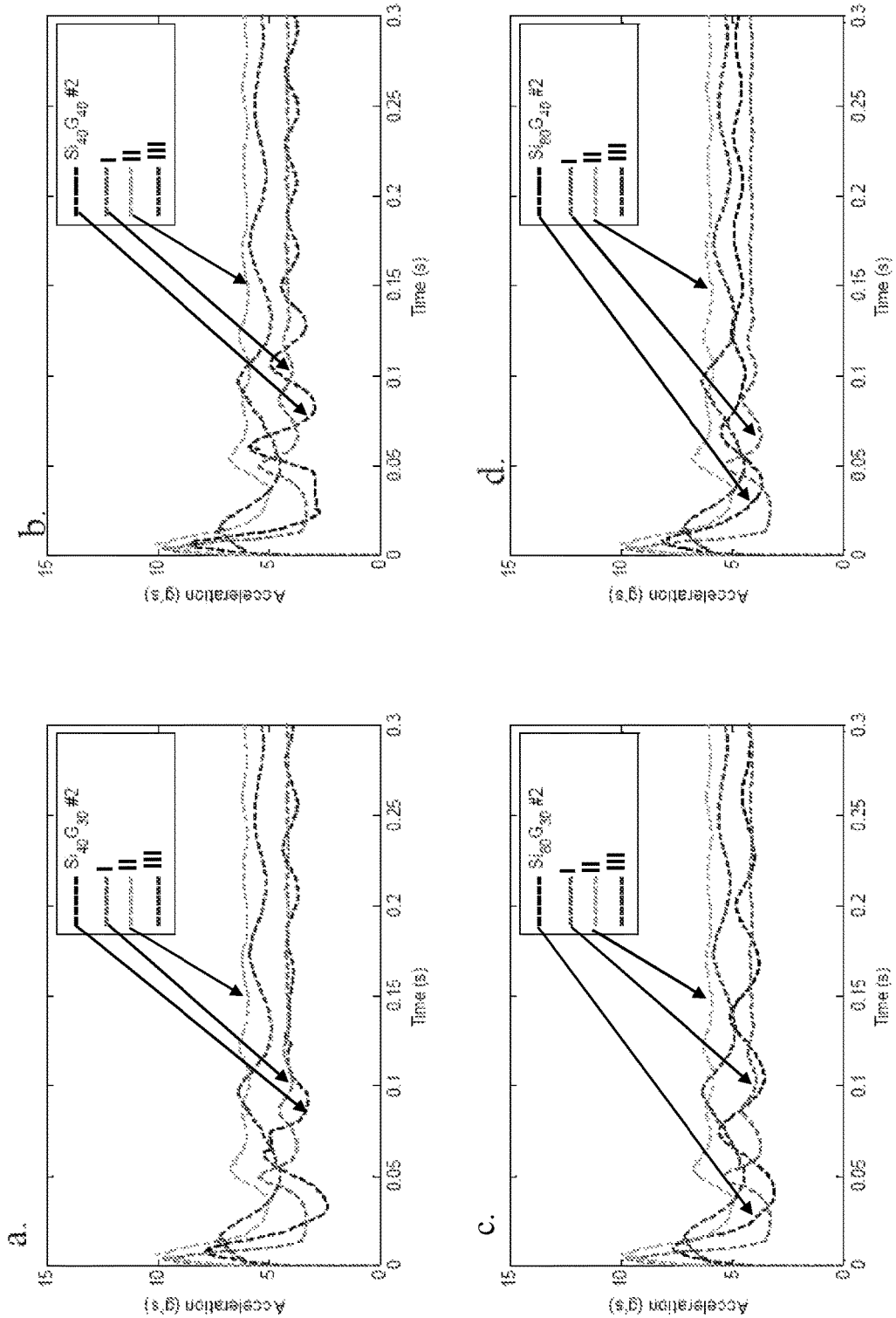
FIG. 4.14

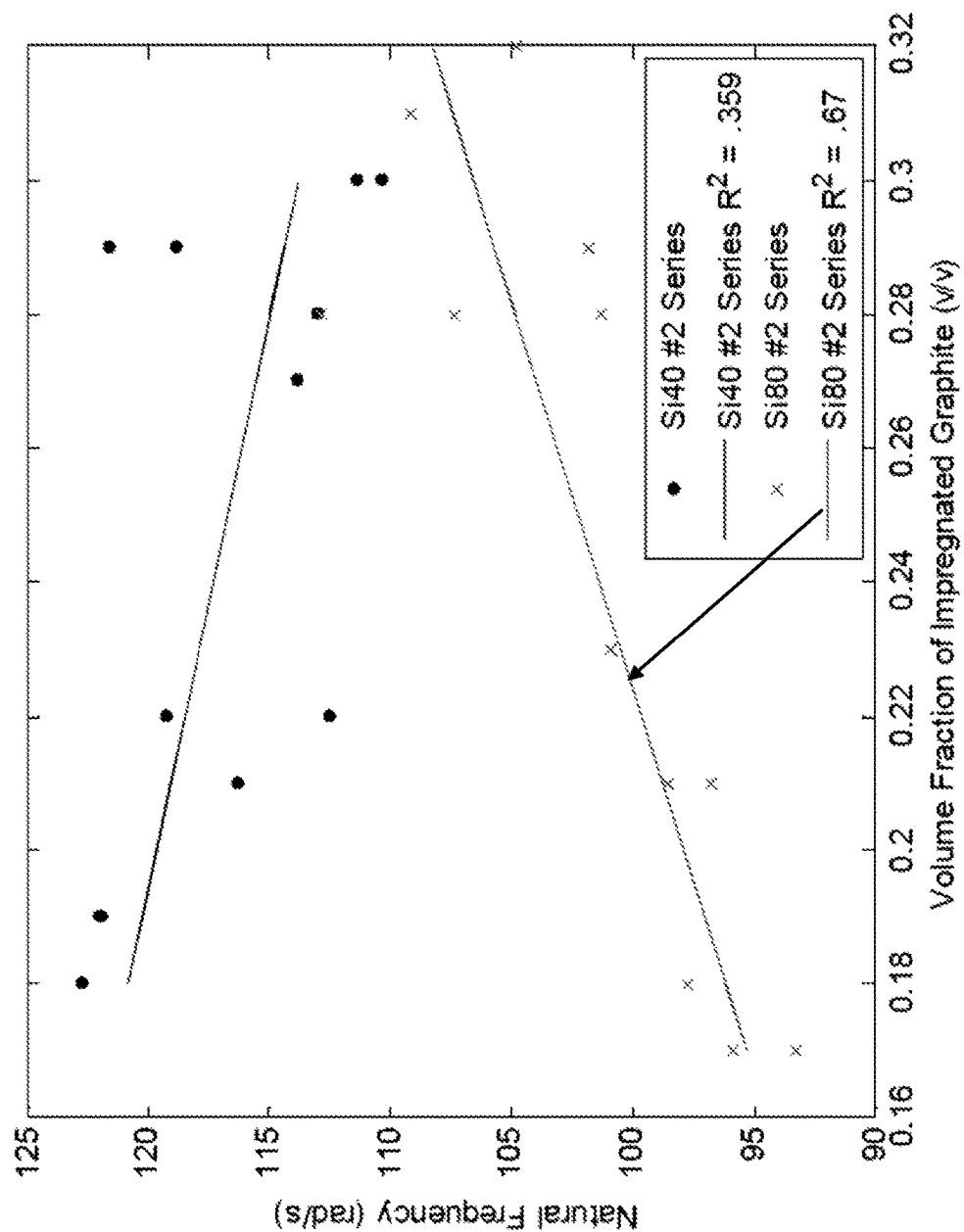
FIG. 4.15

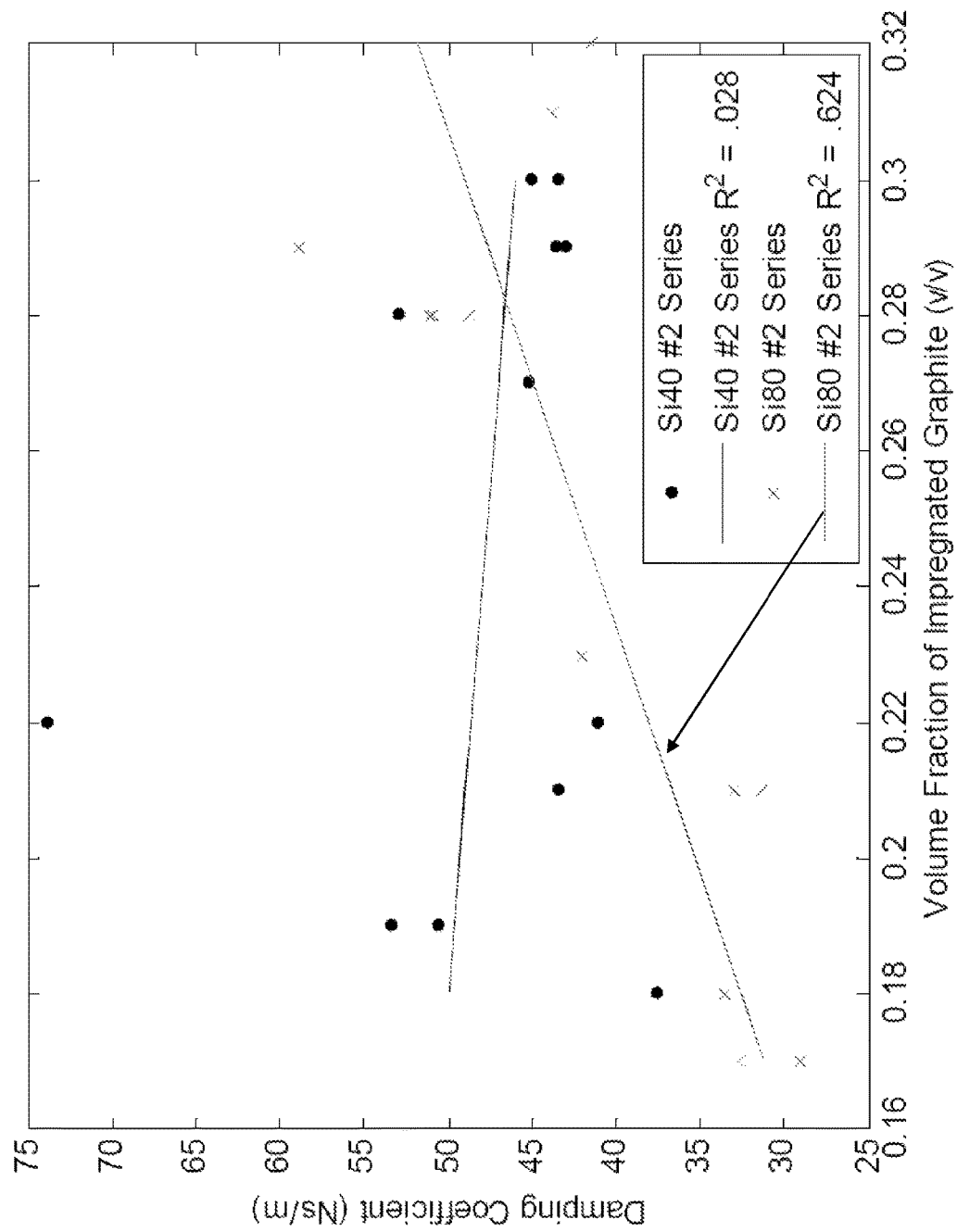
FIG. 4.16

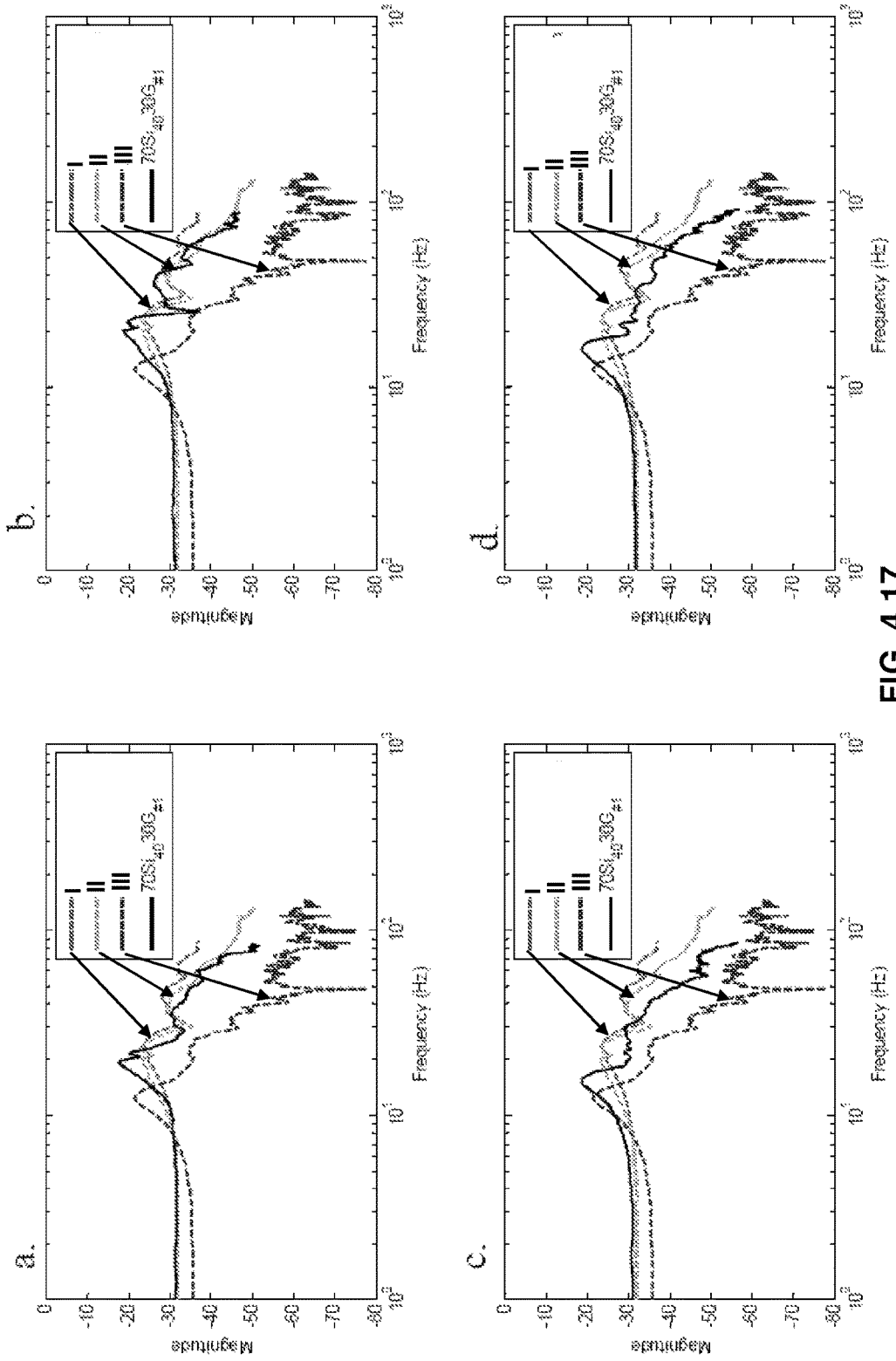
FIG. 4.17

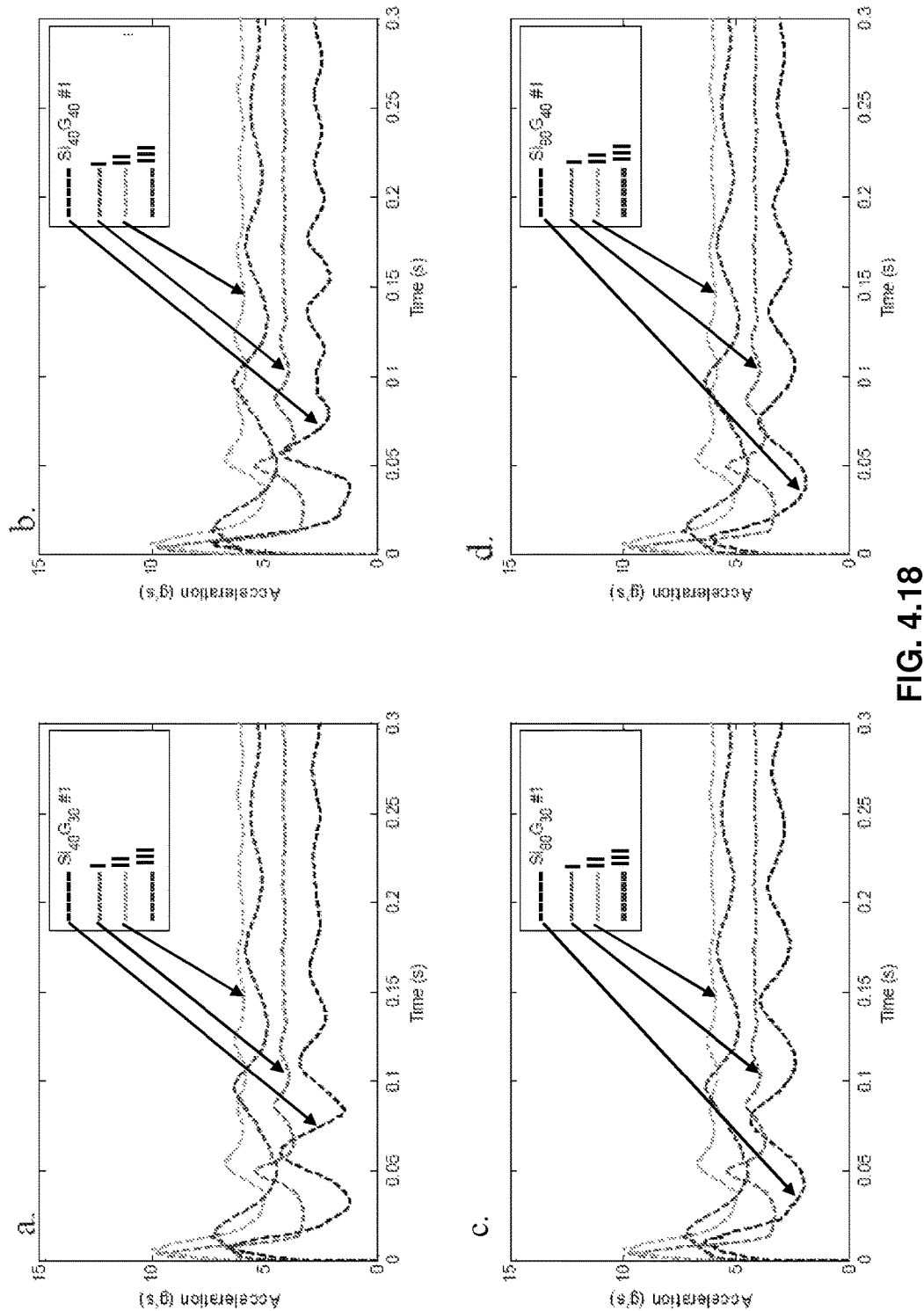
FIG. 4.18

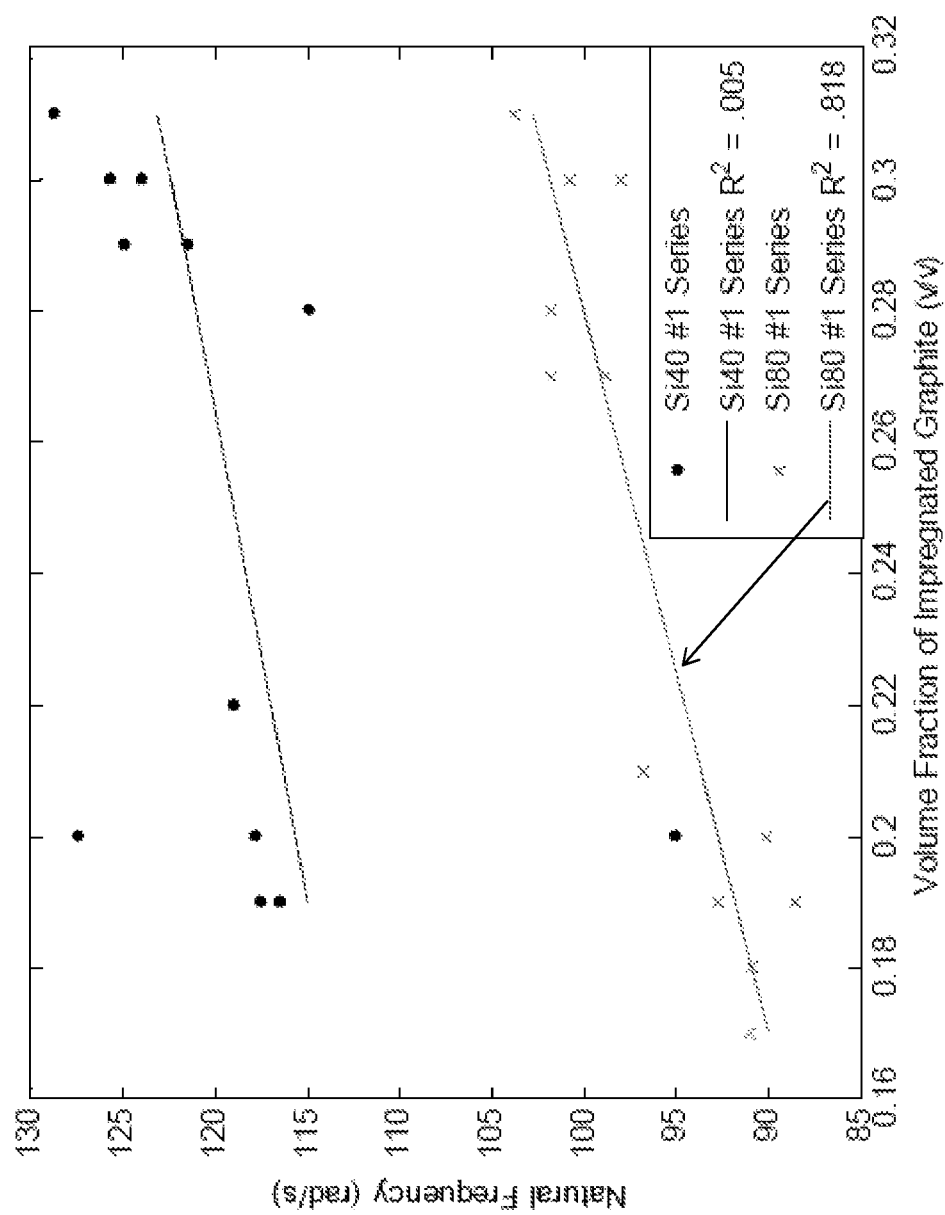
FIG. 4.19

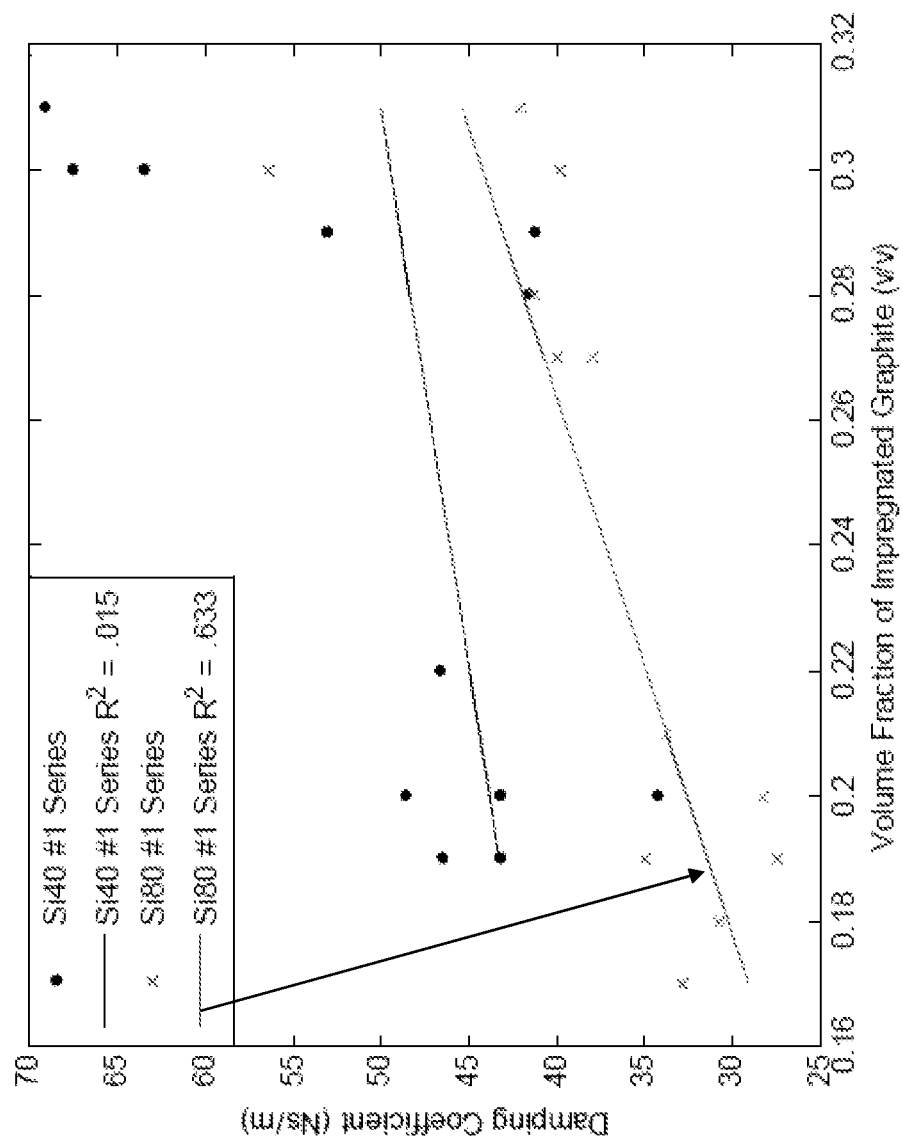
FIG. 4.20

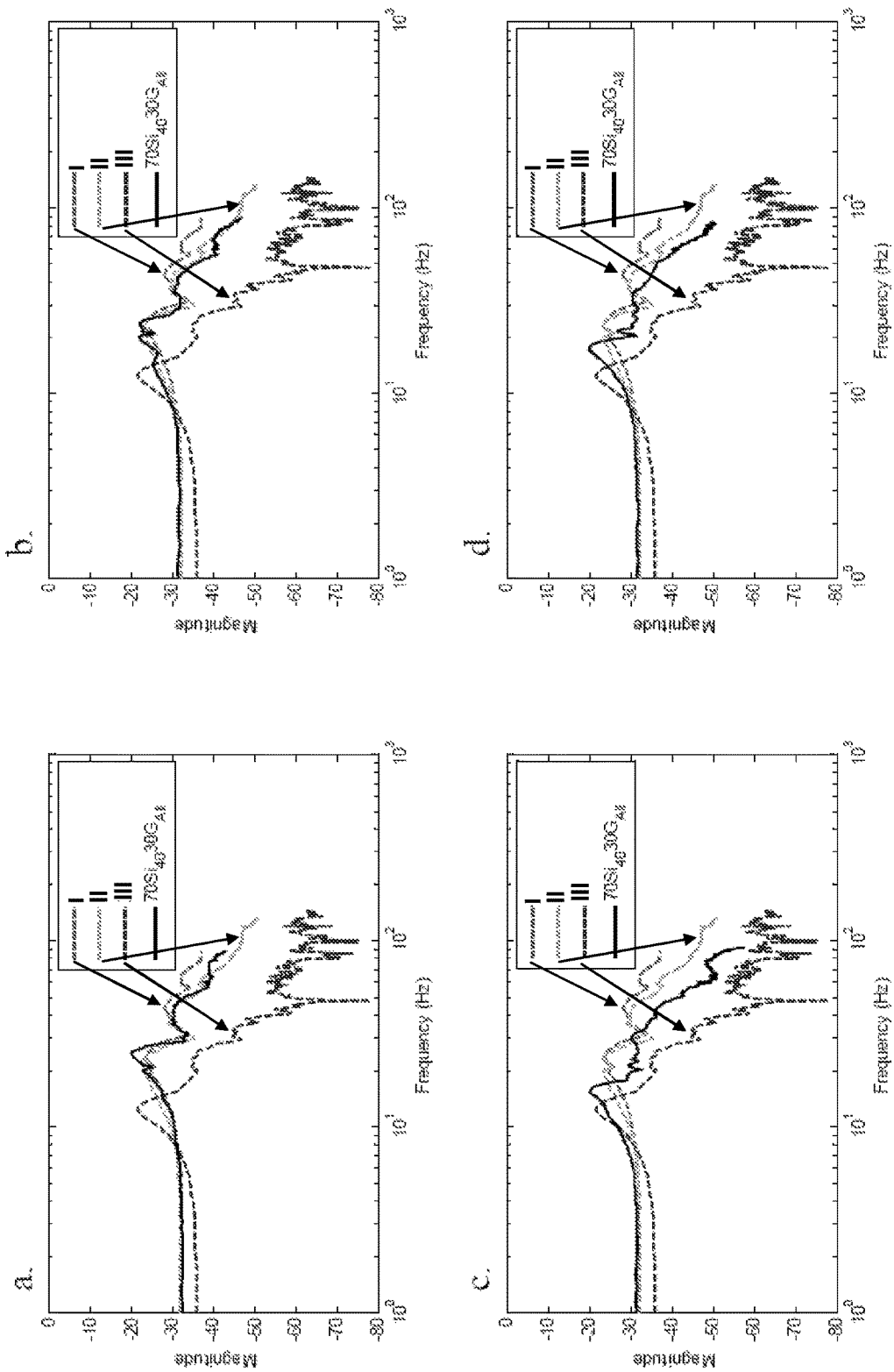
FIG. 4.21

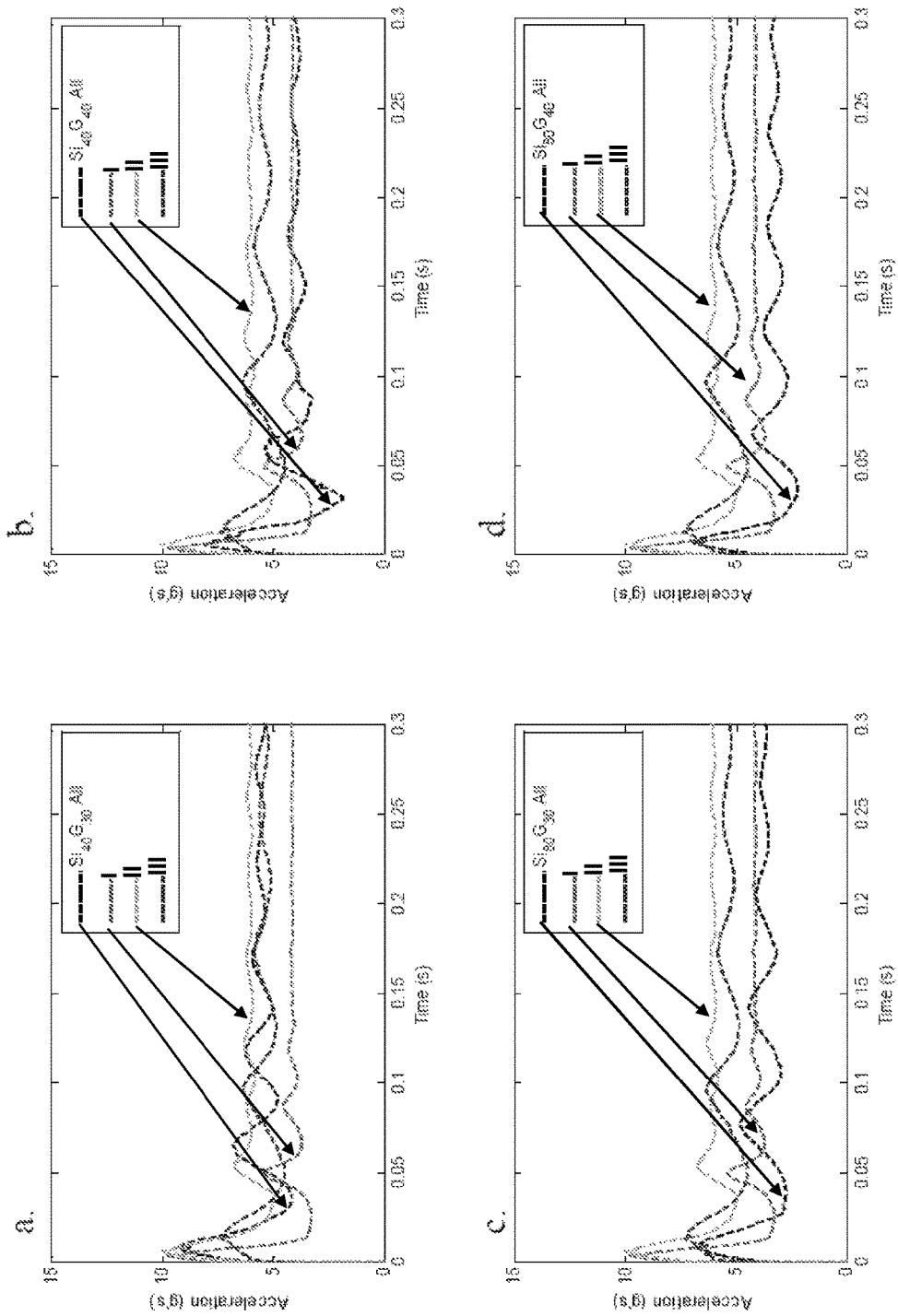
FIG. 4.22

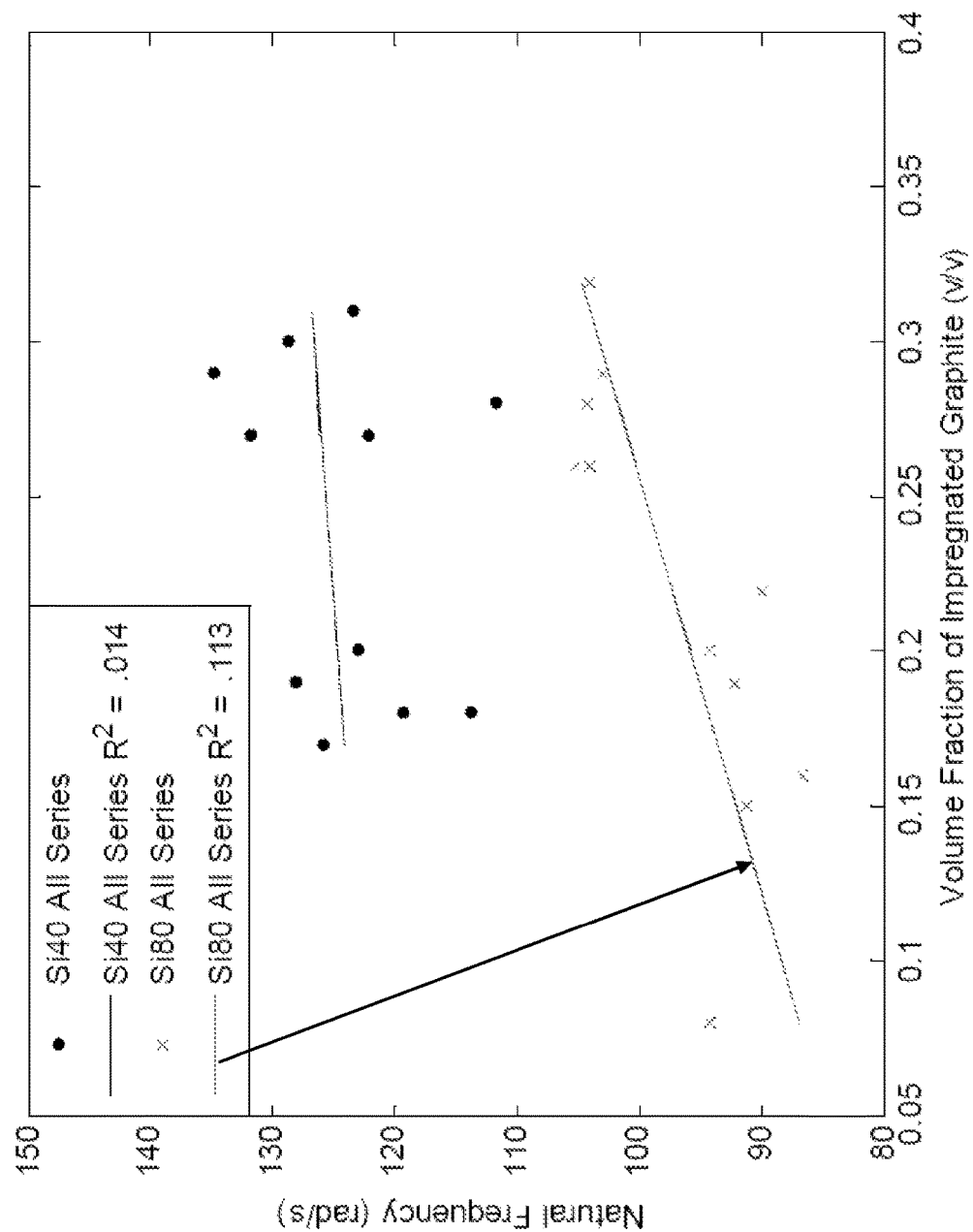
FIG. 4.23

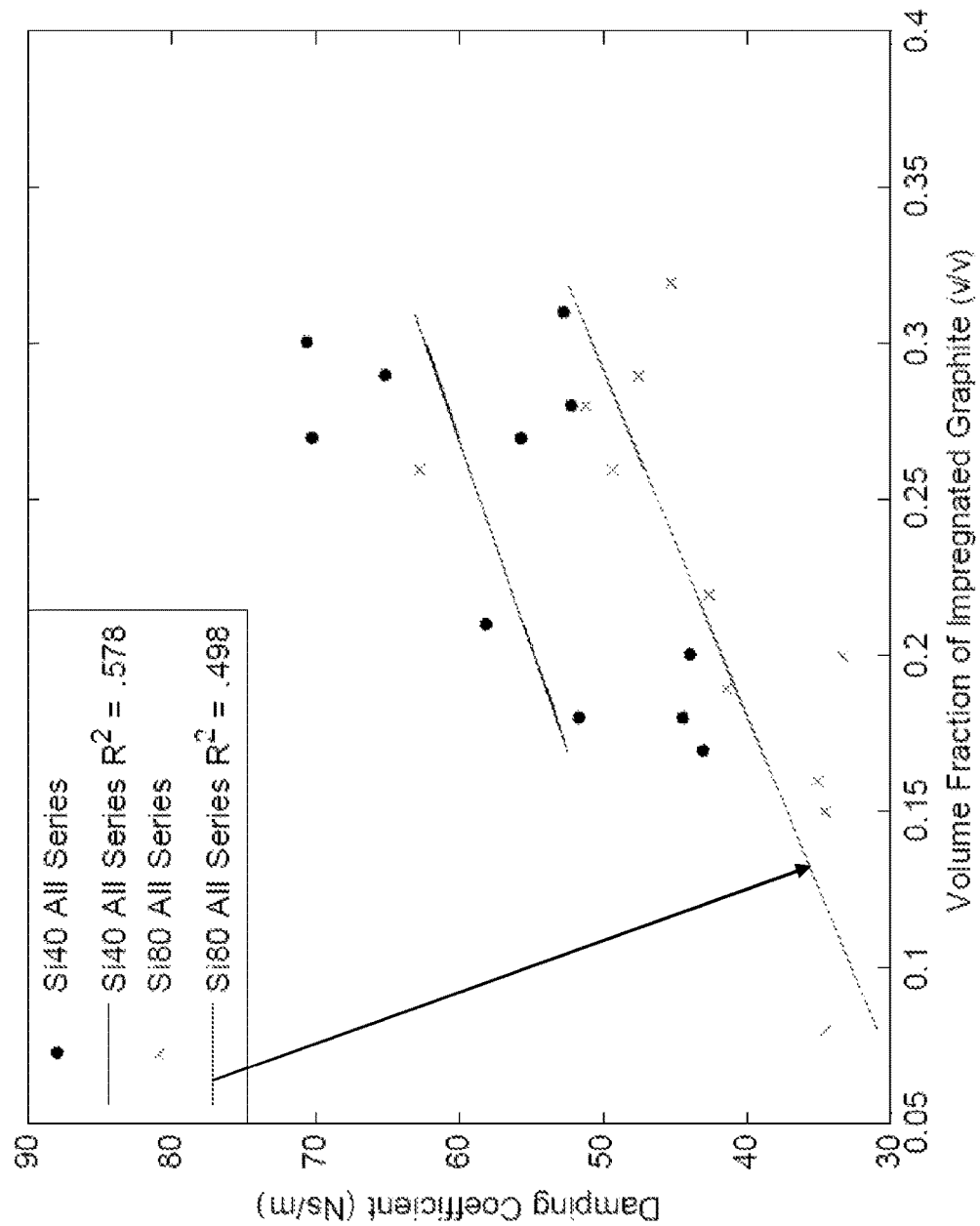
FIG. 4.24

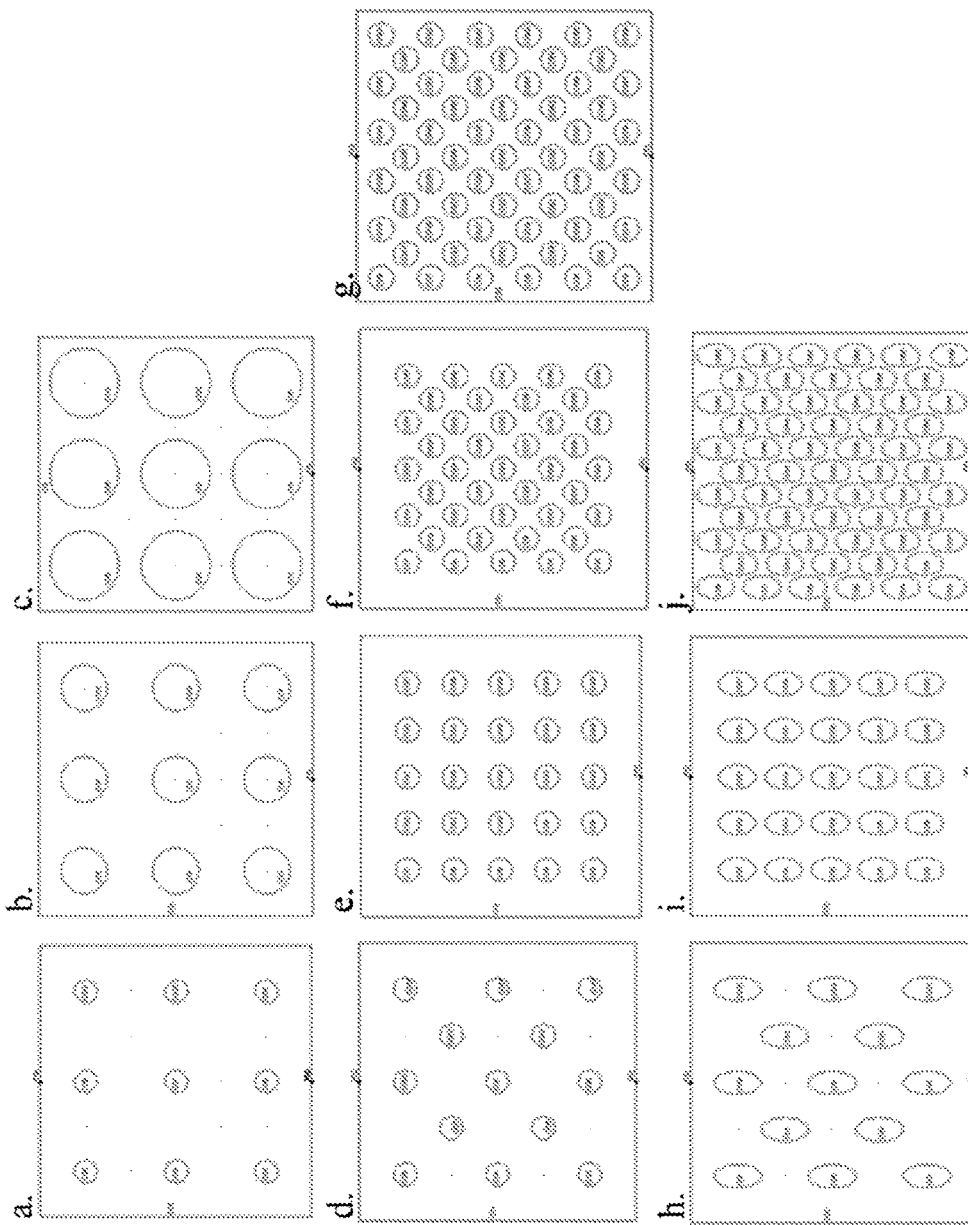
FIG. 5.1

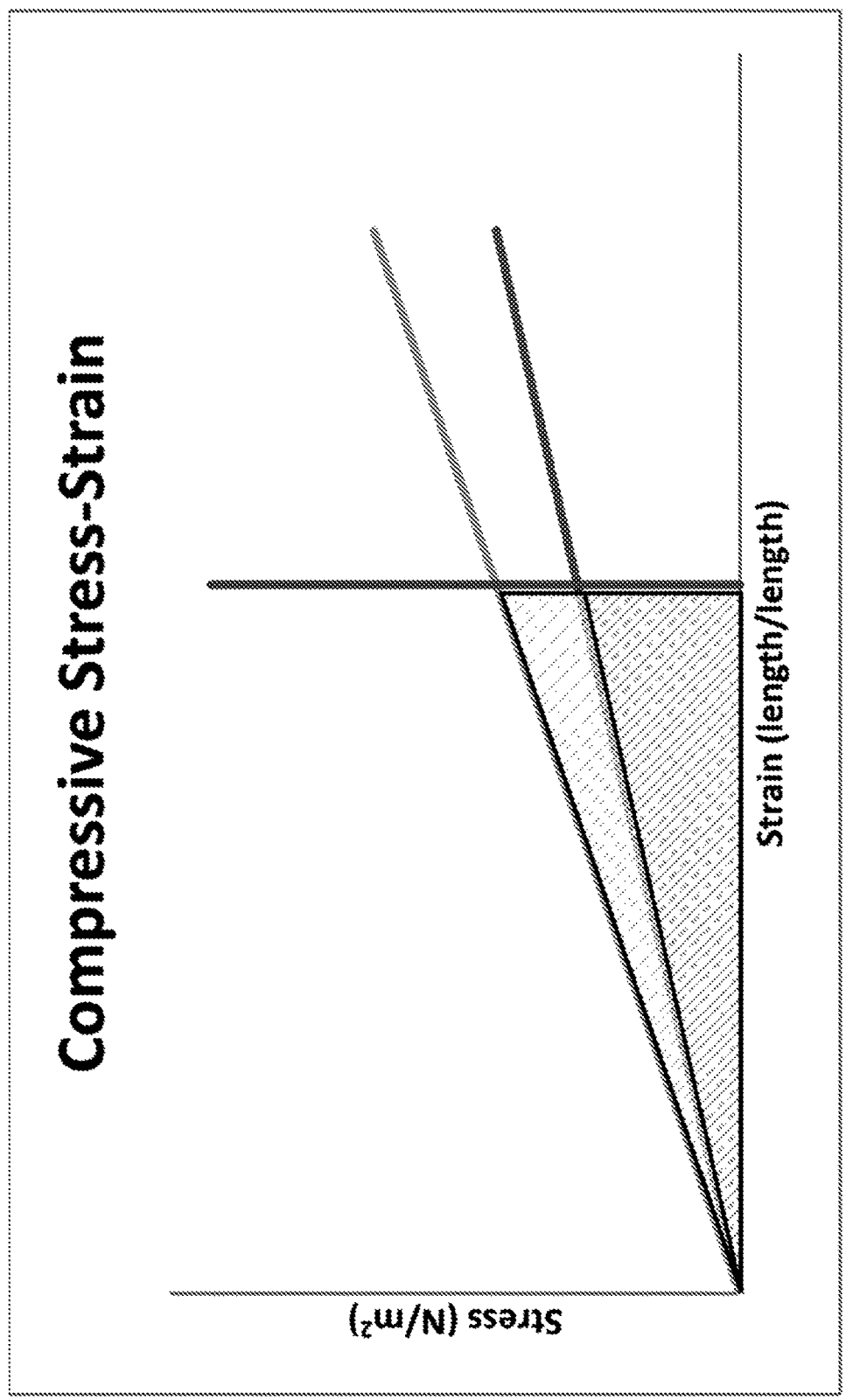
FIG. 5.2

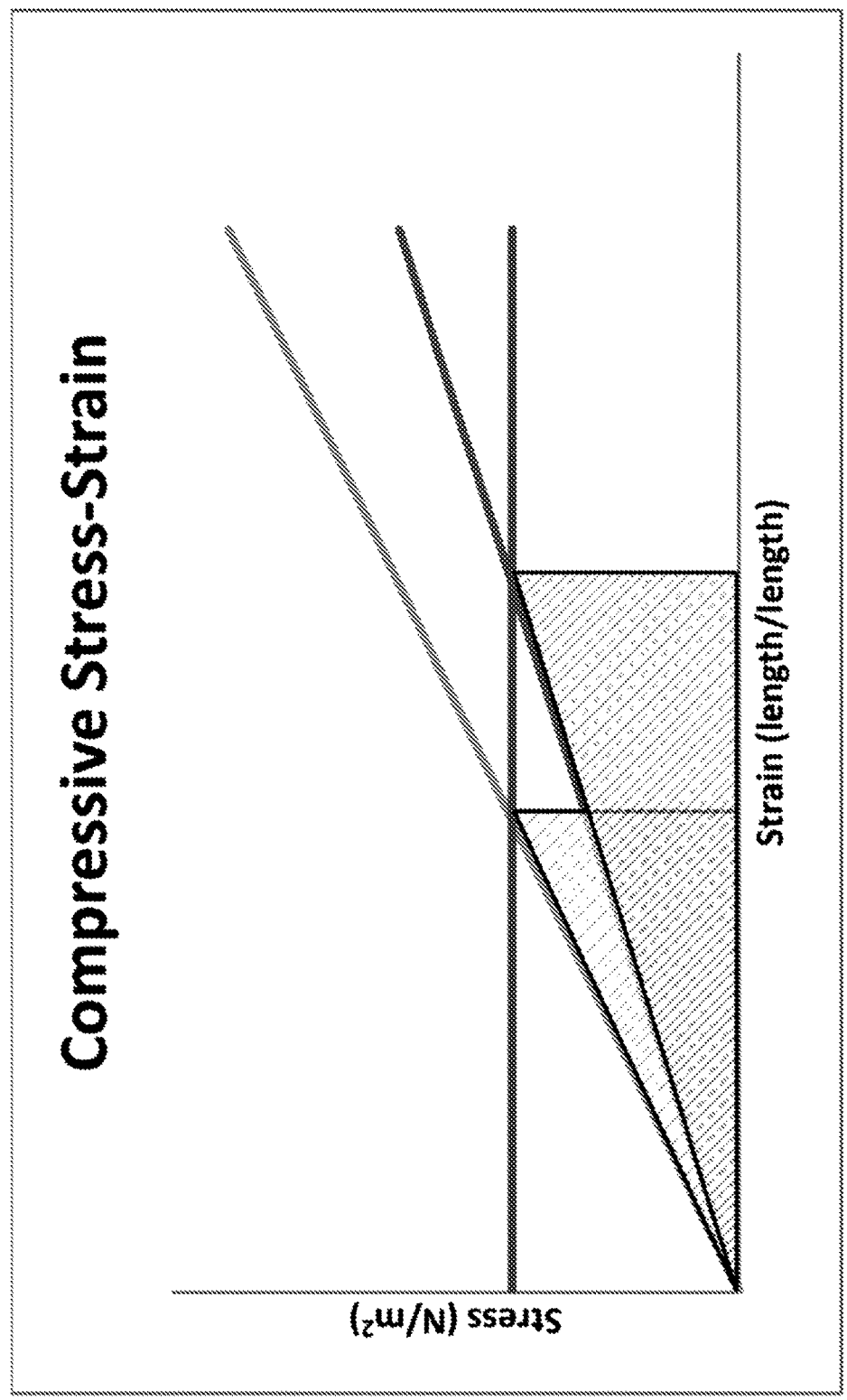
FIG. 5.3

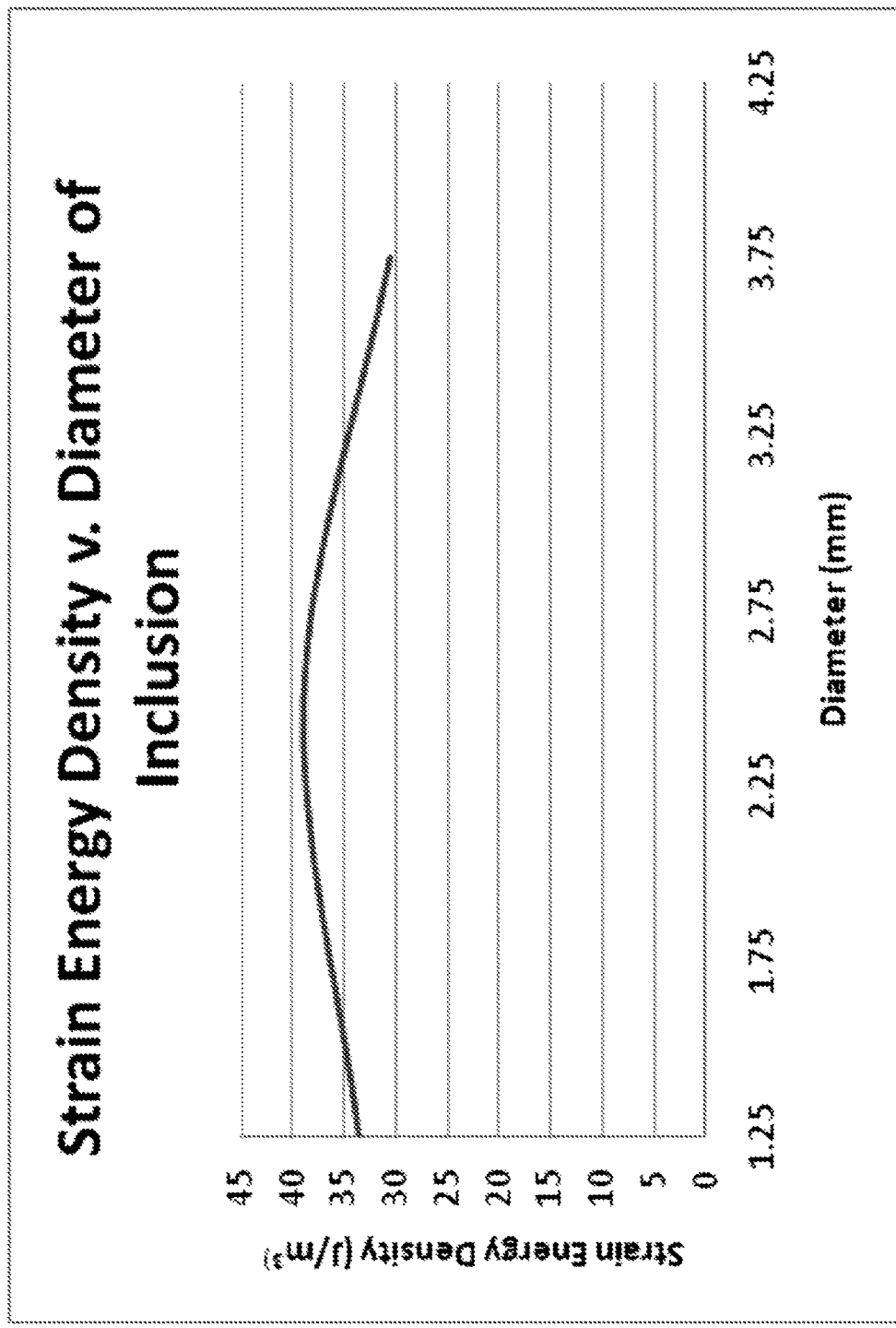
FIG. 5.4

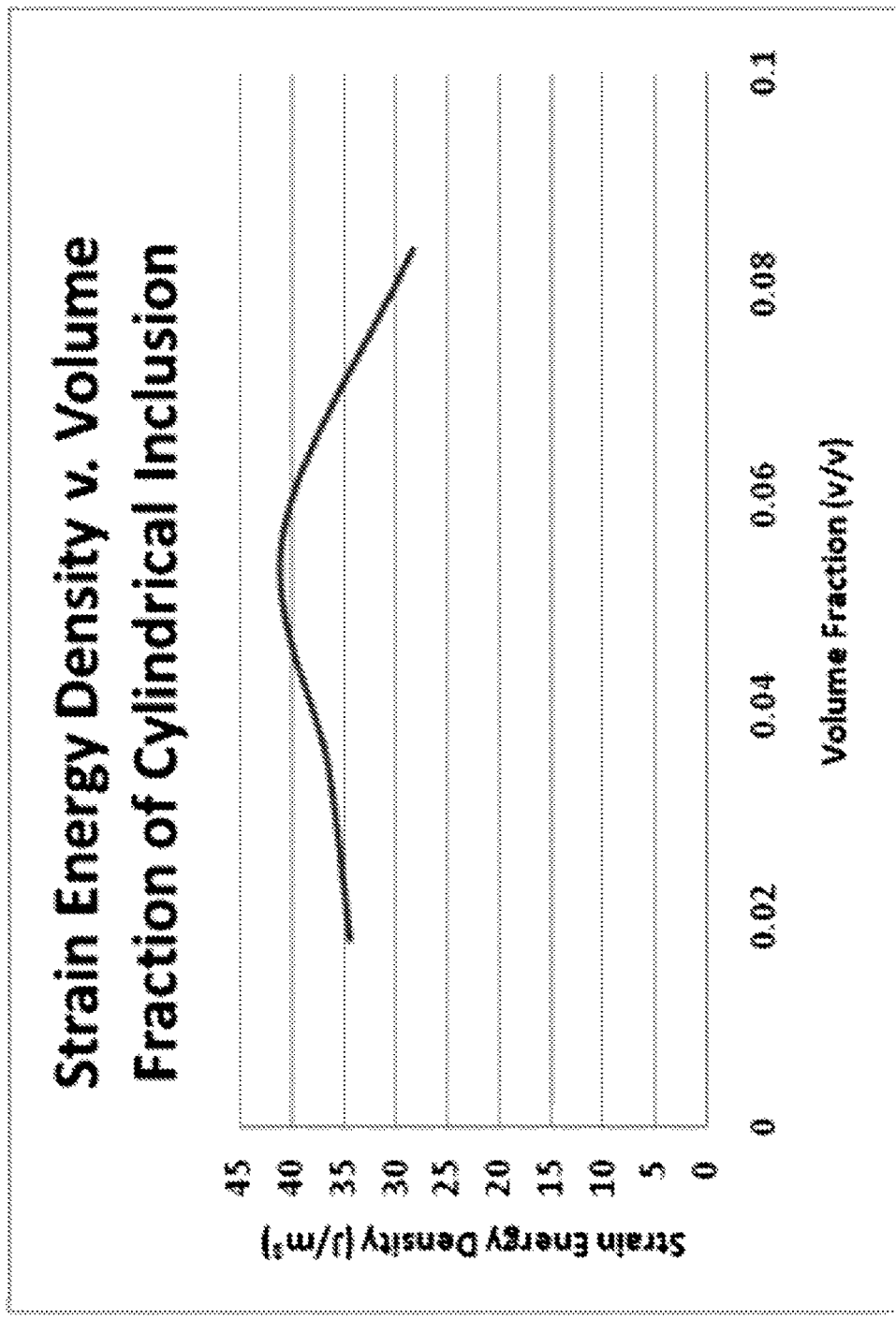
FIG. 5.5

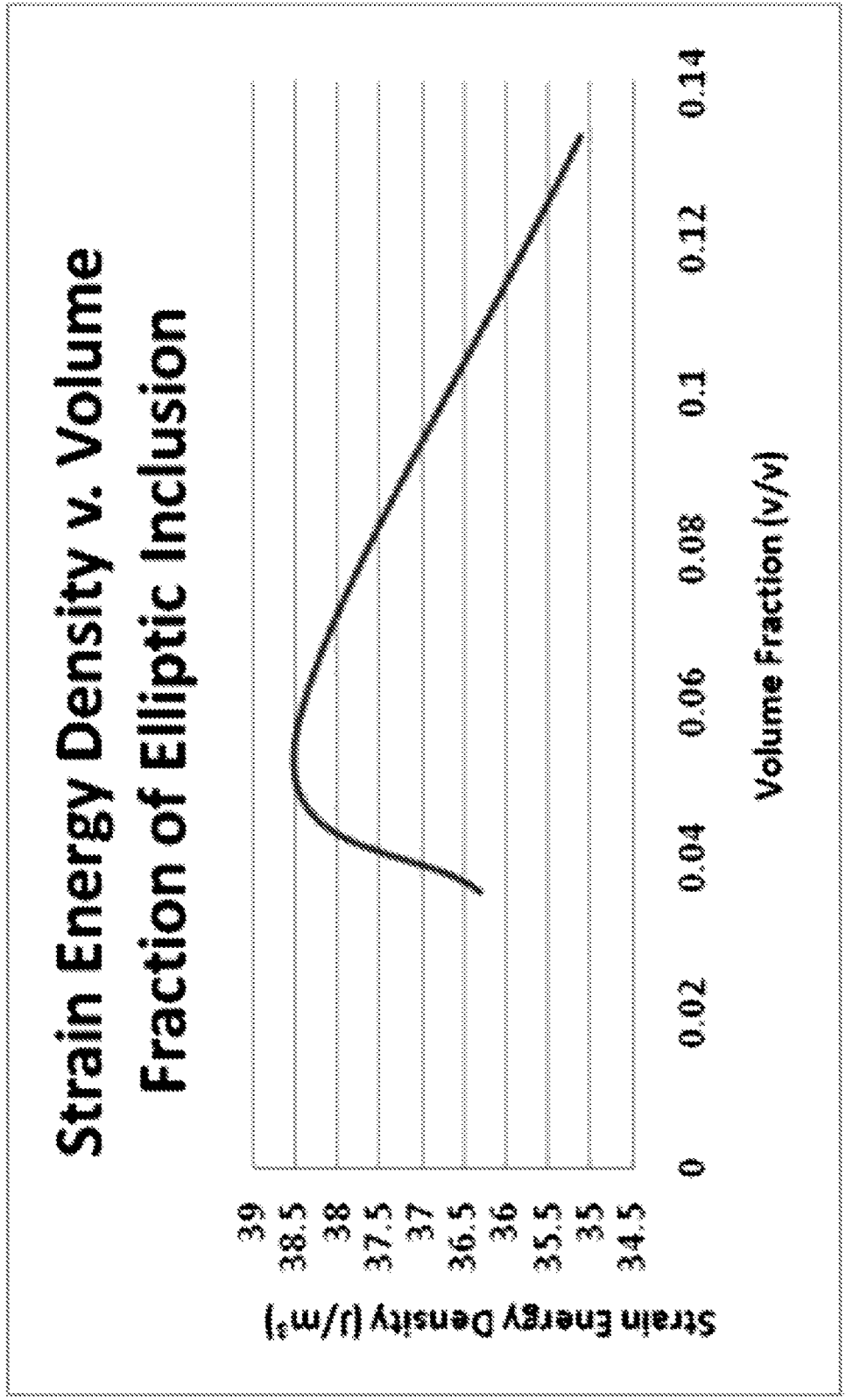
FIG. 5.6

METHOD OF MAKING A BLAST OR SHOCK WAVE MITIGATING MATERIAL

CROSS REFERENCE TO RELATED APPLICATION

This application is a divisional of U.S. patent application Ser. No. 13/787,754, filed on Mar. 6, 2013, now U.S. Pat. No. 9,056,983, which issued on Jun. 16, 2015, and is a continuation-in-part application of International Patent Application No. PCT/US2012/54335, filed on Sep. 8, 2012, entitled DYNAMIC LOAD-ABSORBING MATERIALS AND ARTICLES which claims the benefit of Provisional Patent Application No. 61/532,676, filed Sep. 9, 2011, entitled IMPACT ABSORBING MATERIALS AND ARTICLES FORMED THEREWITH, each application is hereby incorporated by reference in its entirety into the present application.

FIELD OF THE INVENTION

Some embodiments of the present invention pertain to materials that absorb and dissipate energy from impacts, and in particular embodiments pertaining to resilient materials the collapse of which occurs progressively among a plurality of feature lengths, or material for which the vibratory response occurs progressively among a plurality of feature lengths.

BACKGROUND OF THE INVENTION

Materials capable of absorbing impacts find a wide variety of uses, including protective gear and equipment such as helmets for sporting activities, motorcycles and bicycles. While significant advances have been achieved in impact-absorbing materials, the majority of fatal motorcycle and bicycle-related deaths involve head injuries, of which at least some could be prevented by improved helmet designs. American football is another example of an activity in which head injuries occur, reportedly at a rate of more than 36,000 head injuries per year.

What is needed are impact-absorbing materials that provide improved dissipation of energy. Various embodiments of the present invention do this in novel and nonobvious ways.

SUMMARY OF THE INVENTION

A compound for protection of an object from a blast or shock wave is disclosed. The compound includes a matrix material including at least three sizes of stress-concentrating features, including a plurality of first features having a first average characteristic dimension of between about ten microns and about two hundred microns, a plurality of second features having a second average characteristic dimension that is at least about one order of magnitude larger than the first average characteristic dimension, and a plurality of third features having a third average characteristic dimension that is at least about one order of magnitude larger than the second average characteristic dimension. The material proximate to the first, second, and third features progressively buckles upon application of the load, such that material proximate the third features tends to deform before the deformation of material proximate to the second and first features, and material proximate the first features tends to deform after the deformation of material proximate to the second and third features. A plurality of features belonging to any one of first, second, or third features are filled with a fluid other than air.

A method of making a blast or shock wave mitigating material is disclosed. The method includes providing a compound that is curable to form a polymer, providing a mold cavity having an internal height adapted and configured to produce the polymer suitable to be used in a helmet or as a sheet of material to be used in blast protection panel, the mold cavity configured to provide geometric features within the cured polymer. The method further includes placing the compound in the mold cavity, curing the compound for at least about five minutes, exposing the mixture in the mold cavity to pressure less than ambient pressure after said permitting. The method further includes removing the substantially polymerized material from the mold, filling the geometric features with a fluid, and forming the material as an interior portion of a helmet or as the blast protection panel.

BRIEF DESCRIPTION OF THE FIGURES

Some of the figures shown herein may include dimensions. Further, some of the figures shown herein may have been created from scaled drawings or from photographs that are scalable. It is understood that such dimensions, or the relative scaling within a figure, are by way of example, and not to be construed as limiting.

FIG. 3 is a graph representing a force-deflection plot of a type of impact-absorbing material according to one embodiment of the present invention, and including two embodiments schematically represented in FIG. 3.

FIG. 4.1. Single degree-of-freedom spring-mass-damper system with rigid mass (m), linear spring constant (K), dashpot (C), input (F(t)), and impending motion (x).

FIG. 4.3. Schematic of single degree-of-freedom mass-spring-damper experimental setup with an arbitrary material sample.

FIG. 4.4. Single degree-of-freedom experimental setup, including the stabilized mass spring-damper system, piezoelectric gun, (A) back accelerometer, and (B) front accelerometer.

FIG. 4.5 Representative energy spectral density for $Si_{40}$ (a) and $Si_{80}$ (b) pure silicone samples compared to Material I, Material II, and Material III materials given an impulse input. $Si_{40}$ and Material III attenuate higher frequencies better than Material I and Material II.

FIG. 4.6. Representative system response to an impulse for pure silicone samples, $Si_{40}$ (a) and $Si_{80}$ (b), compared to Material I, Material II, and Material III. Both $Si_{40}$ and $Si_{80}$ have responses similar to that of the Material III material.

FIG. 4.7. Natural frequency for pure silicone samples is negatively correlated to thinning percentage of silicone.

FIG. 4.8. Damping coefficient for pure silicone samples is positively correlated to thinning percentage of silicone.

FIG. 4.9. Representative energy spectral density for Microfyne series samples, $70Si_{40}$—$30G_{MF}$ (a), $60Si_{40}40G_{MF}$ (b), $70Si_{80}30G_{MF}$ (c), and $60Si_{80}40G_{MF}$ (d) compared to Material I, Material II, and Material III materials given an impulse input. The Microfyne series samples have responses similar Material I and Material II, with low attenuation at higher frequencies.

FIG. 4.10. Representative system response to an impulse for Microfyne series samples, $70Si_{40}30G_{MF}$ (a), $60Si_{40}40G_{MF}$ (b), $70Si_{80}30G_{MF}$ (c), and $60Si_{80}40G_{MF}$ (d), compared to Material I, Material II, and Material III. The $Si_{40}$ samples tend to have responses similar to the Material I and Material II, whereas, the $Si_{80}$ samples tend to have responses similar to the Material III.

FIG. 4.11. Both $Si_{40}$ and $Si_{80}$ samples have a positive correlation between natural frequency and volume fraction of impregnated graphite. The $Si_{40}$ samples are slightly more sensitive to changes in graphite content than the $Si_{80}$ samples.

FIG. 4.12. Both $Si_{40}$ and $Si_{80}$ samples have a positive correlation between damping coefficient and volume fraction of impregnated graphite. The $Si_{40}$ samples are slightly more sensitive to changes in graphite content than the $Si_{80}$ samples.

FIG. 4.13. Representative energy spectral density for #2 Medium Flake series samples, $70Si_{40}30G_{\#2}$ (a), $60Si_{40}40G_{\#2}$ (b), $70Si_{80}30G_{\#2}$ (c), and $60Si_{80}40G_{\#2}$ (d) compared to Material I, Material II, and Material III materials given an impulse input. The $Si_{40}$ samples have responses similar Material I and Material II, with low attenuation at higher frequencies. Attenuation at high frequencies is slightly better in the $Si_{80}$ samples.

FIG. 4.14. Representative system response to an impulse for #2 Medium Flake series samples, $70Si_{40}30G_{\#2}$ (a), $60Si_{40}40G_{\#2}$ (b), $70Si_{80}30G_{\#2}$ (c), and $60Si_{80}40G_{\#2}$ (d), compared to Material I, Material II, and Material III. Both $Si_{40}$ and $Si_{80}$ samples have similar responses, with notable mitigation of peak amplitude, comparable to the Material III response.

FIG. 4.15. Natural frequency of $Si_{40}$ samples is negatively correlated to volume fraction of impregnated graphite. Whereas, natural frequency of $Si_{80}$ samples is positively correlated to volume fraction of impregnated graphite. $Si_{80}$ samples are more sensitive to changes in graphite content than $Si_{40}$ samples.

FIG. 4.16. The damping coefficient of $Si_{40}$ samples is negatively correlated to volume fraction of impregnated graphite. Whereas, the damping coefficient of $Si_{80}$ samples is positively correlated to volume fraction of impregnated graphite. $Si_{80}$ samples are more sensitive to changes in graphite content than $Si_{40}$ samples.

FIG. 4.17. Representative energy spectral density for #1 Large Flake series samples, $70Si_{40}30G_{\#1}$ (a), $60Si_{40}40G_{\#1}$ (b), $70Si_{80}30G_{\#1}$ (c), and $60Si_{80}40G_{\#1}$ (d) compared to Material I, Material II, and Material III materials given an impulse input. The $Si_{40}$ samples have responses similar Material I and Material II, with low attenuation at higher frequencies. Attenuation at high frequencies is slightly better in the $Si_{80}$ samples.

FIG. 4.18. Representative system response to an impulse for #1 Large Flake series samples, $70Si_{40}30G_{\#1}$ (a), $60Si_{40}40G_{\#1}$ (b), $70Si_{80}30G_{\#1}$ (c), and $60Si_{80}40G_{\#1}$ (d), compared to Material I, Material II, and Material III. The $Si_{40}$ samples tend to have responses similar to the Material I and Material II, whereas, the $Si_{80}$ samples tend to have responses similar to the Material III. The $Si_{80}$ have distinctly lower peak magnitudes than the $Si_{40}$ series.

FIG. 4.19. Both $Si_{40}$ and $Si_{80}$ samples have a positive correlation between natural frequency and volume fraction of impregnated graphite. The $Si_{80}$ samples are slightly more sensitive to changes in graphite content than the $Si_{40}$ samples.

FIG. 4.20. Both $Si_{40}$ and $Si_{80}$ samples have a positive correlation between damping coefficient and volume fraction of impregnated graphite. The $Si_{80}$ samples are slightly more sensitive to changes in graphite content than the $Si_{40}$ samples.

FIG. 4.21. Representative energy spectral density for All series samples, $70Si_{40}30G_{All}$ (a), $60Si_{40}40G_{All}$ (b), $70Si_{80}30G_{All}$ (c), and $60Si_{80}40G_{All}$ (d) compared to Material I, Material II, and Material III materials given an impulse input. The $Si_{40}$ samples have responses similar Material I and Material II, with low attenuation at higher frequencies. Attenuation at high frequencies is slightly better in the $Si_{80}$ samples.

FIG. 4.22. Representative system response to an impulse for All series samples, $70Si_{40}$-$30G_{All}$ (a), $60Si_{40}40G_{All}$ (b), $70Si_{80}30G_{All}$ (c), and $60Si_{80}40G_{All}$ (d), compared to Material I, Material II, and Material III. The $Si_{40}$ samples tend to have responses similar to the Material I and Material II, whereas, the $Si_{80}$ samples tend to have responses similar to the Material III, characterized by low peak magnitude.

FIG. 4.23. Both $Si_{40}$ and $Si_{80}$ samples have a positive correlation between natural frequency and volume fraction of impregnated graphite. The $Si_{80}$ samples are slightly more sensitive to changes in graphite content than the $Si_{40}$ samples.

FIG. 4.24. Both $Si_{40}$ and $Si_{80}$ samples have a positive correlation between damping coefficient and volume fraction of impregnated graphite. The $Si_{80}$ samples are slightly more sensitive to changes in graphite content than the $Si_{40}$ samples.

FIG. 5.1. Variation of geometry size (a-c), number (d-g), and shape (h-j).

FIG. 5.2. If two materials of the same geometry but different material properties are given a uniform strain input, the material with the higher modulus (Green) will always have the largest area under the curve and therefore, the highest strain energy.

FIG. 5.3. If two materials of the same geometry but different material properties are given a uniform stress input, the material with the lower modulus (Blue) will always have the largest area under the curve and therefore, the highest strain energy.

FIG. 5.4 is a graphical depiction of the relationship between maximum strain energy and increasing inclusion diameter according to another embodiment of the present invention.

FIG. 5.5 is a graphical depiction of the relationship between maximum strain energy and volume fraction of cylindrical inclusion according to another embodiment of the present invention.

FIG. 5.6 is a graphical depiction of the relationship between maximum strain energy and volume fraction of cylindrical inclusion according to another embodiment of the present invention.

DETAILED DESCRIPTION OF THE INVENTION

Figure 1:
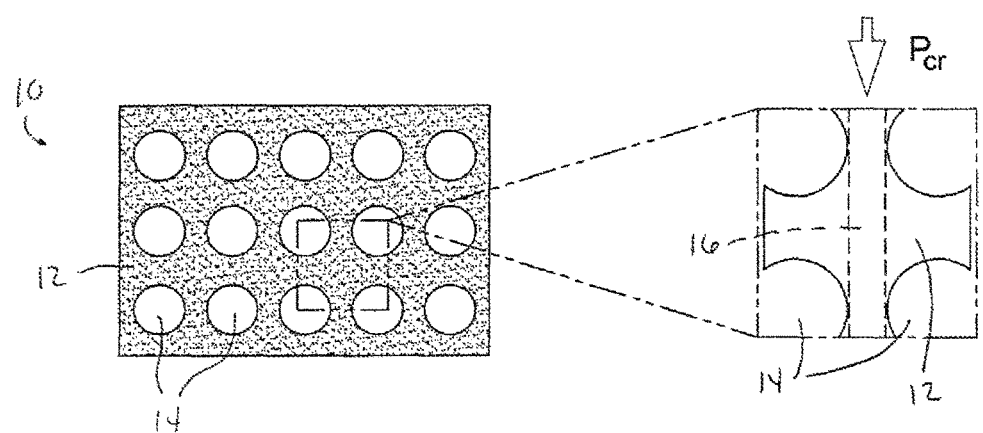
FIG. 1 schematically represents the geometry of a conventional foam material and buckling columns defined thereby.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. At least one embodiment of the present invention will be described and shown, and this application may show and/or describe other embodiments of the present invention. It is understood that any reference to "the invention" is a reference to an embodiment of a family of inventions, with no single embodiment including an apparatus, process, or composition that should be included in all embodiments, unless otherwise stated. Further, although there may be discussion with regards to "advantages" provided by some embodiments of the present invention, it is understood that yet other embodiments may not include those same advantages, or may include yet different advantages. Any advantages described herein are not to be construed as limiting to any of the claims.

The use of an N-series prefix for an element number (NXX.XX) refers to an element that is the same as the non-prefixed element (XX.XX), except as shown and described thereafter The usage of words indicating preference, such as "preferably," refers to features and aspects that are present in at least one embodiment, but which are optional for some embodiments. As an example, an element 1020.1 would be the same as element 20.1, except for those different features of element 1020.1 shown and described. Further, common elements and common features of related elements are drawn in the same manner in different figures, and/or use the same symbology in different figures. As such, it is not necessary to describe the features of 1020.1 and 20.1 that are the same, since these common features are apparent to a person of ordinary skill in the related field of technology.

Although various specific quantities (spatial dimensions, temperatures, pressures, times, force, resistance, current, voltage, concentrations, wavelengths, frequencies, heat transfer coefficients, dimensionless parameters, etc.) may be stated herein, such specific quantities are presented as examples only, and further, unless otherwise noted, are approximate values, and should be considered as if the word "about" prefaced each quantity. Further, with discussion pertaining to a specific composition of matter, that description is by example only, and does not limit the applicability of other species of that composition, nor does it limit the applicability of other compositions unrelated to the cited composition.

What will be shown and described herein, along with various embodiments of the present invention, is discussion of one or more tests that were performed. It is understood that such examples are by way of examples only, and are not to be construed as being limitations on any embodiment of the present invention. It is understood that embodiments of the present invention are not necessarily limited to or described by the mathematical analysis presented herein.

The invention is directed to impact-absorbing materials or vibration-isolating materials that are capable of absorbing substantially more energy than conventional foam materials typically used as cushioning materials in various applications, including but not limited to football, motorcycle, and other types of helmets, as well as other applications in which impacts, shocks, or vibratory inputs are to be absorbed to protect a living body or inanimate object, the latter of which includes electronic and mechanical systems. Impact-absorbing materials of this invention can be tailored to absorb energy, for example, isolate a person's head from impact (or other multiple-exposure event), and/or to disrupt blast/shock waves and provide an impedance mismatch so as to ameliorate the effects of blast waves (or other events that tend to occur as a single exposure). Although reference will be made to impact-absorbing materials, it is understood that such reference is a non-limiting example, and the various methods and apparatus described herein are also applicable for structures in which transient or stead-state vibratory or acoustic loads (transmitted by any means, including by structure or as gas pressure waves) are encountered and preferably dissipated.

Figure 2:
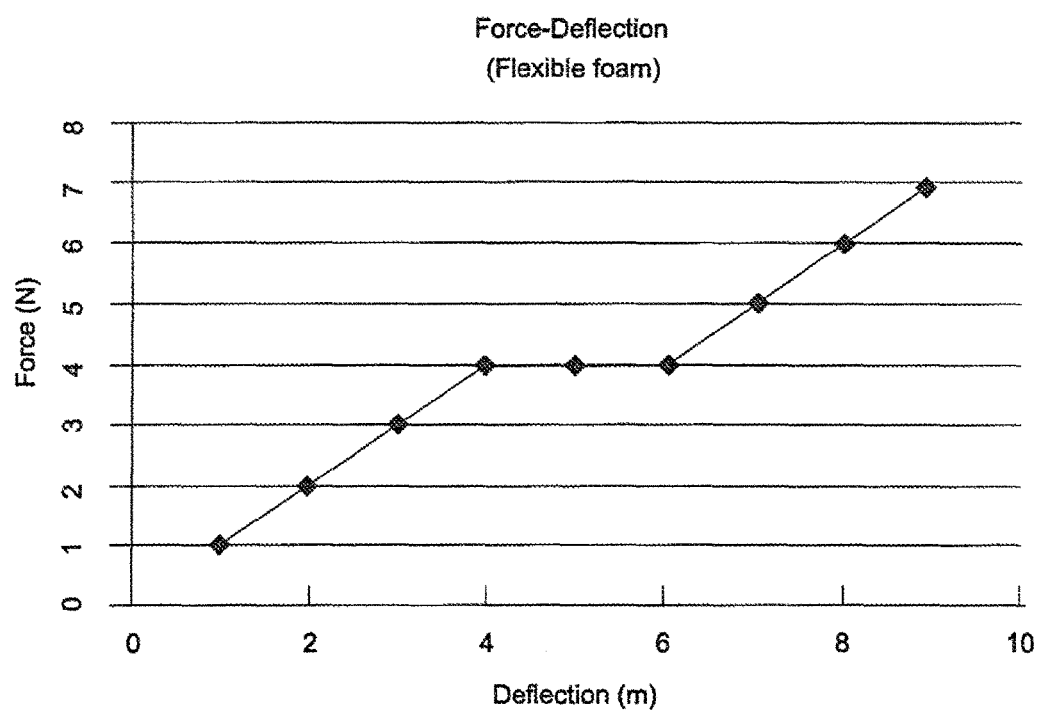
FIG. 2 is a graph representing a typical force-deflection plot of a conventional foam material of the type represented in FIG. 1.

As will be discussed below, impact-absorbing materials of this invention generally have a functionally graded characteristic as a result of containing hierarchy of inclusions, wherein the inclusions differ in size, quantity, shape and/or composition within the impact-absorbing material to enable the impact-absorbing to absorb substantially more energy as a result of the inclusions synergistically cooperating to cause a gradual change in one or more properties of the material. As a nonlimiting example, in one embodiment the impact-absorbing material comprises a layered or laminate-type structure that includes at least two layers or tier regions, each differing in terms of composition and/or physical construction. Each of the tier regions comprises a matrix material in which inclusions are dispersed, with at least the inclusions differing in terms of size, quantity, shape and/or composition so that the inclusions are hierarchically arranged within the impact-absorbing material and, as the impact-absorbing material is compressed, at least one property of the material gradually and continuously changes to absorb more energy than conventional foam materials. The property may be, for example, the stiffness, elasticity, viscoelasticity, plasticity, and/or failure mode of the material. This distinction is illustrated in FIGS. 2 and 3. FIG. 1 schematically represents a conventional foam material 10 comprising a solid matrix 12 in which pores (voids) 14 are dispersed. The detailed view of FIG. 1 represents that the mechanical properties of conventional foam materials heavily rely on the mechanics of the cell walls 16, which serve as buckling columns that bear the load of a force applied to the foam material 10. The critical buckling force, $P_{cr}$, is determined by the properties of the cell walls 16, including Young's modulus (E), moment of inertia (I), and length (L), as seen in Equation 1 below.

$$P_{cr} = \pi^2 EI/L^2$$

There are several ways to classify foam materials and analyze common relationships, including stress-strain, force-deflection, cyclic behavior, and stress relaxation. Force-deflection plots are a simple way to determine the load-bearing characteristics of foam materials. FIG. 2 represents a force-deflection plot that demonstrates a flaw of many flexible foam materials—saturation. Saturation occurs when the load continues to increase, but deflection does not follow the input load, causing large stress concentrations on the contact surface (the surface of the material 10 facing the buckling force, $P_{cr}$, in FIG. 1). FIG. 2 is a typical force-deflection curve for a conventional foam material of the type represented in FIG. 1. FIG. 2 illustrates that, because of their load-bearing behavior, foam materials of the type represented in FIG. 1 exhibit a force-deflection curve that is level over a significant portion of the deformation/deflection range. Within the level region of the curve, the foam material 10 is not absorbing the load in a manner that would safely protect a living body or inanimate object protected by the material 10.

FIG. 3 represents two embodiments of impact-absorbing materials 20 within the scope of the invention, as well as a force-deflection curve representing the load-bearing behaviors of the materials 20. Generally speaking, each material 20 comprises a solid matrix 22 in which inclusions 24 are dispersed. The inclusions 24 may be pores (voids) or some form of solids that fill what would otherwise be voids in the matrix 22. Notably, and as mentioned above, each impact-absorbing material 20 has a layered structure. In the embodiments of FIG. 3, the layered structure comprises three layers or tier regions 26, 28 and 30, though the use of two tier regions or more than three tier regions is also within the scope of the invention. The tier regions 26, 28 and 30 may be individually formed as discrete layers that are fused, cast, bonded or laminated to each other, or may be integrally formed so that the matrix 22 is continuous through the regions 26, 28 and 30.

The tier regions 26, 28 and 30 are represented as differing from each other in terms of their composition, geometry and/or physical construction, such that the properties of each tier region 26, 28 and 30 are distinctly different as a result of each tier region 26, 28 and 30 having unique characteristics that differ from tier region to tier region. More specifically, the tier regions 26, 28 and 30 can be arranged in such manner as to promote a synergistic energy absorption effect. In the illustrated example, the most compliant tier region 26 forms an outermost surface 32 of the material 20 that will serve as the contact surface of the material 20 or otherwise initially bear the load applied to the material 20, whereas the least compliant tier region 28 defines the innermost surface 34 of the material 20 that is last to be subjected to the load applied to the material. The intermediate tier region 30 has a compliance that is between those of the tier regions 26 and 28. Ideally, as the most compliant tier region 26 saturates, the tier region 30 begins to deflect, and finally as the tier region 30 saturates, the least compliant tier region 28 begins to deflect.

In FIG. 3, the tier regions 26, 28 and 30 are represented as differing on the basis of the number or size of their respective inclusions 24. Specifically, the embodiment on the left hand side of FIG. 3 is characterized by inclusions 24 that are of the same size (volume), but the tier regions 26, 28 and 30 contain different numbers of the inclusions 24 (inclusions 24 per unit volume of the matrix 22). More particularly, the number of inclusions 24 gradually decreases from the tier region 26 that forms the outer surface 32 of the material 20 toward the tier region 28 that forms the opposite inner surface 34 of the material 20. In contrast, the embodiment on the right hand side of FIG. 3 is characterized by the tier regions 26, 28 and 30 containing the same number of inclusions 24 (inclusions 24 per unit volume of the matrix 22), but the tier regions 26, 28 and 30 contain inclusions 24 of different sizes (volumes). More particularly, the sizes of the inclusions 24 gradually decrease from the tier region 26 that forms the surface 32 of the material 20 toward the tier region 28 that forms the opposite surface 34 of the material 20. In each tier region 26, 28 and 30, the inclusions 24 are represented as being uniformly dispersed, in other words, the distances between immediately adjacent inclusions 24 within a tier region 26, 28 or 30 are approximately the same.

Synergistic energy absorption exhibited by the impact-absorbing materials 20 can be represented by the force-deflection curve of FIG. 3, whereby the impact-absorbing materials 20 do not exhibit a single saturation level, but instead exhibit multiple minimized saturation levels, such that the force-deflection plot tends toward a linear relationship. As the impact-absorbing materials 20 are compressed, they more gradually and more continuously stiffen to absorb more energy in comparison to the conventional foam material 10 of FIG. 1. As a result, the impact-absorbing materials 20 more efficiently absorb the load in a manner that will more safely protect a living body or inanimate object protected by the materials 20.

A wide variety of materials can be used as the matrices 22 of the impact-absorbing materials 20, nonlimiting examples of which include polymeric materials such as silicone, polycarbonate, polyurethane, foam materials, natural and synthetic rubbers, polyethylene, ultra-high molecular weight polyethylene, etc. In addition, it is foreseeable that ceramic, metallic, and metal matrix ceramic materials could be effective as the matrices 22, depending on the particular application. The sizes of the inclusions 24 are limited only by practical or process-related limitations. Because the inclusions 24 may be voids or solids, their commonality resides in their use to create a hierarchy of inclusions 24 having different effects on the stiffness of their matrices 22 to synergistically promote energy absorption within their matrices 22. Consequently, voids used as the inclusions 24 should vary in their shapes, sizes (right hand side of FIG. 3) and/or number per unit volume (left hand side of FIG. 3) between the tier regions 26, 28 and 30 of the material 20. The voids may be present in the material 20 to result in an open-cell or closed-cell configuration. If the inclusions 24 are in the form of solids, the solids can be formed from a wide variety of materials or material combinations. In other words, all of the insert inclusions 24 in an impact-absorbing material 20 could have the very same composition but differ in number per unit volume (left hand side of FIG. 3) or size (right hand side of FIG. 3). As energy is absorbed by the impact-absorbing material 20, the differing properties of the inclusions 24 are able to create different energy absorbing deformations that exhibit a gradual change of properties within the material 20. As previously noted, such properties include the stiffness, elasticity, viscoelasticity, plasticity, and/or failure mode of the material 20.

Optionally, the sizes or numbers of the void inclusions may differ from tier region to tier region on the basis of a geometric ratio, which may be linear, exponential, etc. In this manner, the impact-absorbing materials 20 represented in FIG. 3 approach what may be termed a fractal.

Figure 4:
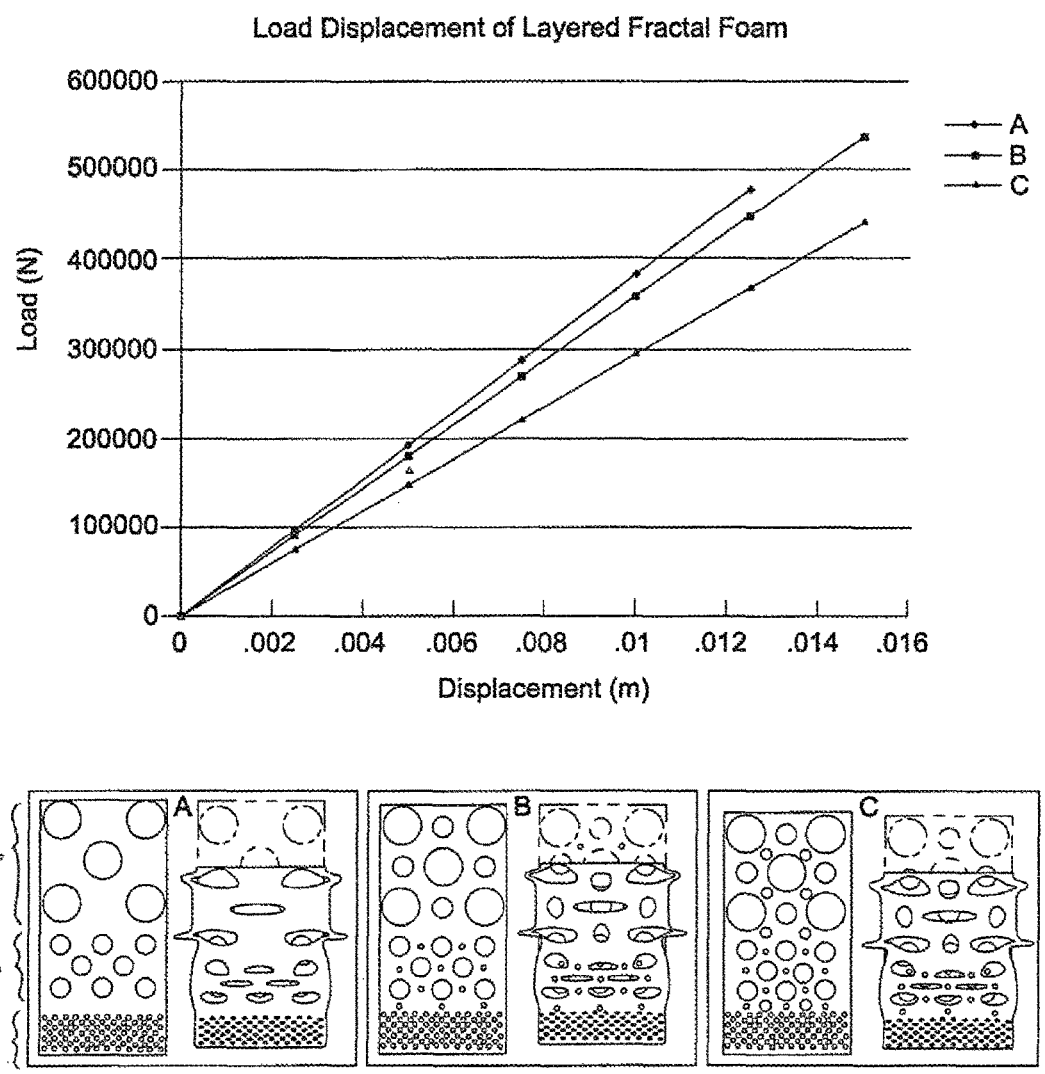
FIG. 4 is a graph representing load-displacement plots for three embodiments of impact-absorbing materials (A, B and C) schematically represented in FIG. 4.

During investigations leading to the present invention, iterative modeling of various impact-absorbing materials was completed, which served as the basis for the fabrication of test samples. During one phase of the investigation, force-deflection characteristics were analytically modeled for impact-absorbing materials represented in FIG. 4. The material of FIG. 4A has tier regions 26, 28 and 30 that differ in both number and size of void inclusions, such that the tier region 26 is the most compliant and the tier region 28 is the least compliant as a result of the relative size and number of their void inclusions. The material of FIG. 4B is similar to FIG. 4A, but further incorporates void inclusions into the tier region 26 that are of the same size as void inclusions present in the intermediate tier region 30. The material of FIG. 4C is similar to FIG. 4A, but further incorporates void inclusions into the tier region 26 that are of the same size as void inclusions present in the least compliant tier region 28.

For each configuration of impact-absorbing material in FIG. 4, an illustration is provided that represents the predicted model of the synergistic energy absorption exhibited by the material during compression. The results from this phase of the investigation are plotted in the graph of FIG. 4. Generally speaking, as the porosity increased, the critical buckling load decreased. Another effective measure of the properties of the materials is to observe how the void inclusions affect the strain energy density of the materials, which is essentially the amount of energy the materials absorb. Strain energy plots for the impact-absorbing materials in FIG. 4 are provided in FIG. 5.

From the above investigations, it was concluded that as porosity increases, strain energy density decreases. This conclusion suggested that simply increasing the number of void inclusions may not be optimal for increasing the amount of energy absorbed by the impact-absorbing material. During additional investigations, the void inclusions of FIGS. 4A, 4B and 4C were modeled as containing water. The strain energy densities of the materials increased with increasing fluid-filled pores, suggesting that energy absorption may be more efficiently increased by inclusions that are filled with matter, for example, a solid or a liquid (such as a shear thickening fluid (STF)).

Figure 6:
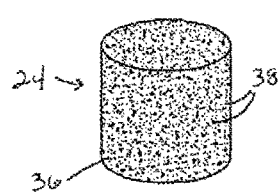
FIGS. 6 and 7 schematically represent perspective views of two types of reinforcement elements suitable for incorporation into impact-absorbing materials in accordance with additional embodiments of the invention.
Figure 7:
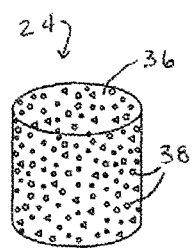

FIGS. 6 and 7 schematically represent two solid inclusions 24 that comprise a matrix 36 containing a dispersed phase 38. The insert inclusions 24 of FIGS. 6 and 7 differ by the size and amount of their respective dispersed phases 38. An impact-absorbing material having solid inclusions 24 of the types represented by FIGS. 6 and 7 has, in effect, numerous and much smaller defects (the dispersed phases 38) that can take part in synergistic energy absorption. It is theorized that the interfaces between the dispersed phases 38 and their matrix 36 are capable of dissipating much greater amounts of energy, and thus amplifying the energy-absorption capability of the material 20.

The energy absorption capability of the solid inclusions 24 is believed to depend in part on the material of the matrix 36, the material and size of the dispersed phase 38, the concentration of the dispersed phase 38, etc. Suitable but nonlimiting examples of materials for the insert matrix 36 include those previously noted for the matrix 22 of the impact-absorbing material 20, a notable example of which is silicone or some other elastomeric polymer. Graphite is a particularly suitable but nonlimiting example of a material for the dispersed phase 38. The dispersed phase 38 may comprise nano-sized and/or micro-sized particles, though larger particle sizes are also possible. In addition, the use of a dispersed phase 38 having a distribution of sizes within the solid inclusions 24 may be advantageous, for example, to dissipate energy at different wavelengths.

FIGS. 8 through 17 depict additional embodiments of impact-absorbing materials that contain solid inclusions 24, for example, of the type represented in FIGS. 6 and 7. In these figures, consistent reference numbers are used to identify the same or functionally equivalent elements, for example, the matrix 22, inclusions 24, tier regions 26, 28 and 30, and surfaces 32 and 34 of the materials 20. In view of similarities between the embodiments of FIGS. 3 through 5 and 8 through 17, the following discussion of FIGS. 8 through 17 will focus primarily on aspects that differ from the embodiment of FIGS. 3 through 5 in some notable or significant manner. Other aspects not discussed in any detail can be, in terms of structure, function, materials, etc., essentially as was described for the first embodiment.

Figure 8:
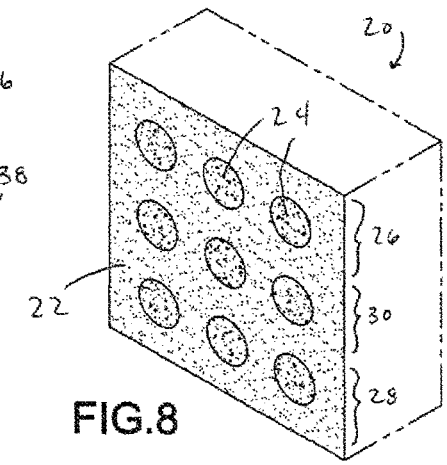
FIGS. 8 through 14 schematically represent different embodiments of impact-absorbing materials in which reinforcement elements of the types represented in FIGS. 6 and 7 have been incorporated in accordance with further embodiments of the invention.
Figure 9:
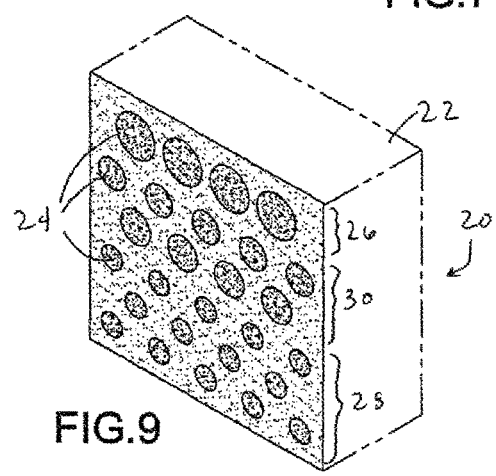
Figure 10:
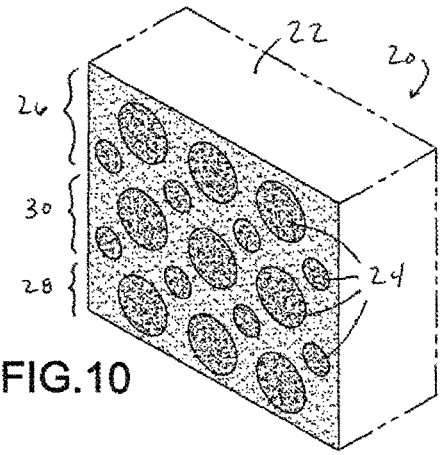
Figure 11:
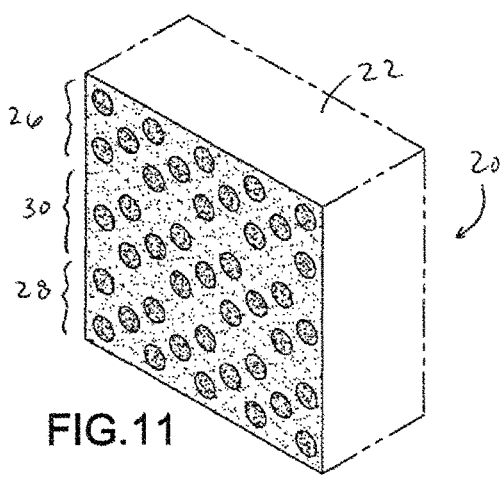
Figure 12:
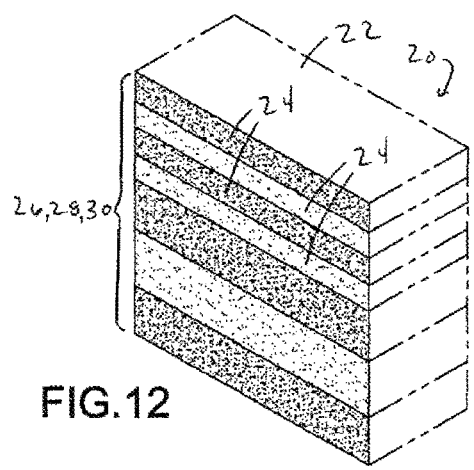
Figure 13:
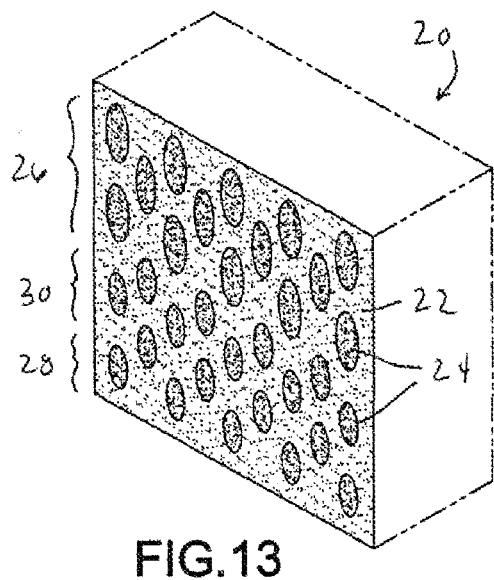
Figure 14:
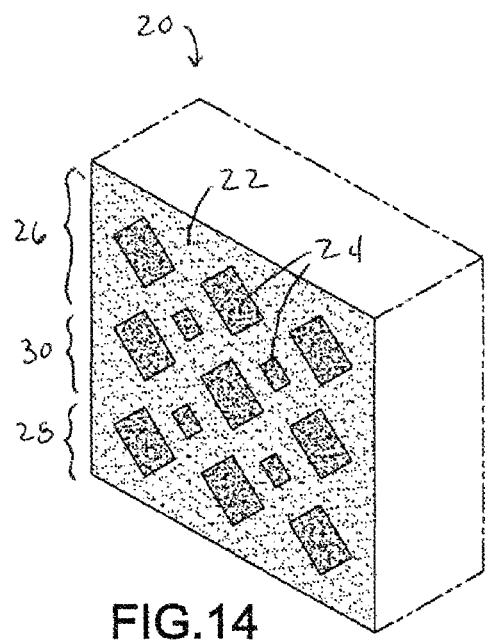

The impact-absorbing materials 20 of FIGS. 8 through 17 are believed to be candidates for high-impact applications, for example, armor, in view of the ability of their matrices 36 and dispersed phases 38 to dissipate greater amounts of energy. In each of FIGS. 8 through 17, the impact-absorbing material 20 contains sets of solid inclusions 24 in different tier regions 26, 28 and 30. However, it should be noted that discrete tiers are not necessary, in that the desired functionally graded characteristic resulting from the hierarchy of inclusions 24 can be achieved with a substantially homogeneous matrix 22 in which the inclusions 24 continuously vary in size, quantity, shape and/or composition in a direction through (e.g., the thickness of) the impact-absorbing material 20. In the embodiment of FIG. 8, the solid inclusions 24 are of equal size (volume) and uniformly dispersed in each of the tier regions 26, 28 and 30. As such, differences in properties between the tier regions 26, 28 and 30 can be achieved through the use of solid inclusions 24 that differ in stiffness, elasticity, viscoelasticity, plasticity, and/or failure mode. In FIG. 9, different properties in the tier regions 26, 28 and 30 are achieved as a result of the regions 26, 28 and 30 containing solid inclusions 24 that differ in number and size. In particular, the solid inclusions 24 decrease in size and number from the tier region 26 to the tier region 30, and finally to the tier region 28. In FIG. 10, the tier regions 26 and 30 contain solid inclusions 24 of two different sizes. In FIG. 11, the solid inclusions 24 of the tier regions 26, 28 and 30 are all the same size, but are formed of different materials so that the inclusions 24 are progressively stiffer in the tier regions 30 and 28 than the preceding regions 26 and 28, respectively. FIGS. 12, 13 and 14 represent solid inclusions 24 having different shapes than those of FIGS. 8 through 11. In FIG. 12, different types (composition, shape, size, etc.) of solid inclusions 24 are uniformly dispersed in individual tier regions 26, 28 and 30 of a matrix 22 formed of a single material or in discrete layers of matrices 22 that can be formed of the same of different materials, and in FIGS. 13 and 14 the inclusions 24 have oval and square cross-sectional shapes.

Figure 15:
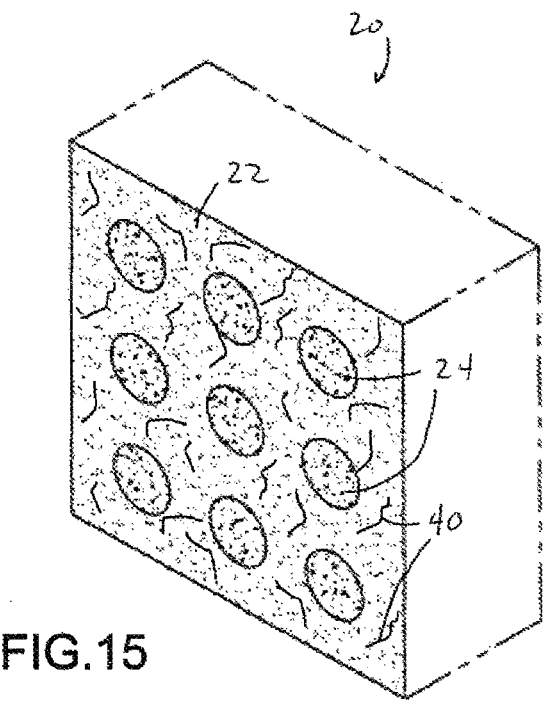
FIGS. 15, 16A-B and 17A-D schematically represent different embodiments of impact-absorbing materials in which reinforcement fiber materials have been incorporated into the impact-absorbing material of FIG. 8.
Figure 16A:
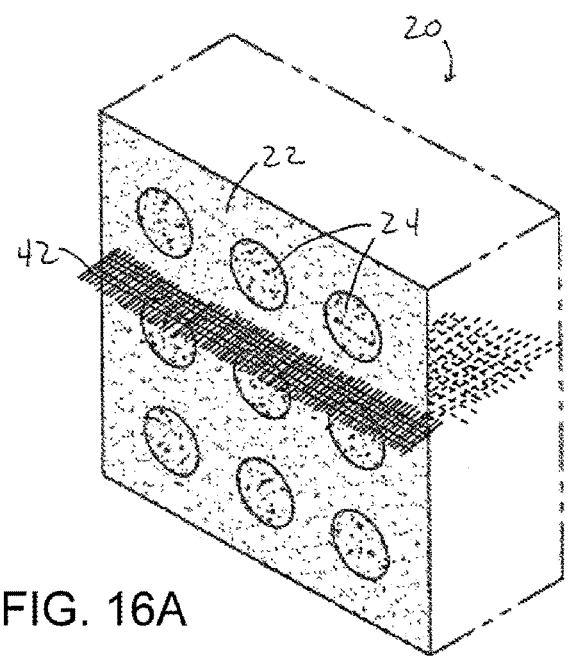
Figure 16B:
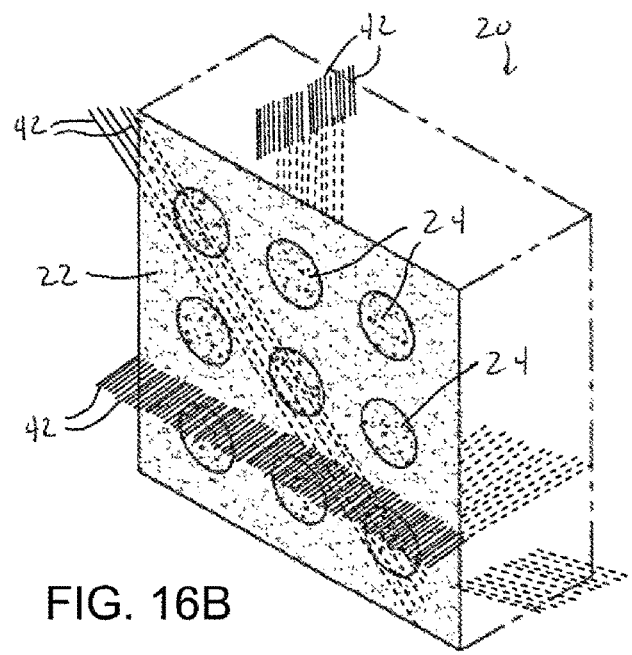
Figure 17A:
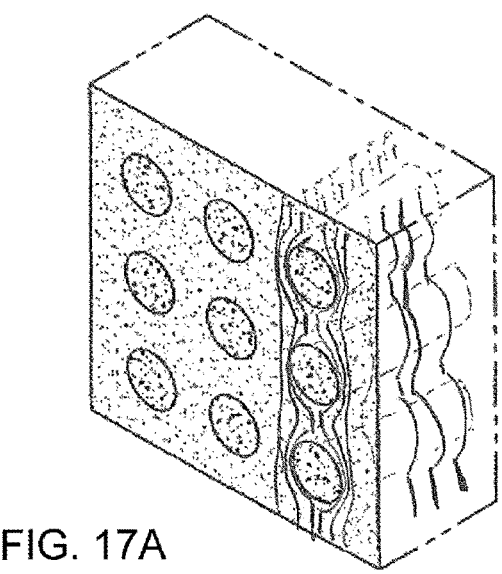
Figure 17B:
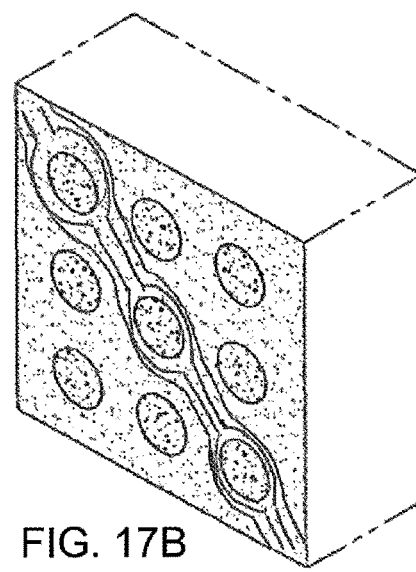
Figure 17C:
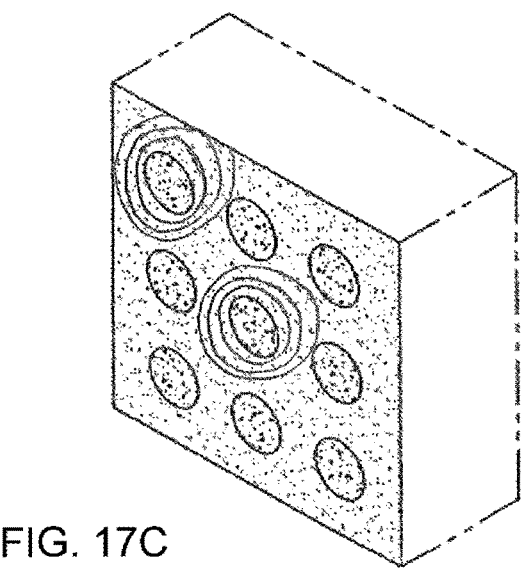
Figure 17D:
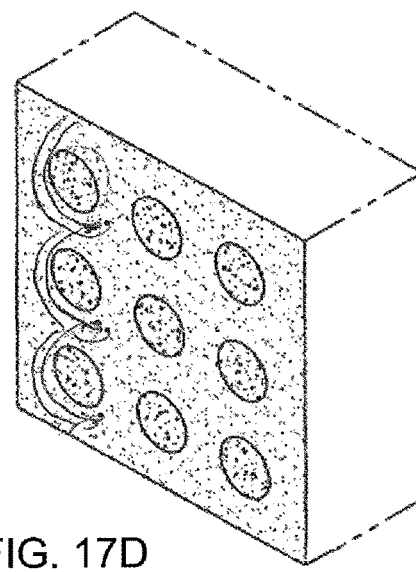

Impact-absorbing material 20 of this invention can also incorporate a reinforcement phase of particles, fibers and/or fabrics, as represented in FIGS. 15 through 17. For example, FIG. 15 represents reinforcement fibers 40 that are dispersed and randomly oriented in the matrix 22 of the impact-absorbing material 20 of FIG. 8, and FIGS. 16A-B and FIGS. 17A-D represent continuous fibers 42 incorporated into the material 20. In FIG. 16A, parallel fibers 42 are woven to form a mesh or fabric, while in FIG. 16B the fibers 42 are not woven and sets of parallel fibers 42 have different orientations within the material 20. FIGS. 17A through D represent other fiber orientations that can be used, including purposely symmetrically misaligned patterns to help reinforce stress flows around certain features in the material 20, for example, holes (FIG. 17A), inclusions (FIG. 17B) and other anomalies, concentric aligned patterns such as circles (FIG. 17C), and spiral or helical patterns around certain features in the material 20, for example, holes, inclusions and other anomalies (FIG. 17D). Reinforcement phases of particles and/or fibers provide another way to achieve synergistic energy absorption, particularly in the event of a fracture occurring in the matrix 22 and/or the fibers 42. Notably, the fibers 42 are capable of absorbing more energy in the event of a fracture than under conditions where the fibers 42 simply deform but do not fracture. Fibers 42 of different diameters are also contemplated. If fibers 42 next to a fiber 42 that fractures have larger diameters than the fractured fiber 42, the larger fibers 42 may deform to the extent that their stresses surpass the yield strength but not the ultimate yield strength of the fiber material, during which energy would be absorbed. Strain associated with such stress may also result in the larger fibers 42 being deformed to the extent that their diameters are locally reduced to something similar to the fiber 42 that fractured, such that a subsequent stress cycle would approximately be a repeat of the prior stress cycle, i.e., the same energy absorbed through fiber breakage. This would allow the material to absorb the same amount of energy in a cyclic fashion rather than only being able to absorb a certain amount of energy once.

Consistent with known composite materials, the mechanical properties of the impact-absorbing material 20 can be modified, including the ability to obtain different properties in different directions, through the use of reinforcement materials having certain compositions, lengths, diameters, densities within the matrix 22, and orientations and weaves (or lack of orientation) within the matrix 22, confining the reinforcement material to layers within the impact-absorbing material 20, etc. Suitable but nonlimiting examples of materials for the fibers 42 include those previously noted for the matrix 22 of the impact-absorbing material 20.

To optimize the impact-absorbing materials 20 of FIGS. 8 through 17 as armor capable of withstanding very large and/or high-velocity impacts, considerable compressive forces should be dissipated. The reinforcement materials represented in FIGS. 15 through 17 promote the ability of the materials 20 to withstand tensile and shear forces that might otherwise cause separation of the materials 20 during a very large and/or high-velocity impact. The materials 20 of FIGS. 8 through 17 (as well as those of FIGS. 3 through 5) can also benefit from being mounted or otherwise supported on a substrate capable of promoting the resistance of the materials 20 to tensile forces.

In addition or as an alternative to a reinforcement phase, the impact-absorbing materials 20 of the invention could contain other additives. For example, fibers or other types of filler materials could be incorporated into the matrix 22 to promote or inhibit various other properties, for example, heat transfer, wicking (moisture transport), fire resistance, water resistance, anti-microbial properties, etc. Furthermore, a solid phase of polymeric pellets, granules, etc., (not shown) could be admixed into an uncured polymer material that forms the matrix 22, and which when subjected to a specified wave energy, such as infrared, ultraviolet, x-ray, etc., particles of the solid phase are caused to bond to each other. In this manner, the matrix 22 could contain a cured polymer phase that is independent of the remaining polymer used to form the balance of the matrix 22.

Various potential manufacturing methods exist by which the impact-absorbing materials 20 can be produced. As previously noted, the tier regions 26, 28 and 30 could be individually fabricated and then fused, cast, laminated or bonded together to form the materials 20. Another option for tier regions 26, 28 and 30 defined within a continuous matrix 22 is to fabricate the material 20 using processes that rely on gravity to cause the inclusions 24 to settle and become more concentrated in the lower tier regions 28 and 30 during curing of the matrix 22. With this approach, visually discrete tiers may not be present, and instead the inclusions 24 may continuously vary in size, quantity, shape and/or composition in a direction through (e.g., the thickness of) the matrix 22 to achieve a desired functionally graded characteristic for the impact-absorbing material 20. Slight deviations, both intentional and unintentional, in the distribution or arrangement of the inclusions 24 within the matrix 22 can be tolerated and still obtain a functionally graded characteristic with the hierarchy of inclusions 24.

Figure 18:
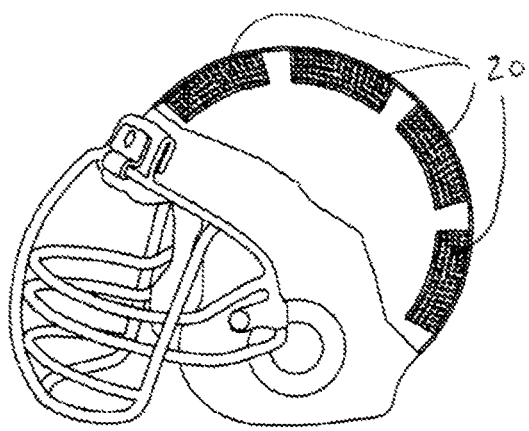
FIGS. 18 through 23 represent various but nonlimiting applications for the impact-absorbing materials of this invention, including the embodiments of FIGS. 3-5 and 8-17.
Figure 19:
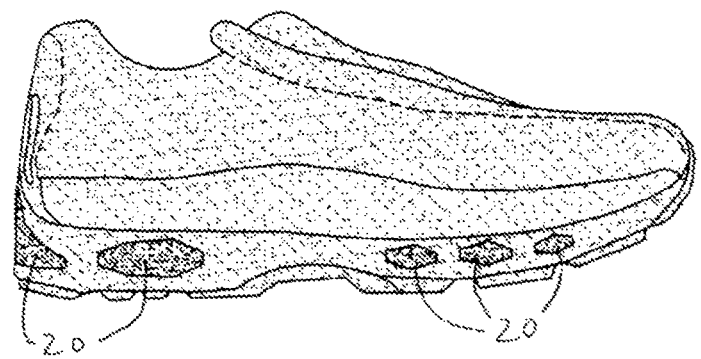
Figure 20:
Figure 21:
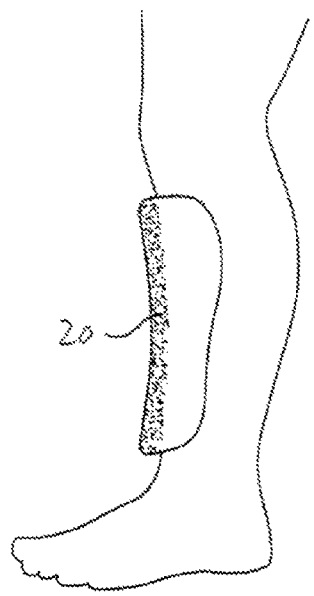
Figure 22:
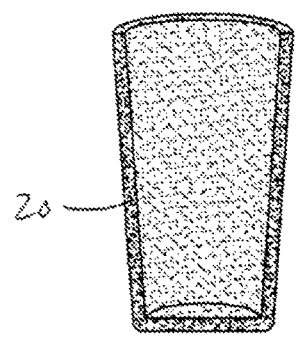
Figure 23:
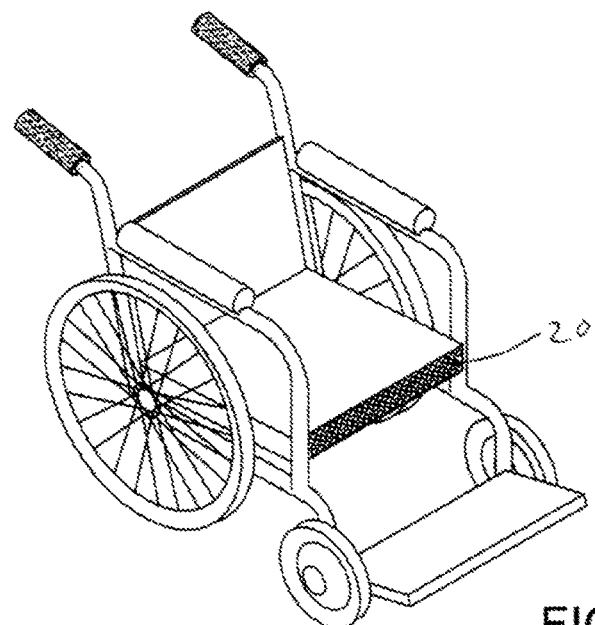

Various applications for the impact-absorbing materials 20 of FIGS. 3 through 5 and 8 through 17 exist, some of which are represented in FIGS. 18 through 23. In FIGS. 18 and 19, multiple individual units of impact-absorbing materials 20 are represented as being discretely incorporated into an American football helmet and an athletic shoe. In FIG. 20, multiple individual units of impact-absorbing materials 20 are represented as being incorporated into a mat, for example, a wrestling mat, anti-fatigue floor mat, wall pad, gymnastics mat, etc. Impact-absorbing materials 20 of this invention can also be used to entirely (or nearly entirely) form articles, for example, a shin-guard (FIG. 21) for use in soccer, prosthetic sockets (FIG. 22), and wheelchair seats (FIG. 23). In each of these examples, the impact-absorbing materials can be mounted or otherwise supported by a shell or backing material capable of promoting the resistance of the materials 20 to tensile forces. Packaging for microelectronic devices is another useful application, particularly for devices that are susceptible to damage from physical shocks. Numerous other potential applications exist, including various other types of helmets (military, motorcycle, hockey, bicycle, etc.), other types of protective athletic equipment (knee pads, hockey/football pads, mouth guards, baseball gloves inserts, softball/baseball sliders, etc.), surfaces of passenger vehicles (coverings for dashes, steering wheels, fronts and backs of bus seats, bicycle seats, undercarriage armoring of military vehicles, etc.), residential and commercial floors, durable medical equipment (air casts, braces, gurneys, crutches, helmets), apparel (for example, cycling shorts), etc.

From the foregoing, it should be appreciated that various factors will affect the overall response of an impact-absorbing material 20 of this invention, and a structure into which the material 20 is incorporated. Such factors include:

Surface area of void inclusions 24 relative to volume (one type of surface area to volume ratio);

Surface area of solid inclusions 24 relative to volume (another type of surface area to volume ratio);

Geometry of inclusions 24 (elliptical, circular, rectangular are some non-limiting examples);

Properties of the matrix material 22 (which could also vary with depth or regionally).

Properties of the inclusions 24 (which could also vary with depth or regionally).

Directionality resulting from orientations of the fibers 42. Small-scale fibers 42 can disrupt blast waves, and larger fibers (cylinders, rods, or more complicated cross sections) can resist impact loads.

Hollow fibers 42 can perform similar functions with minimal mass.

Hollow inclusions 24 might contain a matrix of stiff or brittle material that encircles a pore, providing a lighter overall material, but one that deforms or fails in a very specific way.

Inclusions 24 and fibers 42 can be tailored to fracture or break, for example, to mitigate blast waves as a result of property changes that occur after the inclusions 24 or fibers 42 are broken. It is possible to have a range of fiber sizes or design fibers to fail at a range of loads/energies in order to control the sequence of failure within the microstructure.

Dielectric materials can be used for the matrix material 22, inclusions 24, and/or fibers 42 to provide information about the integrity of the material 20.

Interface properties within the material 20 and between the material 20 and surrounding structures.

Modulus ratio between the matrix material 22 and inclusions 24, as well as a Poisson effects.

Yet another embodiment of the present invention pertains to an impact-mitigating compound 120. In some embodiments, compound 120 is prepared generally in accordance with a process 100 characterized in FIG. 24.

Figure 24:
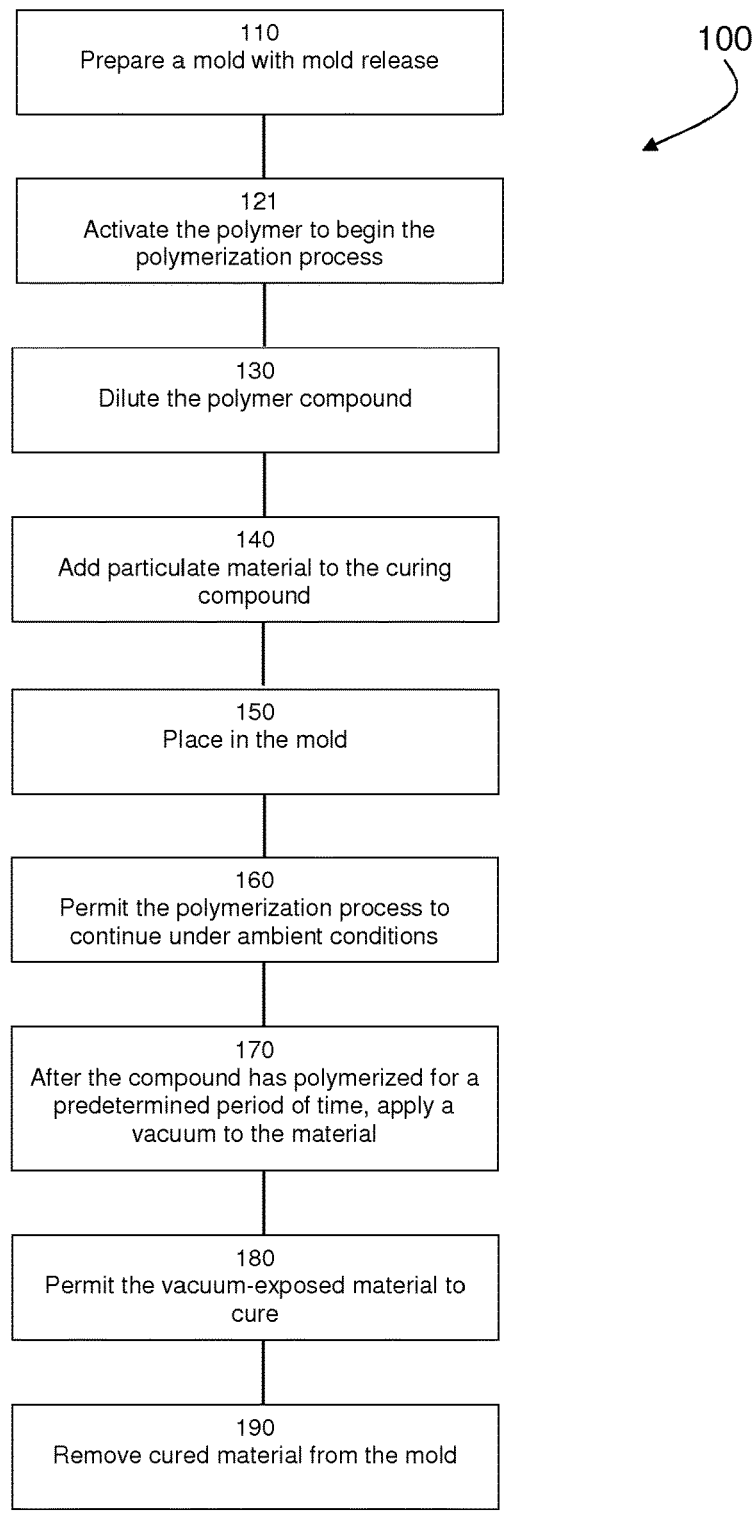
FIG. 24 is a block diagram representing a process for fabricating an impact-absorbing material according to yet another embodiment of the present invention.

In the discussion that follows, reference is made to the various acts or steps of a one-hundred series method as shown in FIG. 24. It is understood that such numbering of acts or steps is not to be confused with element numbering used elsewhere in this document. Further, this document refers to characteristic dimensions of features. Generally, such characteristic dimensions are useful in broadly classifying the size and/or shape of a feature. Non-limiting examples of characteristic dimensions include a diameter for a spherical shape, thickness and/or length for solid particulate matter such as flakes, and thickness and/or length for strut-shaped features. Typically, most of the characteristic dimensions used with relation to voids and inclusions refer broadly to some form of spherical approximation.

Process 100 includes preparing 110 a mold in which uncured compound will be placed, and a cured final material 120 produced. Preferably, the mold includes one or more larger-scale features the imprint of which (either embossed as a void extending into the material or debossed as a raised geometric shape extending outwardly from the surface of the final cured compound). In some embodiments, these larger-scale features have characteristic dimensions roughly in the centimeter range. However, it will also be appreciated that in some other embodiments the characteristic dimension of the larger-scale features are established in relation to a size range for the intermediate-scale features (such as being at least a whole number ratio larger, or an order of magnitude larger, as examples). Further, in some embodiments, the shape of the larger-scale features is selected to not include stress-inducing aspects such as sharp corners. Preferably, the shape of the features is generally smooth, such as all or part of a sphere, smooth cylinder, or elapse-type shape, as non-limiting examples.

Method 100 further includes activating 121 the polymerization process of the material to be molded. In some embodiments, the material mixed together is a two-part room temperature vulcanizing (RTV) silicone rubber material. The mixing of the two parts begins the polymerization and cross-linking of the silicone rubber molecules. However, yet other materials are contemplated by other embodiments of the present invention. One such example includes the use of a single-part RTV compound. Yet other examples include the use of any uncured, non-polymerized, or non-vulcanized material, as examples.

In some embodiments, method 100 further includes diluting 130 the polymer compound, preferably after the polymerization or curing process has begun. Such dilution can be used to affect the hardness of the cured product, and in so doing likewise affects the ability of the final compound to absorb strain energy. In some embodiments, it is preferred to add between about 10 percent to 40 percent by weight of diluent to the activated (curing) material.

In yet other embodiments of the present invention an immiscible, volatile, and low-viscosity organic fluid such as DMSO or acetone is added to the uncured polymer compound. This fluid creates voids in the polymer, and in some embodiments creates voids that are larger than the voids created during the application 170 of subatmospheric pressure. In such embodiments, the curing polymer may not be exposed to subatmospheric pressure during curing, such that the polymer material forms around the organic fluid droplets. After full curing of the polymer, the organic fluid is removed by evaporation, which can be aided by application of a vacuum to the cured material.

Some embodiments further include adding 140 particulate matter to the curing compound. In one embodiment, graphite flakes are added to the polymerizing material. As non-limiting examples, various embodiments of the present invention include the addition of (as referred to at www.graphitestore.com) Microfyne graphite (approx. 325 mesh); #2 Medium Flake (approx. 200 mesh); and #1 Large Flake (approx. 50 mesh). Generally, these mesh sizes correspond to particle diameters of about 40-50 microns, 70-80 microns, and 290-310 microns, respectively. In one embodiment, the present invention contemplates the addition of from about 0.5 percent to about 1 percent (by weight) particulate matter, such as graphite, to the curing material. However, various other embodiments contemplate the addition from about 0.2 percent to about 5 percent by weight.

Method 100 further includes placing 150 the curing mixed material into the mold. In some embodiments, the method further includes permitting 160 the polymerization process to continue at substantially ambient pressure. In such embodiments, there is no attempt to apply a partial vacuum to the curing material during the earliest stages of curing activity. Instead, various embodiments contemplate the curing of the mixed material at substantially ambient pressure for at least about 5 minutes. In some embodiments, this period of initial polymerization is allowed to continue for 10 minutes, and in yet other embodiments for 20 minutes. During this initial period, polymerization and cross-linking of the mixed material begins and continues.

Method 100 further includes applying 170 a subatmospheric pressure to the material in the mold cavity. In some embodiments, the application of subatmospheric pressure encourages the material to foam, without substantially letting any entrapped gases escape. However, in yet other embodiments, the present invention contemplates the introduction of small amounts of gas from the mold cavity into the curing material while the subatmospheric conditions are maintained on top of the curing material. In such embodiments, this gas reintroduced into the material through the mold cavity replaces any gas that was inadvertently removed, such as by application of excessive vacuum, or application of vacuum before significant cross-linking has occurred. Preferably, the subatmospheric conditions are exposed to the curing material for the remainder of the cure cycle (such as for several hours).

After the material is cured, the vacuum is removed, at which time it is possible that the final, cured compound reduces in height. The compound is removed from the mold, and used as desired in any impact-mitigating manner, including the various application described herein.

Figure 25:
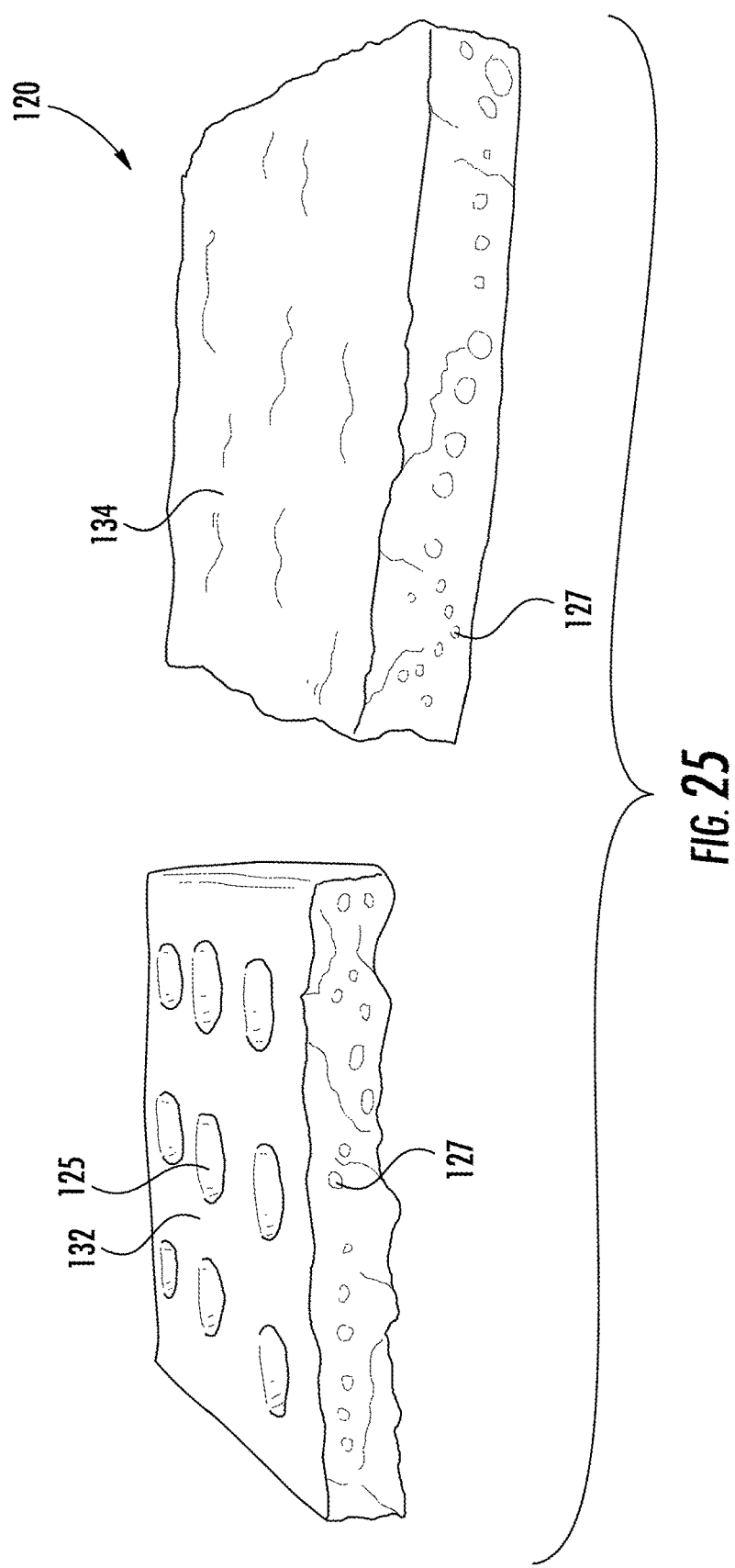
FIG. 25 is a photographic representation of a material fabricated from the process of FIG. 24.

FIG. 25 is a photographic representation of two sections of a material 120 processed in accordance with portions of method 100. It can be seen that the section of material shown on the left has the mold side 132 facing upward, with various semi-spherical features 125 embossed on that side. The sample of material on the right side of FIG. 25 shows the free side (the side exposed to subatmospheric conditions) 134 facing upward. It can be seen on the sides of the material that method 100 has resulted in the introduction of various intermediate-scale features 127 within the volume of the cured final compound. Graphite flakes are not shown in FIG. 25.

Figure 26:
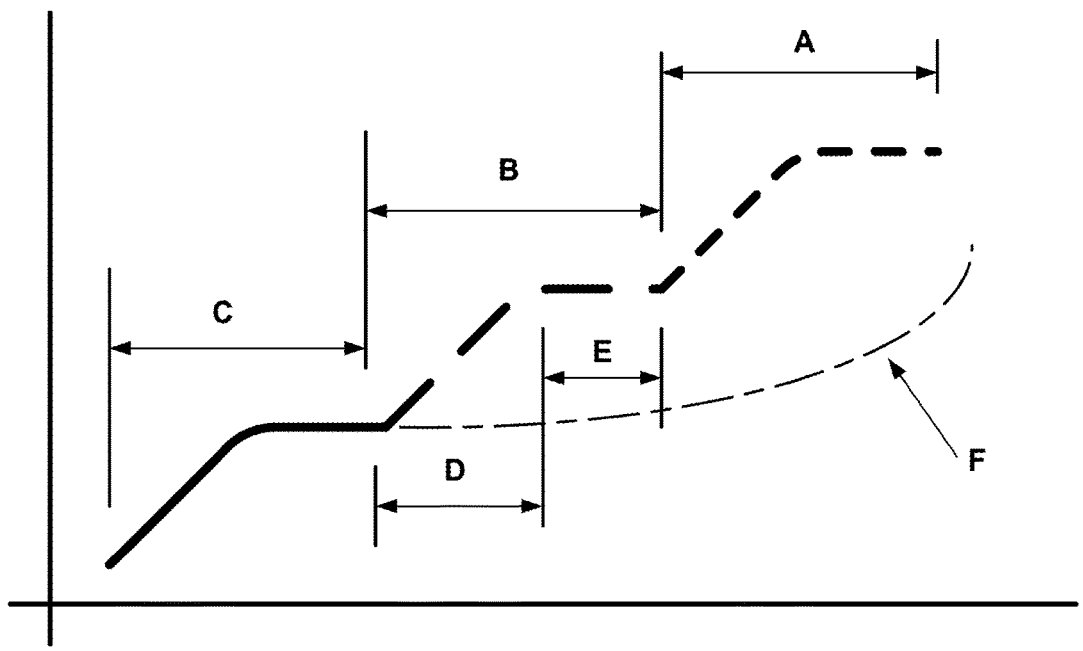
FIG. 26 is a graphical depiction of stress-strain relationships, showing the characteristics of material according to yet another embodiment of the present invention as compared to several known helmet cushioning materials.

FIG. 26 represents a generalized stress-strain (or load displacement) curve for a compound 120 according to one embodiment of the present invention. It can be seen that inventive materials in some embodiments include small-scale features A, intermediate-scale features B, and large-scale features C distributed within a matrix, preferably a matrix of resilient material, and in some embodiments a matrix of an elastomeric material. In some embodiments, large-scale features C include features having a characteristic dimension from about one-half centimeter to about two centimeters. These features can be of any type, including inclusions of particulate material or voids (including those voids created by the removal of particulate material such as corn starch, salt, or other dissolvable substances). These relatively large features exhibit behavior in two regions denoted by the "C" of FIG. 26. The first region includes a region in which an increase in load results in an increase in displacement. However, as previously discussed herein, the resilient material proximate to the features C deform (including both elastic and inelastic deformations, examples of which include buckling, shearing, and compressive and tensile failures) as the load increases, such that a relatively larger degree of displacement is obtained with little or no increase in load. This is depicted as the generally flattened horizontal section of curve C.

However, compounds according to some embodiments of the present invention further include a distribution of intermediate-scale features within the resilient matrix. As the deformation continues proximate to the C features, the smaller B features induce larger stresses proximate to the B features, and the material proximate to the B features in rough proportion to the load. This portion of curve B is depicted within range D on FIG. 26. This D region can be considered as the handing-off of stresses from the continued deformation and compaction proximate to the C features, and onto the elastic region D proximate to the B features. However, the stresses proximate to the B features reach a point at which deformation occurs in the matrix material proximate to the B features. This region is denoted by range E of FIG. 26. Within this range very small changes in load result in large changes in displacement.

Compound 120 further includes a third set of features A that are smaller in size than either of the C or B features. It can be seen that the range denoted "A" of FIG. 26 shows a region similar to the C and B regions, yet occurring at still higher levels of stress. In some embodiments, the A features include micron range particulate matter, including as one example graphite flakes. The material proximate to these micron-range features are generally the last to buckle within the compound 120. In some embodiments, the B features are preferably features that are introduced into the compound during the cure cycle, although various other embodiments are not so constrained. In such embodiments, the parameters of the curing cycle (such as cross-linking time prior to vacuum, level of vacuum, amount of dilution, etc.) result in the introduction of intermediate-scale features 127, such as those seen in FIG. 25. In some embodiments, the size range of the small-scale features A are selected to be about one order of magnitude smaller than the average B size. In still further embodiments, the size range of the C features is selected to be about one order of magnitude larger than the B features. It is understood that in various embodiments the order of magnitude relationship between classes of features is preferably greater than about seven to one, and less than about twelve to one. In still further embodiments the order of magnitude ranges from about eight to one to about twelve to one. In still further embodiments, the order of magnitude ranges from about nine to one to about eleven to one.

Referring again to FIG. 26, the dotted line of curve F graphically depicts the stress-strain response of a resilient material having a single size range of features within the material matrix. As the material proximate to these features collapses (such as by buckling; although other failure mechanisms including failure in shear, failure in tension, or failure in compression), the material responds with significant increases in strain with relatively small increases in stress. However, as the material approaches very high level of strain, the compaction of the material results in an increase in stress required for any further increases in strain. In some embodiments, operation of the material near the far right hand side of curve F can result in permanent deformation of the matrix material, such as by tearing of the matrix material. This response curve F also shows a relatively low amount of absorbed strain energy (strain energy being the area under the stress-strain curve). In contrast, a material 120 according to some embodiments of the present invention would continue to absorb strain energy in the area under curves B and A, and above curve F.

Figure 27:
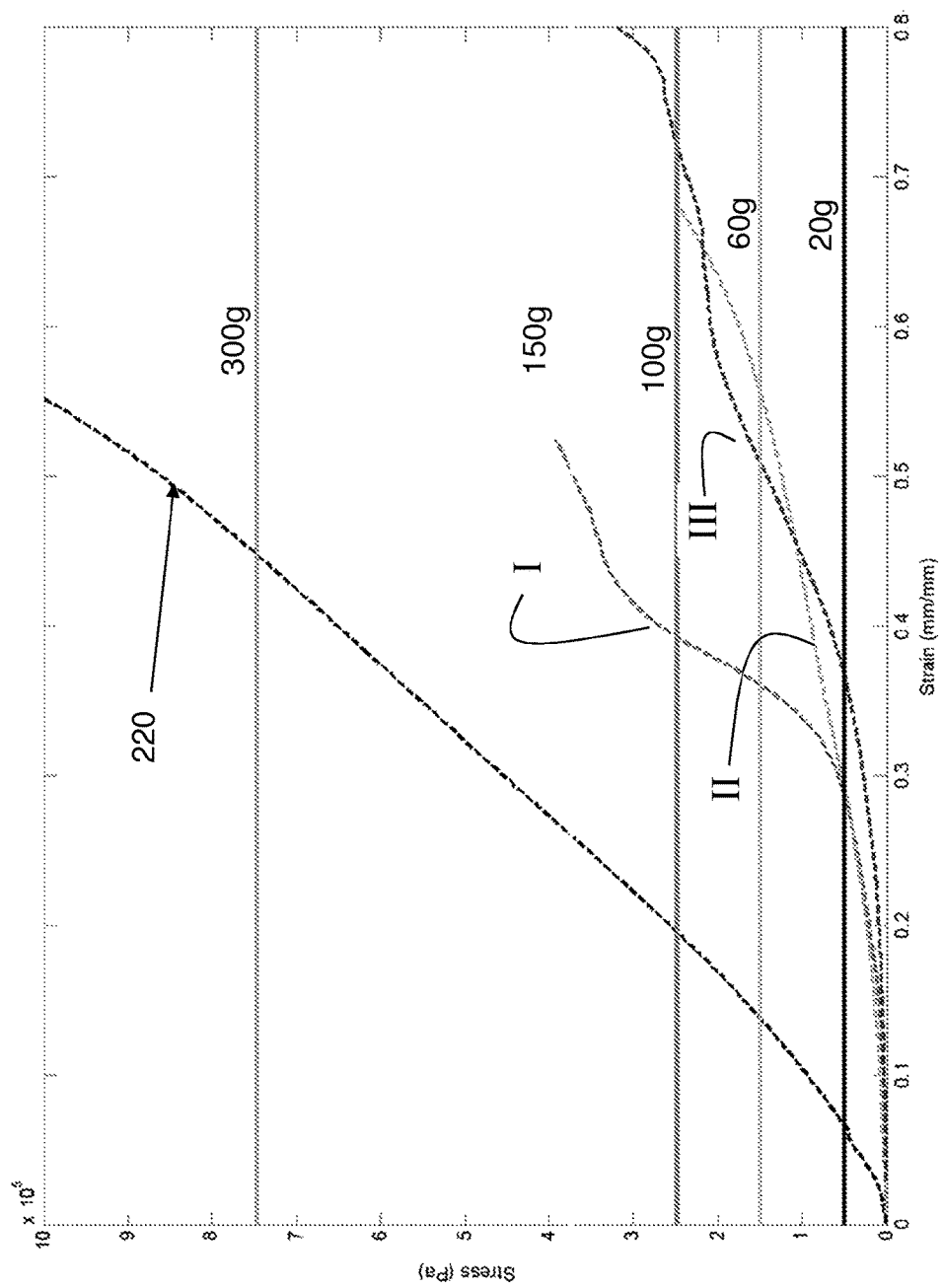
FIG. 27. Comparison of the performance of $60Si_{40}40G_{\#1}$ versus padding materials I, II, and III. $60Si_{40}40G_{\#}$ outperforms all materials at impacts above a 100 g stress level. Material I fails at a 20 g impact level, at which point any small increase in strain results in a large increase in stress. Materials II and III fail at impacts approximately above a 100 g stress level.
Figure 28:
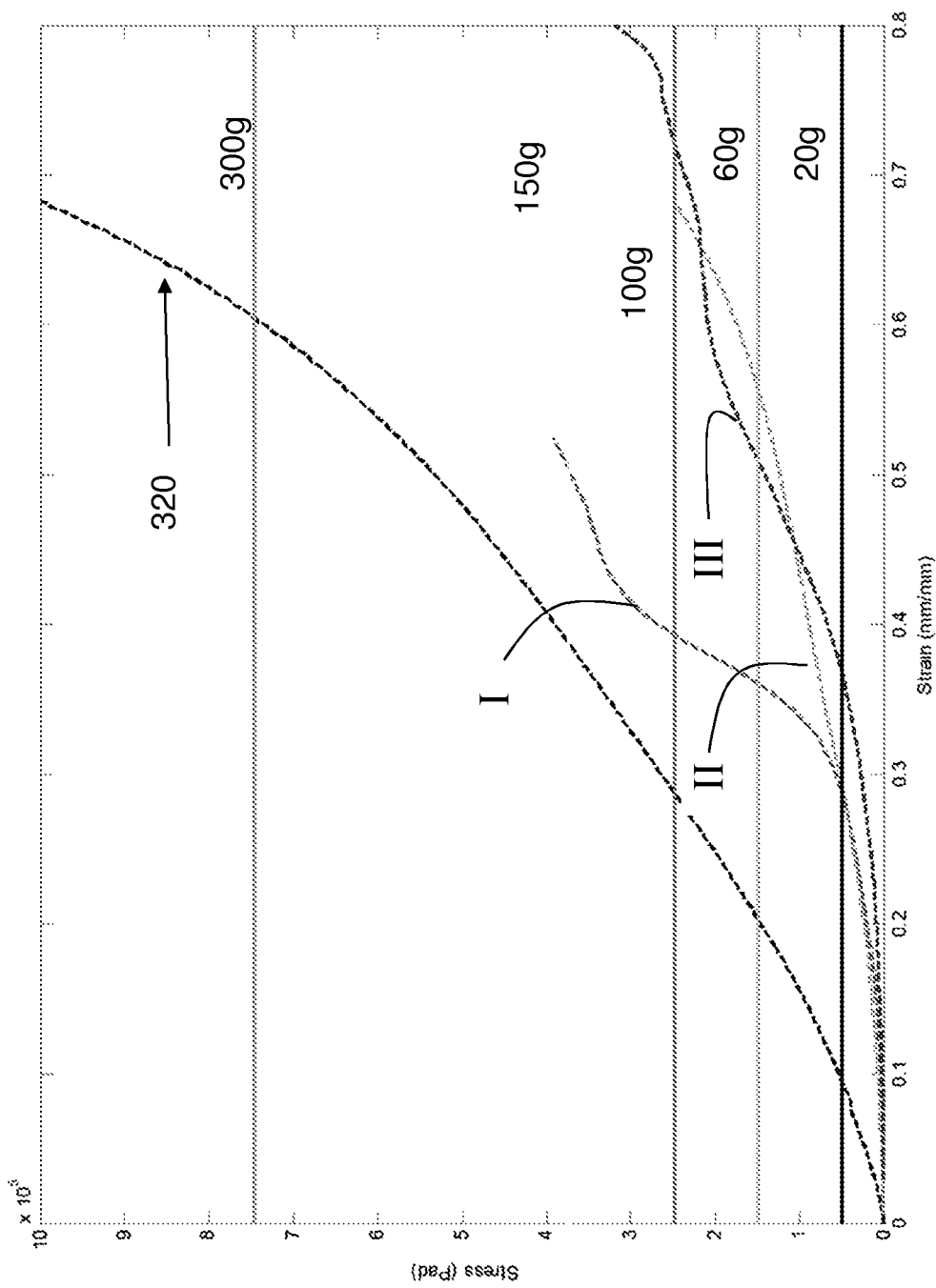
FIG. 28. Comparison of the performance of $60Si80_{40}G_{\#1}$ versus padding materials I, II, and III. $60Si_{40}40G_{\#}$ outperforms all materials at impacts above a 100 g stress level. Material I fails at a 20 g impact level, at which point any small increase in strain results in a large increase in stress. Materials II and III fail at impacts approximately above a 100 g stress level. $60Si80_{40}G_{\#1}$ shows minimal signs of impending stiffening near 60% compression.

FIGS. 27 and 28 are graphic depictions of stress/strain characteristics of compounds prepared according to yet other embodiments of the present invention. FIG. 27 includes a plot for a material 220 according to one embodiment of the present invention. This material was 60 percent silicone by weight, 40 percent graphite by weight, was diluted 40 percent by weight, and the graphite particles were Large Flake. FIG. 28 shows a response curve for a material 320 in which the compound was 60 percent by weight silicone, 40 percent by weight graphite, diluted 80 percent by weight, and the graphite particles were Large Flake.

Also shown on FIGS. 27 and 28 are the stress/strain response curves for three commercially available materials (designated I, II, and III) used to absorb impacts in helmets. These two figures also show vertical lines representing stresses induced by 10 g, 60 g, 100 g, 150 g, and 300 g impacts. It can be seen that materials 220 and 320 outperform the three commercially available materials in terms of the absorbed strain energy (area under the curve).

A linear single degree-of-freedom system is chosen to model the dynamic properties of the various materials. The system model consists of a rigid mass mounted on top of a sample of material which is fixed on the opposite end (FIG. 4.1).

The foam material acts as a linear spring, with stiffness K, and dashpot, with damping coefficient C. The input to the system, F(t), is an impulse, which sets the system into transient motion. Depending on the value of the damping ratio, $\zeta$, the transient motion may be underdamped, overdamped, or critically damped. A system that is underdamped ($0 > \zeta > 1$) will exhibit vibratory motion. A system that is overdamped ($\zeta > 1$) will not exhibit vibratory motion, but instead motion similar to a step input. A critically damped system ($\zeta = 1$) lies on the threshold between overdamped and underdamped systems.

The single degree of freedom system depicted in FIG. 4.1 is described by the following equation of motion $$\sum f_{E_1} = m\ddot{x} = F - C\dot{x} - Kx$$
$$F = m\ddot{x} = C\dot{x} = Kx$$
$$\frac{F}{m} = \ddot{x} = \frac{C}{m}\dot{x} = \frac{K}{m}x$$

which may be written as $$\frac{1}{m}F = \ddot{x} + 2\zeta\omega_n\dot{x} + \omega_n^2 x.$$

A single degree-of-freedom experimental set up is used to acquire the acceleration history of the rigid mass for the dynamic characterization of all material samples The experimental setup consists of a rigid mass fixed to the top of a material sample, whose opposite end is fixed to a rigid base. The rigid mass is constrained to stable motion with minimal friction in the negative E3 direction by means of four roller bearings connected to four posts attached to a fixed base (FIG. 4.3).

Two single-axis Kistler K-Beam accelerometers (Milano, Italy) are fixed on opposing corners of the top plate with natural bees wax. An impulse input is provided by an externally triggered piezoelectric gun (Piezotronics, Model 086B09). Both the accelerometers and the piezoelectric gun output an analog voltage between +/−5 volts to a National Instruments DAQ board. The piezoelectric gun outputs the magnitude of the input impulse. The accelerometers output the acceleration time history of the rigid mass. LabVIEW v8.3.5 (National Instruments, Austin, Tex.) is used to collect and store the data. The complete experimental setup may be seen below in FIG. 4.4.

Since the piezoelectric gun is externally triggered, the acceleration profile data must be phase shifted, such that the damped natural response of the material sample begins at the time that the impulse returns to zero. Basic time domain techniques are used under a linear assumption to analyze the phase shifted acceleration profile, namely the log-decrement method for determining the damped natural frequency, damping ratio, and natural frequency.

The log decrement method of parameter estimation uses exponentially decaying oscillation peaks within the decay envelope to determine the damping ratio $$\Delta = \frac{1}{n}\ln\left[\frac{y_n - y_f}{y_{n+1} - y_f}\right] \tag{15}$$

$$\zeta = \frac{1}{\sqrt{\frac{4\pi^2}{\Delta^2} + 1}}, \tag{16}$$

where n corresponds to the $n^{th}$ peak of the oscillation decay. The damped natural frequency is determined using the time period of oscillations $$\omega_d = \frac{2\pi}{T_d} \tag{17}$$

and the natural frequency is then given by $$\omega_n = \frac{\omega_d}{\sqrt{1-\zeta^2}}. \tag{18}$$

Therefore, the second order system is defined by the natural frequency of oscillation, $\omega_n$ and the damping ratio, $\zeta$. These quantities are used directly to determine an estimate for the damping coefficient by rearranging Equation 15 to achieve the following relation:

$$C = 2\zeta\omega_n m. \tag{19}$$

Another method of determining the natural frequency of the system is by using frequency domain techniques. In this case, an analysis of the energy spectral density is appropriate to account for inconsistency of sampling rate within a given sampling window. Energy spectral density directly follows from Parseval's Theorem, which states that the sum of the square of a function is equal to the sum of the square of its transform. The squared sum of the transform is called the energy density spectrum, which describes the average distribution of signal energy across frequency as given by $$E = \sum_{-\infty}^{\infty} |x_n|^2 = \frac{1}{2\pi}\int_{-\pi}^{\pi} |X(j\omega)|^2 d\omega. \tag{20}$$

An energy spectral density plot represents the energy contained within signal at a specific frequency. The shape of an energy spectral density plot for a second order system is identical to the shape of the frequency response function. As with the frequency response function, the frequency corresponding to the peak magnitude value is the natural frequency.

For each sample, the energy spectral density is computed by taking the discrete Fourier transform at n sampling intervals and squaring the result respectively:

$$X_k = DFT\{x(n\Delta)\} \tag{21}$$

$$X(f)|_{f=f_k} \approx \Delta X_k \quad (22)$$

$$E = |X_f|^2 = \Delta^2 |X_k|^2. \quad (23)$$

The natural frequency is determined by mapping the location of the peak magnitude. This serves as s verification of the time domain estimation of natural frequency. A statistical analysis was completed using analysis of variance (ANOVA) Student Newman-Keuls post hoc tests at a significant level of 5%. All statistical tests were performed using StatView (SAS Institute, Cary, N.C.).

Natural frequency is determined using both time domain and frequency domain analysis for verification. In all pure silicone cases, the percent error between the two different calculations methods is less than 2%, so the values found using the time domain technique are reported. The energy spectral density may be found is FIG. 4.5.

The natural frequency of $Si_{40}$ and $Si_{80}$ is 69.21±1.08 rad/s and 56.34±1.31 rad/s, respectively. The damping coefficient of $Si_{40}$ and $Si_{80}$ is 17.69±2.28 Ns/m and 24.71±3.99 Ns/m, respectively. Pure silicone samples have a unique acceleration profile, characterized by significant damping and minimization of peak amplitude, especially when compared to Material I and Material II materials (FIG. 4.6).

$Si_{40}$ and $Si_{80}$ are statistically significant with respect to both natural frequency and damping coefficient. The pure silicone samples exhibit a negative correlation between natural frequency and thinning percentage of silicone; whereas, a positive correlation exists between damping coefficient and thinning percentage of silicone (FIG. 4.7 and FIG. 4.8).

Natural frequency is determined using both time domain and frequency domain for verification. In all Microfyne cases, the percent error between the two different calculations methods is less than 7%, so the values found using the time domain technique are reported (Table 4.1). The energy spectral density may be found in FIG. 4.9. Both natural frequency and damping coefficient are higher than those found for pure silicone. The acceleration profile for $Si_{40}$ samples has a higher peak magnitude and more oscillations than the pure silicone samples. The peak magnitude seems to increase with the addition of more graphite. The acceleration profile for Si80 samples, characterized by lower peak amplitude and a longer time period of oscillation is more similar to the pure silicone samples. As with the $Si_{40}$ samples, the peak magnitude increases with increasing graphite content (FIG. 4.10).

TABLE 4.1

Quantitative calibration results for natural frequency and damping coefficient of Microfyne series samples.

| | Natural Frequency (rad/s) | Damping Coefficient (Ns/m) |
|---|---|---|
| $70Si_{40}30G_{MF}$ | 99.71 2.55 | 45.20 ± 7.67 |
| $60Si_{40}40G_{MF}$ | 116.56 ± 3.53 | 58.58 ± 6.53 |
| $70Si_{80}30G_{MF}$ | 85.64 ± 6.94 | 45.19 ± 9.13 |
| $60Si_{80}40G_{MF}$ | 100.97 ± 9.63 | 59.25 ± 15.07 |

All Microfyne series samples were statistically significant with respect to natural frequency, except $70Si_{40}30G_{MF}$ and $60Si_{80}40G_{MF}$. In all Microfyne series samples, natural frequency and damping coefficient are positively correlated with volume of impregnated graphite (FIG. 4.11 and FIG. 4.12).

Natural frequency is determined using both time domain and frequency domain for verification. In all #2 Medium Flake cases, the percent error between the two different calculations methods is less than 10%, so the values found using the time domain technique are reported (Table 4.2). The energy spectral density may be found in FIG. 4.13. The impulse response of the #2 Medium Flake series samples are all very similar with noted mitigation of the peak amplitude followed by damped oscillation.

TABLE 4.2

Quantitative calibration results for natural frequency and damping coefficient of #2 Medium Flake series samples.

| | Natural Frequency (rad/s) | Damping Coefficient (Ns/m) |
|---|---|---|
| $70Si_{40}30G_{\#2}$ | 119.19 ± 3.70 | 50.07 ± 11.94 |
| $60Si_{40}40G_{\#2}$ | 114.9 ± 4.05 | 45.56 ± 3.41 |
| $70Si_{80}30G_{\#2}$ | 97.18 ± 2.34 | 33.59 ± 4.05 |
| $60Si_{80}40G_{\#2}$ | 106.23 ± 4.08 | 49.16 ± 5.59 |

All #2 Medium Flake series samples were statistically significant with respect to natural frequency. Natural frequency and damping coefficient for the $Si_{40}$ samples both have a negative correlation with volume faction of graphite. This is the first incidence of a negative correlation in graphite impregnated samples. Natural frequency and damping coefficient for the $Si_{80}$ samples both have a positive correlation with volume fraction of impregnated graphite (FIG. 4.15 and FIG. 4.16).

Natural frequency is determined using both time domain and frequency domain for verification. In all #1 Large Flake cases, the percent error between the two different calculations methods is less than 11%, so the values found using the time domain technique are reported (Table 4.3). The energy spectral density may be found in FIG. 4.17. The impulse response of the #1 Large Flake series samples has even further mitigated peak amplitudes than the #2 Medium Flake series, followed by smooth, slow damped oscillation (FIG. 4.18).

TABLE 4.3

Quantitative calibration results for natural frequency and damping coefficient of #1 Large Flake series samples.

| | Natural Frequency (rad/s) | Damping Coefficient (Ns/m) |
|---|---|---|
| $70Si_{40}30G_{\#1}$ | 115.60 ± 9.85 | 43.75 ± 4.63 |
| $60Si_{40}40G_{\#1}$ | 123.34 ± 4.31 | 56.04 ± 11.53 |
| $70Si_{80}30G_{\#1}$ | 91.65 ± 2.63 | 31.31 ± 2.77 |
| $60Si_{80}40G_{\#1}$ | 100.81 ± 1.95 | 42.90 ± 6.17 |

All #1 Large Flake series samples were statistically significant with respect to natural frequency. Natural frequency and damping coefficient for both $Si_{40}$ and $Si_{80}$ samples have a positive correlation with volume fraction of impregnated graphite (FIG. 4.19 and FIG. 4.20).

Natural frequency is determined using both time domain and frequency domain for verification. In each of the All series cases, the percent error between the two different calculations methods is less than 9%, so the values found using the time domain technique are reported (Table 4.4). Energy spectral density may be found in FIG. 4.21. The impulse response of $Si_{40}$ samples has returned to the acceleration profile of the Microfyne series samples, characterized by a high peak magnitude, followed by a series of damped oscillations. The impulse response of the $Si_{80}$ samples is characterized by a low peak magnitude followed by a series of damped oscillations (FIG. 4.22).

TABLE 4.4

Quantitative calibration results for natural frequency and damping coefficient of All series samples.

| | Natural Frequency (rad/s) | Damping Coefficient (Ns/m) |
|---|---|---|
| $70Si_{40}30G_{ALL}$ | 125.35 ± 8.65 | 53.83 ± 13.50 |
| $60Si_{40}40G_{ALL}$ | 125.56 ± 7.56 | 61.09 ± 7.84 |
| $70Si_{80}30G_{ALL}$ | 91.39 ± 2.64 | 36.85 ± 3.69 |
| $60Si_{80}40G_{ALL}$ | 104.10 ± .67 | 51.16 ± 6.10 |

Each of the All series samples are statistically significant with respect to natural frequency, except $70Si_{40}30G_{All}$ to $60Si_{40}40G_{All}$ and $70Si_{70}30G_{All}$ to $60Si_{80}40G_{All}$. Natural frequency and damping coefficient for both $Si_{40}$ and $Si_{80}$ samples have a positive correlation with volume fraction of impregnated graphite (FIG. 4.23 and FIG. 4.24). The damping coefficient is more sensitive than the natural frequency for both $Si_{40}$ and $Si_{80}$ samples.

Natural frequency ($\omega n$) and damping coefficient (C) are defined for all eighteen different material samples using a linear single degree-of-freedom model. Each material has a distinctly linear deformation region for low strain values. Due to the nature of the dynamic impulse test, the deformations are small and likely to remain within the linear range of deformation. This can be verified by plotting the acceleration of the peaks within the damping envelope against time on a log-log plot and checking for a linear relationship. For the majority of materials, a linear relationship existed between the acceleration of the peaks and time. For materials that reach non-linear deformation ranges during dynamic testing, the assumption of a linear system offers a decent approximation of natural frequency and damping coefficient, but could be refined by accounting for non-linearities.

Acceleration profile plots are generated to compare the performance of pure silicone and graphite impregnated samples with Material I, Material II, and Material III helmets. The impulse input is slightly different (±500N) for each sample due to physical system limitations, so it is best to compare the basic shape of the plot as opposed to specific magnitude values.

The pure silicone samples may be thinned up to 90% by weight to achieve increasingly compliant material properties. Natural frequency is negatively correlated with thinning percentage of silicone; whereas, damping coefficient is positively correlated with thinning percentage of silicone. The acceleration profile of the pure silicone samples is characterized by a low peak magnitude follow by several long time period oscillations. The time period of oscillation for both pure silicone samples is greater than Material I, Material II, and Material III. The pure silicone samples are most comparable to the Material III material, with relatively low natural frequency and low damping ratio. Both $Si_{40}$ and $Si_{80}$ have significantly lower peak magnitudes than both the Material I and Material II.

The addition of Microfyne graphite to the silicone allows for the variation of both natural frequency and damping coefficient, which drastically changes the acceleration profile. A positive correlation between damping coefficient and graphite content exists, but unlike in the pure silicone samples, natural frequency has a negative correlation with graphite content. The acceleration profile of the Microfyne series samples has a smaller time period of oscillation, which leads to higher peak magnitudes and more oscillations. The response of the $70Si_{80}$ $30G_{MF}$ sample is identical to the Material III response. The peak magnitudes for $70Si_{40}30G_{MF}$ and $70Si_{80}$ $30G_{MF}$ are much lower than both the Material I and Material II. The peak magnitudes of $60Si_{40}G_{MF}$ and $60Si_{80}$ $40G_{MF}$ are comparable to the Material I and Material II The addition of #2 Medium Flake graphite to the silicone allows for variation of both natural frequency and damping coefficient, and therefore control of the acceleration profile. The $Si_{40}$ samples have a negative correlation between both natural frequency and damping coefficient and graphite content; whereas, the $Si_{80}$ samples have a positive correlation between natural frequency and damping coefficient and graphite content. Microfyne impregnated graphite samples are the only samples that have different correlations between $Si_{40}$ and $Si_{80}$ samples. In all cases, the peak amplitude is well below that of Material I and Material II, but higher than that of the Material III. Generally, the $Si_{80}$ samples have lower peak amplitude than the $Si_{40}$ samples, but $Si_{40}$ samples damp faster.

The addition of #1 Large Flake graphite to the silicone allows for variation of both natural frequency and damping coefficient, and therefore control of the acceleration profile. Natural frequency and damping coefficient are both positively correlated with graphite content. All peak amplitudes are generally well below Material I and Material II and below or comparable to Material III. The $Si_{40}$ samples tend to damp faster than the $Si_{80}$ samples and the $Si_{80}$ samples have a longer time period of oscillation than the $Si_{40}$ series.

The addition of an equal weight percentage of each type of graphite particle to the silicone allows for variation of both natural frequency and damping coefficient, and therefore the control of the acceleration profile. Natural frequency and damping coefficient are both positively correlated with graphite content. All peak amplitudes are generally well below Material I and Material II. Only the $Si_{80}$ series peak amplitudes are below those of Material III.

Across all groups, natural frequency and damping coefficient are both very sensitive to changes in volume fraction of impregnated graphite; neither one nor the other parameter seems to dominate. Generally speaking, the $Si_{40}$ samples have an acceleration profile similar to the Material I and Material II; whereas, the $Si_{80}$ series samples have an acceleration profile similar to the Material III. Increasing graphite size has a distinct effect on the magnitude of the peak amplitude. The larger the size of the particle inclusion, the lower the peak amplitude. The samples with an equal weight percentage of graphite return to acceleration profile characteristics similar to the Microfyne series samples. This suggests that the material behavior is dominated by the smallest particle inclusion, which is consistent with the quasi-static parameters and compressive stress-strain deformation.

$Si_{80}$ graphite impregnated silicone displays superior dynamic properties when compared to Material I, Material II, and Material III padding materials. In all cases, the peak amplitude of the silicone and graphite impregnated silicone was equivalent or below that of Material I and Material II. The peak amplitudes of $Si_{80}$ series samples were generally below or equivalent to Material III padding. With the addition of graphite to silicone, the natural frequency, damping coefficient, and therefore the acceleration profile may be tuned to specific impact loading conditions.

In the case of football helmets, the dynamic loading conditions may be described by defining a realistic bound for the natural frequency based on the natural frequency of the head and the natural frequencies of a typical impact. Generally speaking, the ideal material would have dynamic properties whose natural frequency is distinctly different from the natural frequencies of the human head and helmet impacts.

Dynamic properties of helmet impacts are poorly defined, with limited experimentally obtained and computationally verified research of the natural frequency of an impact. Newman et al. report frequencies for helmet-to-helmet impacts near 1875 Hz and 3202 Hz. Therefore, an ideal padding material should remain below frequencies about 1000 Hz.

Based on the available estimations of natural frequency, it seems reasonable to require that the natural frequency of the padding material stay well below 300 Hz, the lowest reported natural frequency. However, the whole human body has a natural frequency below 10 Hz so the natural frequency of the padding material should be reasonably higher than 10 Hz. Combining the two design constraints means that the padding material must be between 10 Hz and 300 Hz. A proposed ideal natural frequency that falls within this range is a moderate 100 Hz. With an understanding of the limitations of natural frequency, a brief analysis of the shock spectrum of a helmet impact may be completed to determine an upper bound on the desired linear spring constant. The range of acceptable spring constant values will vary depending on the parameters of each specific impact loading condition, and therefore, must be evaluable on case-by-case scenario. Ultimately, multiple graphite impregnated silicone samples have a natural frequency near 100 Hz and the linear spring stiffness, which is directly related to the shear modulus, may be customized to meet impact loading condition demands.

At a micro-scale level, the addition of graphite or other particles to silicone or other elastomaterial is one method of altering the material properties by means of intentional variation in material properties and geometry. This proved to be an effective method for tuning the quasi-static and dynamic properties of graphite impregnated silicone. This methodology can be extended to materials at a macro-scale level, in which materials of varying properties are layered with intentional isotropic or anisotropic geometries to improve and control energy absorption capabilities. The comments that follow pertain to FIGS. 5.1, 5.2, 5.3, 5.4, 5.5, and 5.6.

The addition of materials of varying property to a specific material geometry is thought to effectively act as a multiple mass-spring-damper system, in which each layer is characterized by a different stiffness and damping value. This can also be thought of in terms of filtering, in which each material included in the geometry is designed to filter specific frequencies. For example, a compliant material would mitigate low-frequency impacts; whereas, a stiff material would mitigate high-frequency impacts. Strain energy is a commonly accepted way of quantifying the energy absorption of a material.

Figure 5:
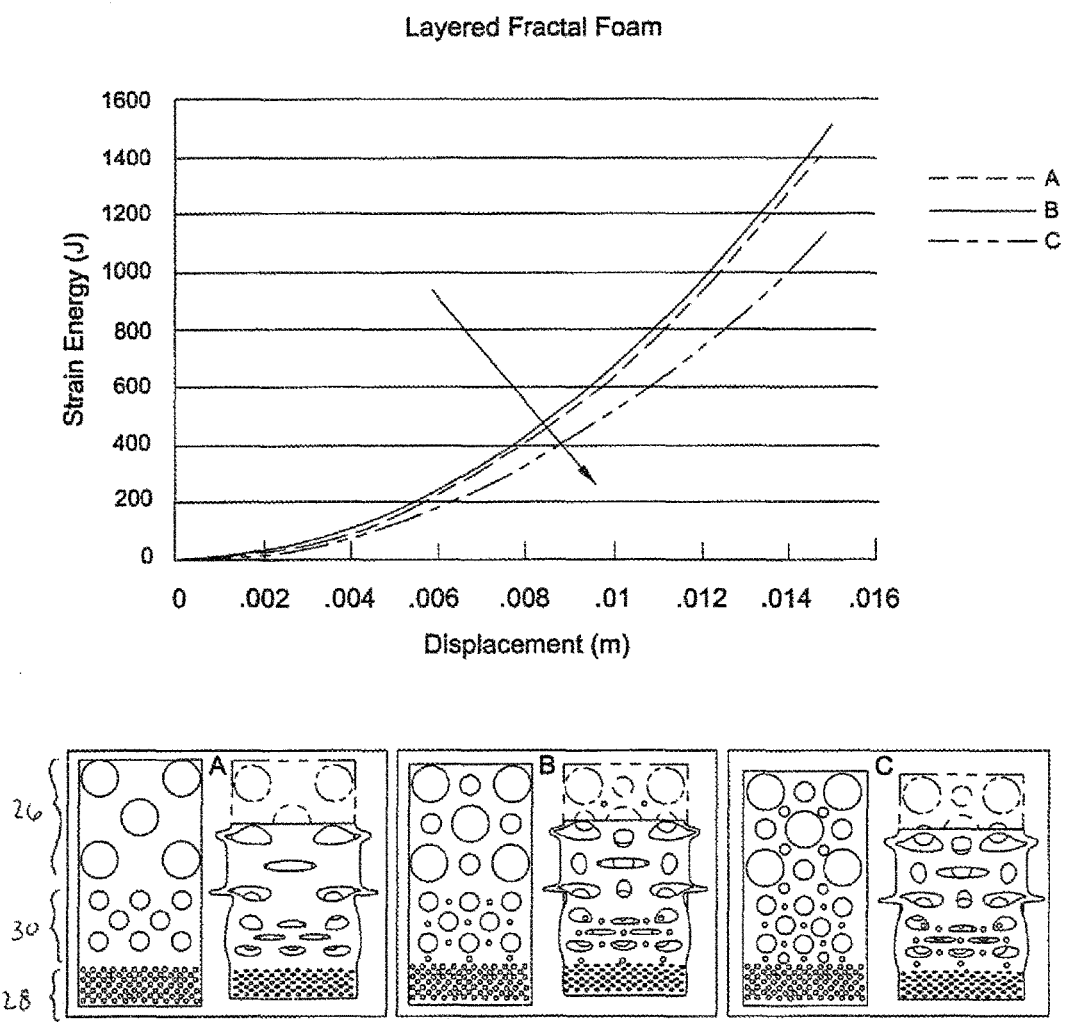
FIG. 5 is a graph representing strain-deflection plots for the embodiments of the impact-absorbing materials of FIG. 4.

A 30 cm by 30 cm block of unit depth is taken as a base geometry for each geometrical configuration of the material. Inclusions are added to the base geometry and allowed to vary in size, number, and shape. This ultimately resulted in twelve geometries of interest (FIG. 5.2). For notation, the inner geometry, referred to as inclusions, is surrounded by the outer material, and referred to as the matrix material.

Both the matrix material and inclusion material properties are allowed to vary, resulting in a non-repeating permutation of material property sets. The values for shear modulus ($\mu$) and bulk modulus ($\kappa$) for each silicone and graphite impregnated silicone sample are used as material parameters. In order to minimize computation time of the permutation, a range of experimentally obtained properties is selected; with the knowledge that any one of the sets of parameters may be achieved with appropriate thinning percentage of silicone and graphite content (Table 5.1).

TABLE 5.1

Representative range of pure silicone and graphite impregnated silicone

| Material | $\mu$ (Pa) | K (Pa) |
|---|---|---|
| 1 | 40000 | 15200 |
| 2 | 25000 | 90000 |
| 3 | 14500 | 40000 |
| 4 | 9000 | 42500 |

The geometry versions are modeled in COMSOL v3.2 and the iteration is completed using a MATLAB algorithm. A static linear analysis of the material for a 3000 N distributed load (stress) input is computed. The load is representative of approximate loading conditions in a 50 g football impact. Outputs of the program are contribution to strain energy from the matrix material, inclusion material, and total strain energy corresponding to each of the twelve permutation material configurations.

There is a trend in the computation of strain energy, which in the case of design, limits its effectiveness in characterizing energy-absorbing material. Since strain energy is the integral of the stress-strain curve, its value is largely dependent on the shear modulus and bulk modulus of the material. Strain energy can be computed and maximized using two different methods: strain input or load input, each having a different output. If the input is a strain level, the stiffest material will have the highest strain energy (FIG. 5.3); whereas, if the input is a stress level, the most compliant material will have the highest strain energy (FIG. 5.4).

For this reason, a deformation filter is applied to the output data for which the desired range of deformation is appropriately selected depending on the energy-absorption application. The deformation filter eliminates flawed data in which one of the following occurs:

1. The highest strain energy output is due to an unreasonably stiff material, in the case of a uniform strain input or
2. The highest strain energy output is due to an unreasonably compliant material, in the case of a uniform stress input.

The deformation filter can be likened to a band-pass filter, in which lower and upper deformation bounds are defined. The lower bound ensures that Case 1 does not occur in which the material is unreasonable stiff for the energy-absorption application. The upper bound ensures that Case 2 does not occur, in which the material is unreasonably compliant for the energy-absorption application.

In preparing impact mitigating material bounds were set at 10% and 40% of initial height, such that materials whose final deformation falls outside of this range for the load input are discarded. Output was converted to strain energy density to normalize by volume. The series of models with increasing diameter of cylindrical inclusions resulted in maximum strain energy of 38.9 J/m$^3$ (FIG. 5.5). The shear modulus and bulk modulus of the matrix and inclusion material corresponding to maximum strain energy are given in Table 5.2. Both filtered and unfiltered results are shown in FIG. 5.5.

TABLE 5.2

Shear and bulk modulus corresponding to maximum
strain energy of increasing inclusion diameter series.

|  | Shear Modulus (Pa) | Bulk Modulus (Pa) |
|---|---|---|
| Matrix | 14500 | 40000 |
| Inclusion | 7500 | 40000 |

The series of models with increasing volume fraction of cylindrical inclusions resulted in maximum strain energy of 40.9 J/m3 FIG. 5.6). The shear modulus and bulk modulus of the matrix and inclusion material corresponding to maximum strain energy are given in Table 5.3.

TABLE 5.3

Shear and bulk modulus corresponding to maximum strain
energy of increasing volume fraction of cylindrical
inclusions series.

|  | Shear Modulus (Pa) | Bulk Modulus (Pa) |
|---|---|---|
| Matrix | 14500 | 40000 |
| Inclusion | 7500 | 40000 |

The series of models with increasing volume fraction of elliptic inclusions resulted in maximum strain energy of 38.5 J/m$^3$ (FIG. 5.7). The shear modulus and bulk modulus of the matrix and inclusion material corresponding to maximum strain energy are given in Table 5.4.

TABLE 5.4

Shear and bulk modulus corresponding to maximum strain
energy of increasing volume fraction of elliptic
inclusions series.

|  | Shear Modulus (Pa) | Bulk Modulus (Pa) |
|---|---|---|
| Matrix | 14500 | 40000 |
| Inclusion | 7500 | 40000 |

One configuration of material properties resulted in a moderately compliant matrix material ($\mu$=14.5 kPa, $\kappa$=40 kPa) with a more compliant inclusion material ($\mu$=7.5 kPa, $\kappa$=40 kPa). Geometry is shown to have a noticeable but relatively limited effect on maximum strain energy due to deformation limitations. Strain energy density can be sensitive to changes in elliptic inclusions.

The shape of each correlation is similar, characterized by a rise to a critical strain energy value followed by decreasing strain energy values, and takes into account the deformation filter. As the diameter or volume fraction of inclusions increases, the maximum strain energy increases. Since the input is a uniform stress, an increase in strain energy density corresponds to increasingly compliant materials. Because of this, the strain energy reaches a critical point at which, if the material becomes any more compliant, the deformation will fall outside of the upper deformation bound and therefore the material will be discarded. The critical point is the maximum strain energy within a given deformation range.

From an analysis of strain energy, a very useful fundamental trend is understood, in that the most compliant material has the highest strain energy for a uniform stress input and the stiffest material has the highest strain energy for a uniform strain input. This suggests that a suitable deformation range can be defined for the material depending on the loading conditions and application.

For the case of football helmets, one design criterion is a minimum deformation of 10% and a maximum deformation of 40%. A minimum of 10% deformation helps provide that the material is compliant as opposed to a rigid, albeit high strain energy, material. A maximum of 40% deformation ensures that the material has not reached its maximum deformation capabilities. This means that the strain energy can be quantified up to 40% deformation for a given stress, but in some impacts, the material is still able to deform further to at least 80% of the initial height. This is helpful, as football impacts are regularly recorded above 100 g's, which requires extreme deformation for total energy-absorption.

X1. One embodiment of the present invention pertains to a compound for protection of an object from a dynamic load, and includes a matrix material including at least two sizes of stress-concentrating features, a plurality of first features having a first average characteristic dimension of between about ten microns and about two hundred microns, and a plurality of second features having a second average characteristic dimension that is at least about one order of magnitude larger than said first average characteristic dimension, wherein the material proximate to said first and second features progressively buckles upon application of the load, such that material proximate said features tends to structurally buckle before the buckling of material proximate to said first features.

X2. Yet another embodiment of the present invention pertains to a compound for protection of an object from a dynamic load, and includes a resilient matrix material including distributed therein a plurality of first features, a plurality of second features, and a plurality of third features, each of said first features, second features, and third features being adapted and configured to concentrate stress in the material proximate to the corresponding said feature, wherein said first features have a first average characteristic dimension, said second features have a second average characteristic dimension, and said third features have a third average characteristic dimension, the ratio of the second average dimension to the first average dimension is between about seven and twelve, and the ratio of the third average dimension to the second average dimension is between about seven and twelve, wherein said matrix material and said first, second, and third features are selected such that the compound exhibits substantially elastic response to a compressive strain greater than about forty percent.

X3. Yet another embodiment of the present invention pertains to a method of making a dynamic load-mitigating material, and includes providing first and second compounds that when combined form a silicone polymer, providing a plurality of separable particles each having a characteristic dimension less than about three hundred microns, mixing the first and second compounds and the particles, permitting the mixture to polymerize for at least about five minutes, and then exposing the mixture to pressure less than ambient pressure.

X4. Yet another embodiment of the present invention pertains to a method of making a dynamic load-mitigating material for a helmet, and includes providing a compound that is curable to form a polymer, providing a mold cavity having an internal height adapted and configured to produce cured silicone of a thickness suitable for use in a helmet, placing the compound in the mold cavity, curing the compound for a predetermined period of time, and exposing the mixture in the mold cavity to pressure less than ambient pressure after said permitting.

X5. Yet another embodiment of the present invention pertains to a method of making a dynamic load-mitigating material, and includes providing first and second compounds that when combined form a cross-linkable polymer, providing a mold cavity including a plurality of surface features each having a characteristic dimension greater than about one half centimeter and less than about two centimeters, mixing the first and second compounds and placing the mixture in the mold cavity, permitting the mixture to cross-link for at least about five minutes, and exposing the mixture in the mold cavity to pressure less than ambient pressure after said permitting Any of the preceding statements X1 through X5 wherein the deformation of said material proximate to any of said features is substantially elastic, buckling.

Any of the preceding statements X1 through X5 wherein the deformation of said material proximate to said third features is substantially inelastic shear, or compressive fracture, or tensile tearing.

Any of the preceding statements X1 through X5 wherein said second features are voids in said matrix material.

Any of the preceding statements X1 through X5 wherein said first features are graphite flakes.

Any of the preceding statements X1 through X5 wherein said third features are pockets molded into the material.

Any of the preceding statements X1 through X5 wherein the ratio of the third average dimension to the second average dimension is greater than about seven.

Any of the preceding statements X1 through X5 wherein the ratio of the second average dimension to the first average dimension is greater than about seven.

Any of the preceding statements X1 through X5 wherein said matrix material is an elastomer or not a metal.

Any of the preceding statements X1 through X5 wherein the resilient material has a Shore hardness of less than about 40 on the A scale.

Any of the preceding statements X1 through X5 wherein the material with features exhibits substantially elastic response to a compressive strain greater than about sixty percent.

Any of the preceding statements X1 through X5 wherein the ratio of the second average dimension to the first average dimension is greater than about ten, and the ratio of the third average dimension to the second average dimension is greater than about ten.

Any of the preceding statements X1 through X5 wherein the substance is a polymer, and the second features are voids in said substance formed during polymerization.

Any of the preceding statements X1 through X5 wherein any of the features comprise particulate matter, including graphite, corn starch, table salt, or any readily dissolvable solid that does not chemically degrade the matrix material.

Any of the preceding statements X1 through X5 wherein the voids are formed around particulate material during polymerization of said matrix material, with the particulates being removed from the polymerized material.

Any of the preceding statements X1 through X5 wherein the features include solid matter that is water soluble, and the solid matter is removed with water.

Any of the preceding statements X1 through X5 wherein during said exposing the pressure is less than about half of ambient pressure.

Any of the preceding statements X1 through X5 wherein said permitting is for at least about ten minutes, or at least about fifteen minutes.

Any of the preceding statements X1 through X5 wherein said mixing includes a diluent.

Any of the preceding statements X1 through X5 wherein any one of the features includes particles that have a mean characteristic length less than about one hundred and fifty microns and greater than about fifty microns and a standard deviation about the mean of less than approximately twenty microns.

Any of the preceding statements X1 through X5 wherein the first and second compounds have a first weight, the particles have a second weight, and the second weight is less than about ten percent of the first weight.

Any of the preceding statements X1 through X5 wherein the thickness of the cured silicone is less than about three centimeters.

Any of the preceding statements X1 through X5 wherein the surface features are at least partially spherical.

In one alternative embodiment according to the present disclosure, a novel structure that can be utilized for blast mitigation and shockwave mitigation is disclosed. The blast/shockwave mitigation structure is similar to the above-described impact absorbing material, however, different in at least one important manner. As described herein, the impact absorbing material includes a matrix material which includes sets of load/stress-concentrating features. Each of the sets is about an order of magnitude different in size than the others, with the smallest set being between about 10 and 100 microns. The material proximate to each of the three sets of features progressively buckles upon application of a load, such that the material proximate to the larger set of features deforms prior to the material proximate to smaller set of features.

One difference between the blast/shockwave mitigation structure and the impact absorbing structure described herein is that some or all of the features of the sets of features described herein can be partially or fully filled with a fluid other than air. The fluid can be a combination of water and/or oil. Other fluids with different levels of viscosity, e.g., uncured silicone, may be used as well.

Figure 29:
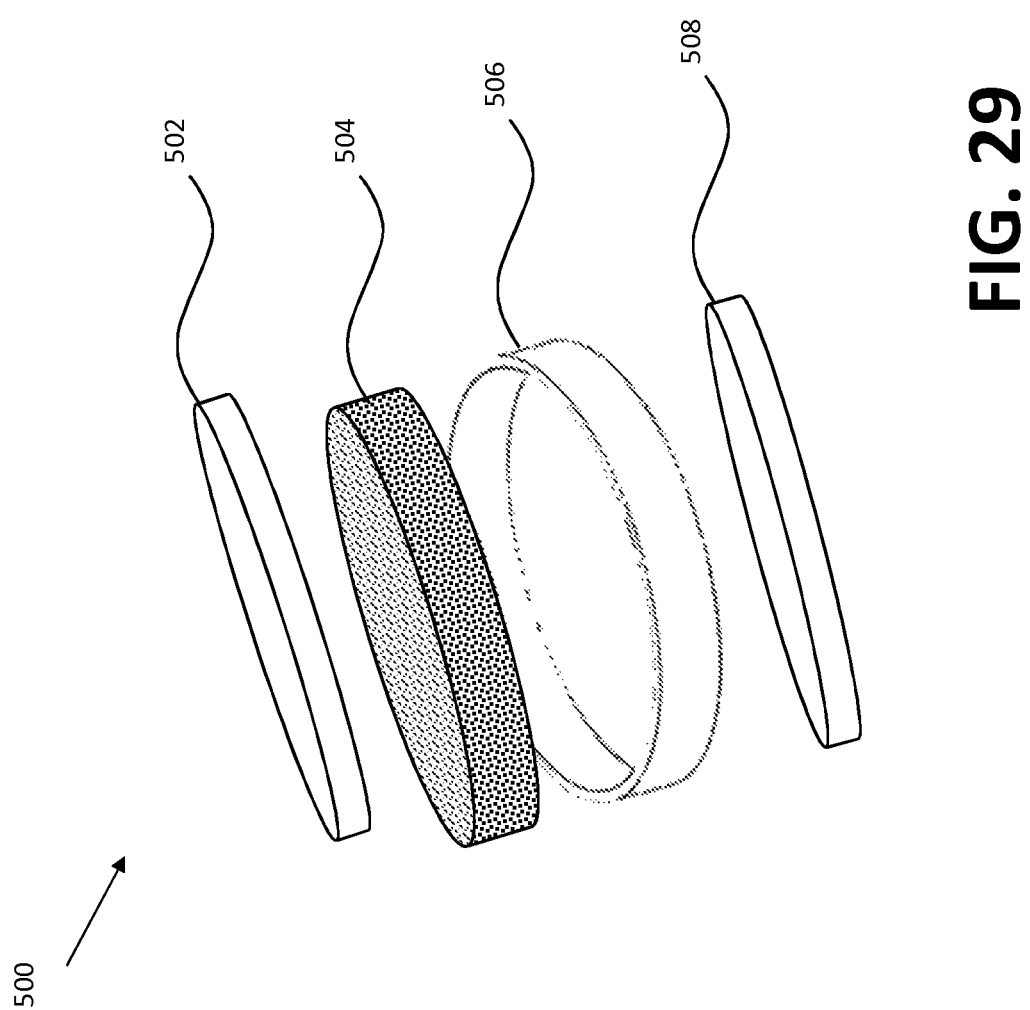
FIG. 29 is a schematic view of a test cell used for blast testing a blast or shock wave mitigating material.

To test the blast/shockwave structure, circular test structures were produced. These test structures 500 are depicted in FIG. 29. The test structure 500 includes a top plate 502, a cylindrical blast/shockwave mitigation structure 504, a ring 506, and a bottom plate 508. The ring 506 is configured to contain the blast/shockwave mitigation structure 504 within the test structure during a blast test; however, it allows the structure 504 to deform.

The test structure 500 was used to test various embodiments of the blast/shockwave mitigation structure 504. In one case, various inclusions present in the blast/shockwave mitigation structure 504 were filled with water; in another case vegetable oil was used, and in another case no filling was provided. The test structures were then used in blast testing. The result of blast testing is provided below:

|  | Average Peak Overpressure Mitigation | Average Impulse Mitigation |
| --- | --- | --- |
| Pads filled w/Water | 55.66% | 41.58% |
| Pads filled w/V-Oil | 64.78% | 68.42% |
| All Pad-No Fill | 35.53% | 51.05% |

Figure 30:
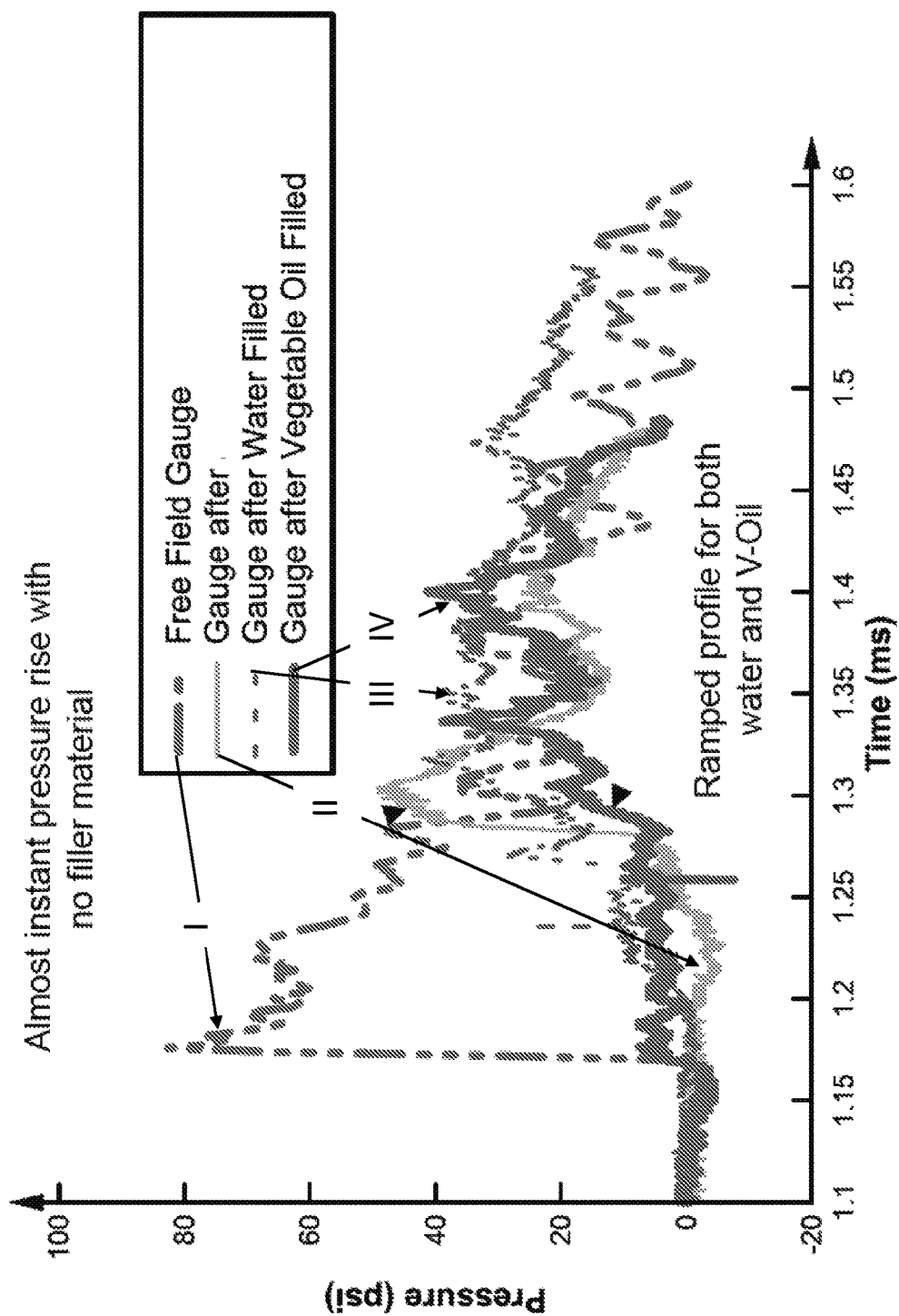
FIG. 30 is a plot of pressure vs. time for various configurations of the blast or shock wave mitigating material and a reference.

Another test was also performed without the blast/shockwave mitigation structure 504 for reference. The results of the blast testing are depicted in FIG. 30. Referring to FIG. 30, a plot of pressure vs. time is depicted. Trace I depicts the test where no blast/shockwave mitigation structure 504 was used. As can be seen at about 1.15 ms there is a sudden rise in the pressure that is translated from one of the top plate 502 or the bottom plate 508 to the other. After the sudden rise, trace I shows a gradual lowering of the pressure. Trace II depicts the test where the blast/shockwave mitigation structure 504 is not filled with any fluid. While the amplitude of pressure is lower than trace I, a similar rise (i.e., differential of pressure vs. time) is seen in trace II just before about 1.3 ms. It should be appreciated that there is a delay of about 0.1 ms as compared to trace I. Trace III depicts the test where the blast/shockwave mitigation structure 504 is filled with water. Several observations are noteworthy. First, the change in pressure in trace III is unlike traces I or II. The rise is slower and the amplitude is lower. Also, the delay is longer, about 0.15 ms as compared to trace I. Similarly, trace IV depicts the test where the blast/shockwave mitigation structure 504 is filled with vegetable oil. Again, the rise in pressure in trace IV is slower and the amplitude is lower than the rise and amplitudes of traces I, II, or III. There is also a longer delay of as compared to trace I.

The above results clearly show that the blast/shockwave mitigation structure described above can advantageously slow the progression of a shockwave and reduce its amplitude as well as lower the change of pressure as a function of time.

Figure 31:
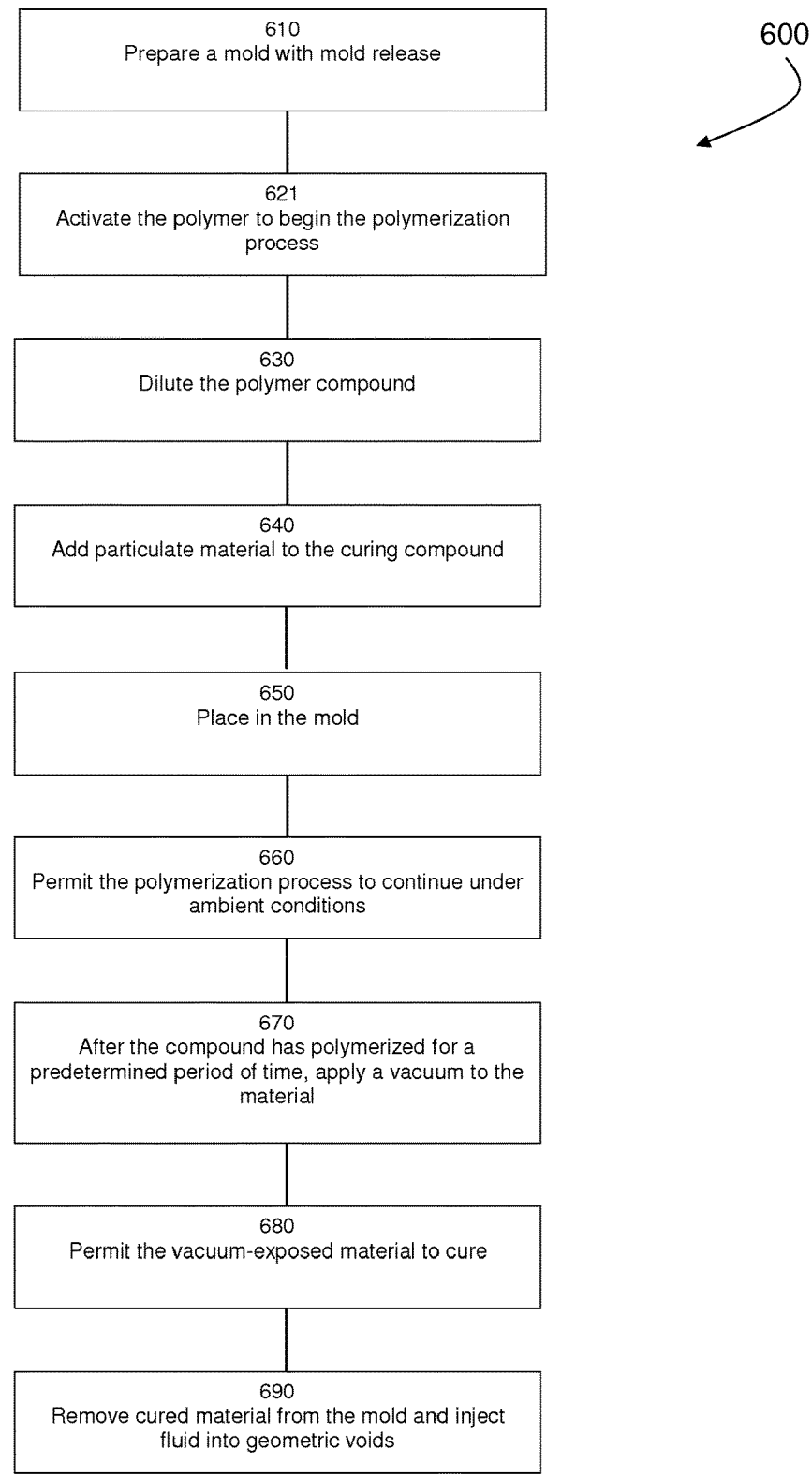
FIG. 31 is a block diagram representing a process for fabricating a blast or shock wave mitigating material according to one embodiment of the present invention.

Referring to FIG. 31, a block diagram representing a process for fabricating the blast/shockwave mitigation structure, according to one processing embodiment is depicted. The process depicted in FIG. 31 is similar to the process depicted in FIG. 24, with some differences that are described below.

Process 600 includes preparing 610 a mold in which uncured compound will be placed, and a cured final material 620 produced. The mold includes one or more larger-scale features the imprint of which result in larger scale voids within the final material. In some embodiments, these larger-scale features have characteristic dimensions roughly in the centimeter range. However, it will also be appreciated that in some other embodiments the characteristic dimension of the larger-scale features are established in relation to a size range for the intermediate-scale features (such as being at least a whole number ratio larger, or an order of magnitude larger, as examples). Depending on the shape of the mold and the shape of the features, it may be necessary to make the material in portions and then fuse the portions together after the portions are removed from the mold, as is known to a person having ordinary skill in the art. Further, in some embodiments, the shape of the larger-scale features is selected to not include stress-inducing aspects such as sharp corners. Preferably, the shape of the features is generally smooth, such as all or part of a sphere, smooth cylinder, or elapse-type shape, as non-limiting examples. For the purpose of the process 600, these larger sized features are hereinafter referred to as geometric features, as the location of these features are deterministic based on the shape of the mold.

Process 600 further includes activating 621 the polymerization process of the material to be molded. In some embodiments, the material mixed together is a two-part room temperature vulcanizing (RTV) silicone rubber material. The mixing of the two parts begins the polymerization and cross-linking of the silicone rubber molecules. However, yet other materials are contemplated by other embodiments of the present invention. One such example includes the use of a single-part RTV compound. Yet other examples include the use of any uncured, non-polymerized, or non-vulcanized material, as examples.

In some embodiments, process 600 further includes diluting 630 the polymer compound, preferably after the polymerization or curing process has begun. Such dilution can be used to affect the hardness of the cured product, and in so doing likewise affects the ability of the final compound to absorb strain energy. In some embodiments, it is preferred to add between about 10 percent to 40 percent by weight of diluent to the activated (curing) material).

In yet other embodiments of the present invention an immiscible, volatile, and low-viscosity organic fluid such as DMSO or acetone is added to the uncured polymer compound. This fluid creates voids in the polymer, and in some embodiments creates voids that are larger than the voids created during the application 670 of subatmospheric pressure (described below). In such embodiments, the curing polymer may not be exposed to subatmospheric pressure during curing, such that the polymer material forms around the organic fluid droplets. After full curing of the polymer, the organic fluid is removed by evaporation, which can be aided by application of a vacuum to the cured material.

Some embodiments further include adding 640 particulate matter to the curing compound. In one embodiment, graphite flakes are added to the polymerizing material. As non-limiting examples, various embodiments of the present invention include the addition of (as referred to at www.graphitestore.com) Microfyne graphite (approx. 325 mesh); #2 Medium Flake (approx. 200 mesh); and #1 Large Flake (approx. 50 mesh). Generally, these mesh sizes correspond to particle diameters of about 40-50 microns, 70-80 microns, and 290-310 microns, respectively. In one embodiment, the present invention contemplates the addition of from about 0.5 percent to about 1 percent (by weight) particulate matter, such as graphite, to the curing material. However, various other embodiments contemplate the addition from about 0.2 percent to about 5 percent by weight.

Process 600 further includes placing 650 the curing mixed material into the mold. In some embodiments, the method further includes permitting 660 the polymerization process to continue at substantially ambient pressure. In such embodiments, there is no attempt to apply a partial vacuum to the curing material during the earliest stages of curing activity. Instead, various embodiments contemplate the curing of the mixed material at substantially ambient pressure for at least about 5 minutes. In some embodiments, this period of initial polymerization is allowed to continue for 10 minutes, and in yet other embodiments for 20 minutes. During this initial period, polymerization and cross-linking of the mixed material begins and continues.

Process 600 further includes applying 670 a subatmospheric pressure to the material in the mold cavity. In some embodiments, the application of subatmospheric pressure encourages the material to foam, without substantially letting any entrapped gases escape. However, in yet other embodiments, the present invention contemplates the introduction of small amounts of gas from the mold cavity into the curing material while the subatmospheric conditions are maintained on top of the curing material. In such embodiments, this gas reintroduced into the material through the mold cavity replaces any gas that was inadvertently removed, such as by application of excessive vacuum, or application of vacuum before significant cross-linking has occurred. Preferably, the subatmospheric conditions are exposed to the curing material for the remainder of the cure cycle (such as for several hours).

After the material is cured, the vacuum is removed, at which time it is possible that the final, cured compound reduces in height. The compound is removed from the mold, and further processed as described below by introducing fluids into the geometric voids. These steps are depicted as blocks 680 and 690. In block 690 after the material is removed from the mold, since the location of geometric features are well known, a fluid is introduced into the geometric features, while allowing air to escape from the features. Once the air is removed, the material may be configured to automatically close around where the fluid is introduced, or alternatively a repair process followed to repair the locations where the fluid is introduced. As discussed above, a fusing process may be needed in order to provide the geometric features as material portions are removed from the mold. The fusing process may include melting and cooling, gluing, or other approaches.

It should be appreciated that the above-described blast/shockwave mitigation material can be used in panels to be placed on the bottom, sides, and/or top of military and civilian vehicles in order to make these vehicles more resistant to blasts from an explosive event such as explosion of a land mine, or an improvised explosive device.

It should further be appreciated that the above-described blast/shockwave mitigation material can be used in military helmets to resist shockwave from an arms fire, e.g., a small caliber round impacting the helmet. The helmet may be configured to include the above-described blast/shockwave mitigation material as being sandwiched between a metal matrix or composite outer shell and a metal matrix or composite inner shell.

It should be appreciated that for the purposes of blast/shockwave mitigation, a multilayer approach can be configured to provide additional mitigation. A multilayer structure includes a plurality of layers of impact absorbing material (e.g., a foam material with inclusions of different feature sizes, as described herein), affixed to a blast/shockwave mitigating material (same as the impact absorption material but with some of the inclusion filled with a fluid other than air), and affixed to a solid foam material. These various layers act as discontinuities for propagation of waves due to impact, blast or shock, thereby causing significant attenuation in the wave. In addition, plates made from metals, metal matrices, or composites can be provided interdisposed between these various layers which can provide additional structural rigidity and support.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A method of making a blast or shock wave mitigating material, comprising: providing a compound that is curable to form a polymer; providing a mold cavity having an internal height adapted and configured to produce cured polymer suitable to be used in a helmet or as a sheet of material to be used in blast protection panel, the mold cavity configured to provide geometric features within the cured polymer; placing the compound in the mold cavity; permitting curing of the compound to proceed for at least about five minutes to provide a partially cured material; exposing the partially cured material in the mold cavity to pressure less than ambient pressure for a period of time after said permitting during which curing progresses to provide a substantially polymerized material; removing the substantially polymerized material from the mold; filling the geometric features of the substantially polymerized material with a fluid; and, after said filling, forming the substantially polymerized material as an interior portion of a helmet or as the blast protection panel.

2. The method of claim 1, wherein the fluid is water.

3. The method of claim 1, wherein the fluid is oil.

4. The method of claim 1, wherein the fluid is uncured silicone.

* * * * *